US011567338B2

(12) United States Patent
Enta et al.

(10) Patent No.: US 11,567,338 B2
(45) Date of Patent: Jan. 31, 2023

(54) CAMERA ACTUATOR, CAMERA MODULE, AND CAMERA MOUNTED DEVICE

(71) Applicants: Yohei Enta, Tokyo (JP); Masahiro Saito, Tokyo (JP); Kazutaka Goami, Tokyo (JP); Hiroshi Matsuda, Tokyo (JP)

(72) Inventors: Yohei Enta, Tokyo (JP); Masahiro Saito, Tokyo (JP); Kazutaka Goami, Tokyo (JP); Hiroshi Matsuda, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 245 days.

(21) Appl. No.: 16/616,516

(22) PCT Filed: May 24, 2018

(86) PCT No.: PCT/JP2018/020037
§ 371 (c)(1),
(2) Date: Nov. 25, 2019

(87) PCT Pub. No.: WO2018/216778
PCT Pub. Date: Nov. 29, 2018

(65) Prior Publication Data
US 2020/0174270 A1    Jun. 4, 2020

(30) Foreign Application Priority Data

May 25, 2017    (JP) ............................. JP2017-103954
Jun. 19, 2017    (JP) ............................. JP2017-119447
Oct. 30, 2017    (JP) ............................. JP2017-209582

(51) Int. Cl.
*G02B 7/09*        (2021.01)
*G02B 27/64*       (2006.01)
(Continued)

(52) U.S. Cl.
CPC ............ *G02B 27/646* (2013.01); *G02B 7/09* (2013.01); *G03B 5/02* (2013.01); *G03B 13/36* (2013.01);
(Continued)

(58) Field of Classification Search
CPC .... G02B 13/0065; G02B 13/007; G02B 7/02; G02B 7/023; G02B 7/04; G02B 7/08;
(Continued)

(56) References Cited

U.S. PATENT DOCUMENTS 6,249,367 B1 *    6/2001    Hirose ................. G02B 7/1821
                                                              359/199.3
2009/0231537 A1    9/2009    Yamamiya
(Continued)

FOREIGN PATENT DOCUMENTS

CN    103268050 A    8/2013
CN    106405991 A    2/2017
(Continued)

OTHER PUBLICATIONS

Extended European Search Report (EESR) dated Jan. 28, 2021.
International Search Report from International Application No. PCT/JP2018/020037 dated Aug. 21, 2018.

*Primary Examiner* — Marin Pichler
(74) *Attorney, Agent, or Firm* — Brundidge & Stanger, P.C.

(57) ABSTRACT

This camera actuator comprises: an optical path bending member; a lens unit disposed at a subsequent stage of the optical path bending member; a first actuator that is disposed near the optical path bending member and displaces the optical path bending member; and a second actuator and a third actuator that are disposed near the lens unit so as to be apart from each other in a first direction, and that respectively displace the lens unit in a second direction and a third direction that are orthogonal to the first direction and
(Continued)

orthogonal to each other. As a result, the present invention provides a camera actuator capable of improving the degree of freedom of design around the optical path bending member.

17 Claims, 31 Drawing Sheets

(51) Int. Cl.
*G03B 5/02* (2021.01)
*G03B 13/36* (2021.01)

(52) U.S. Cl.
CPC .............. *G03B 2205/0015* (2013.01); *G03B 2205/0069* (2013.01)

(58) Field of Classification Search
CPC ... G02B 7/09; G02B 7/10; G02B 7/18; G02B 7/1805; G02B 7/182; G02B 27/64; G02B 27/646; G03B 5/00; G03B 5/02; G03B 5/04; G03B 5/32; G03B 5/34; G03B 5/36; G03B 13/36; G03B 2205/00; G03B 2205/0007; G03B 2205/0015; G03B 2205/003; G03B 2205/0046; G03B 2205/0053; G03B 2205/0061; G03B 2205/0069; H04N 5/2254; H04N 5/23287; H04N 5/2328; H04N 5/23264

USPC ........ 351/556, 557, 813, 814; 359/555, 556, 359/557, 813, 814
See application file for complete search history.

(56) References Cited

U.S. PATENT DOCUMENTS

| | | | |
|---|---|---|---|
| 2010/0321751 A1 | 12/2010 | Yamada | |
| 2014/0376090 A1* | 12/2014 | Terajima | G02B 27/646 359/557 |
| 2015/0042870 A1 | 2/2015 | Chan et al. | |
| 2017/0187962 A1* | 6/2017 | Lee | H04N 5/23287 |
| 2018/0017844 A1* | 1/2018 | Yu | G02B 7/08 |
| 2018/0024329 A1* | 1/2018 | Goldenberg | G02B 27/646 359/557 |
| 2019/0049687 A1* | 2/2019 | Bachar | G02B 7/005 |

FOREIGN PATENT DOCUMENTS

| | | |
|---|---|---|
| CN | 205942054 U | 2/2017 |
| EP | 3006975 A2 | 4/2016 |
| EP | 3006975 A3 | 5/2016 |
| EP | 3518520 A2 | 7/2019 |
| EP | 3518520 A3 | 9/2019 |
| JP | 2011002672 A | 1/2011 |
| JP | 2012-083604 A | 4/2012 |
| JP | 2015-092285 A | 5/2015 |
| WO | 2016166730 A1 | 10/2016 |

* cited by examiner

CAMERA ACTUATOR, CAMERA MODULE, AND CAMERA MOUNTED DEVICE

TECHNICAL FIELD

The present invention relates to a camera actuator, a camera module, and a camera mounted apparatus.

BACKGROUND ART

Low-profile camera mounted apparatuses provided with camera modules such as smartphones and digital cameras have been known. The camera module includes a lens part having one or more lenses and an image sensor that captures subject images formed by the lens part.

A camera module including a bending optical system has also been proposed in which light from a subject along the first optical axis is bent in the direction of the second optical axis and guided to the subsequent lens part through a prism that is an optical path bending member provided at a stage prior to lens part (for example, PTL 1).

The camera module disclosed in PTL 1 includes a shake correction apparatus that corrects camera shake generated in the camera, and an autofocus apparatus that performs autofocusing. Such a camera module has a shake correction actuator and an autofocus actuator as camera actuators. Of these, the shake correction actuator includes a first actuator and a second actuator that swing the prism about two different axes. When camera shake occurs, the shake correction actuator swings the prism under the control of a control part. Consequently, camera shake generated in the camera is corrected.

CITATION LIST

Patent Literature

PTL1
Japanese Patent Application Laid-Open No. 2015-92285

SUMMARY OF INVENTION

Technical Problem

Incidentally, in the case of the camera actuator disclosed in PTL 1 described above, first actuator and second actuator of the shake correction actuator are disposed around the prism, which may lower the degree of freedom in the design around the prism.

An object of the present invention is to provide a camera actuator, a camera module, and a camera mounted apparatus that can improve the degree of freedom in the design around an optical path bending member.

Solution to Problem

One aspect of a camera actuator according to the present invention includes: an optical path bending member; a lens part disposed in a stage following the optical path bending member; a first actuator disposed in the vicinity of the optical path bending member, the first actuator being operable to displace the optical path bending member; and a second actuator and a third actuator disposed in the vicinity of the lens part and spaced apart from each other in a first direction, the second actuator and the third actuator being operable to displace the lens part in a second direction and a third direction, respectively, the second direction and the third direction being orthogonal to the first direction and being orthogonal to each other.

One aspect of a camera module according to the present invention includes: the camera actuator described above; and an image sensor disposed in a stage following a lens part.

One aspect of a camera mounted apparatus according to the present invention includes: the camera module described above; and a control part that controls the camera module.

Advantageous Effects of Invention

The present invention can provide a camera actuator, a camera module, and a camera mounted apparatus that can improve the degree of freedom in the design around an optical path bending member.

DESCRIPTION OF EMBODIMENTS

Some examples of embodiments according to the present invention will be described in detail below with reference to the accompanying drawings. It should be noted that the following embodiments can be implemented in appropriate combination as long as there is no technical contradiction.

1. Embodiment 1

Figure 1A:
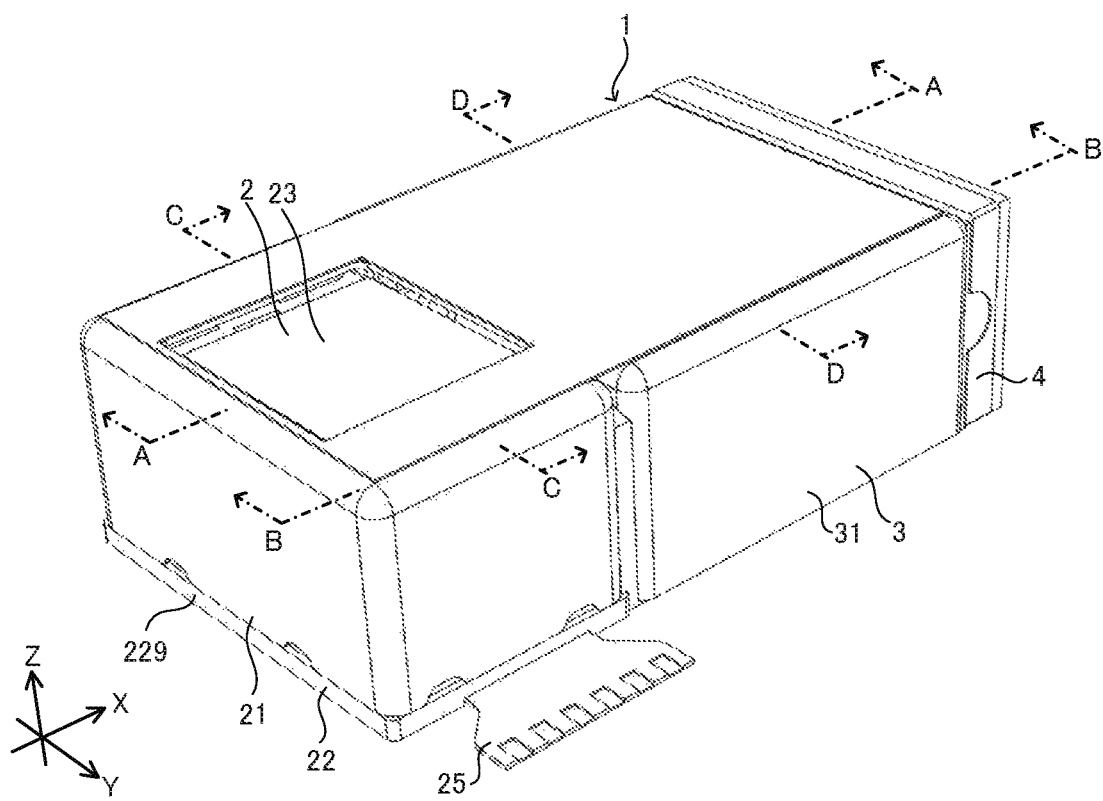
FIG. 1A is a perspective view of a camera module according to Embodiment 1.
Figure 1B:
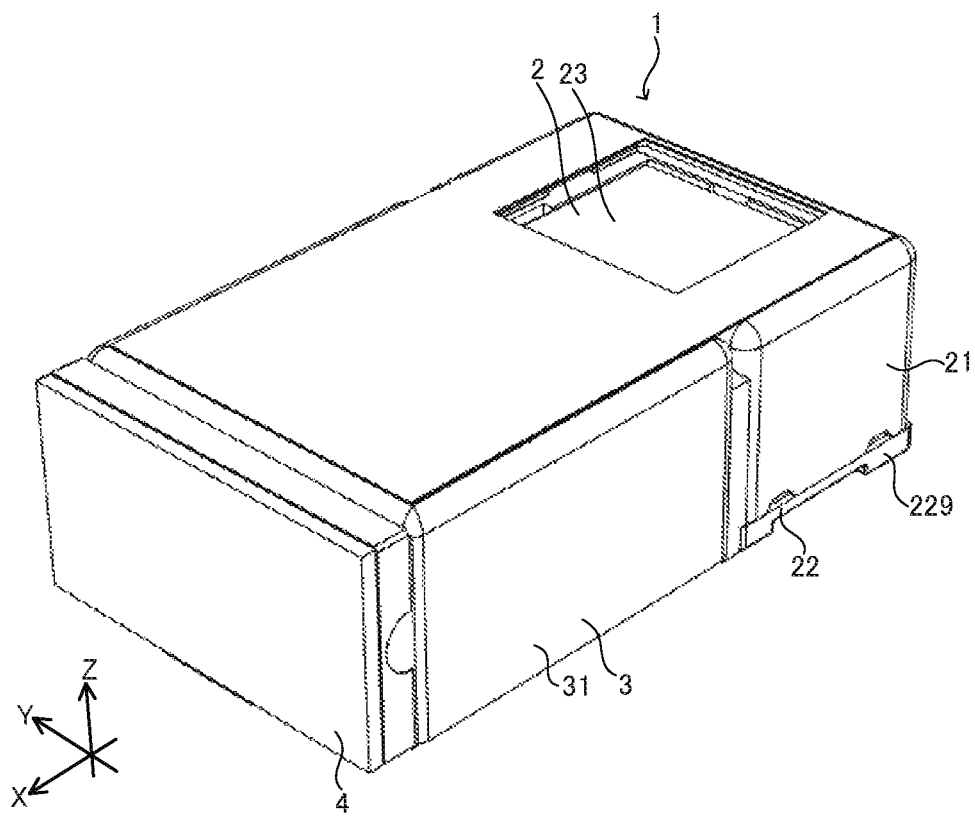
FIG. 1B is a perspective view of the camera module viewed from an angle different from that in FIG. 1A.
Figure 2:
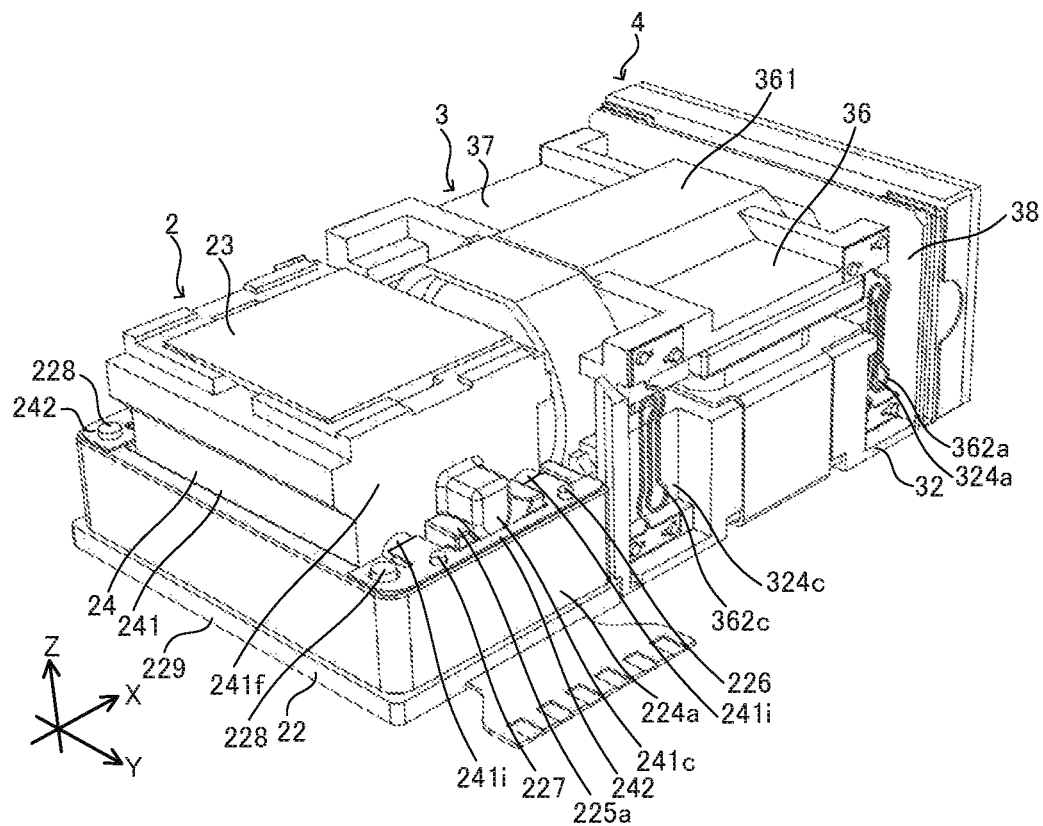
FIG. 2 is a perspective view of the camera module from which a case is omitted.
Figure 3:
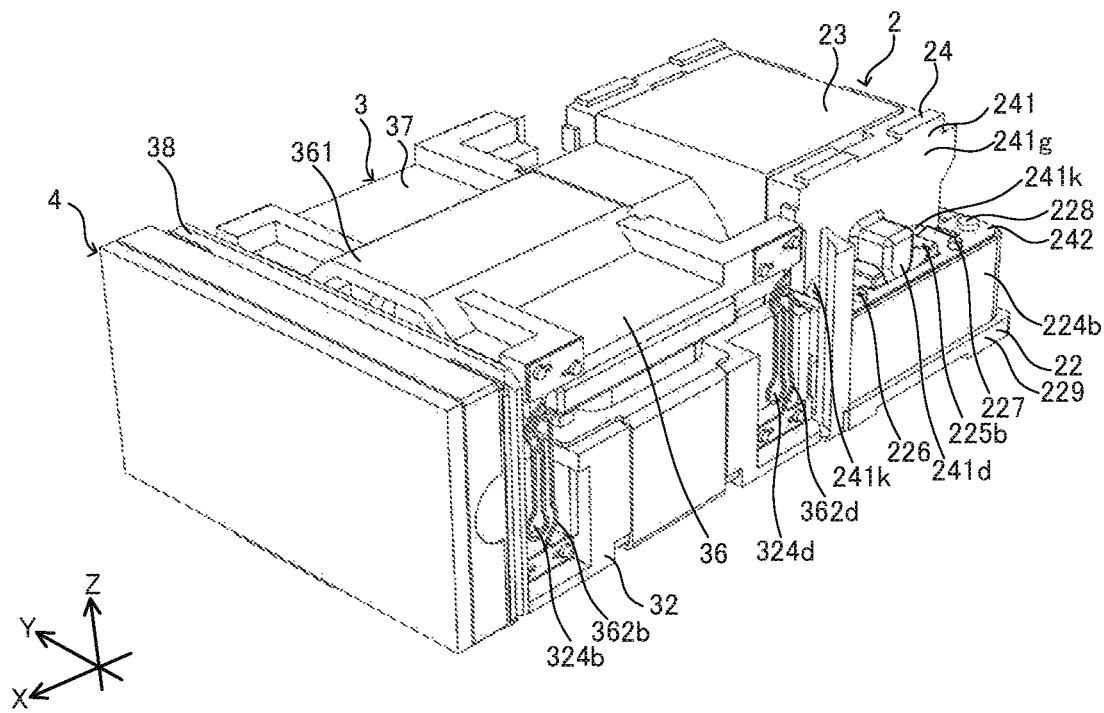
FIG. 3 is a perspective view of the camera module, from which the case is omitted, viewed from an angle different from that in FIG. 2.
Figure 4:
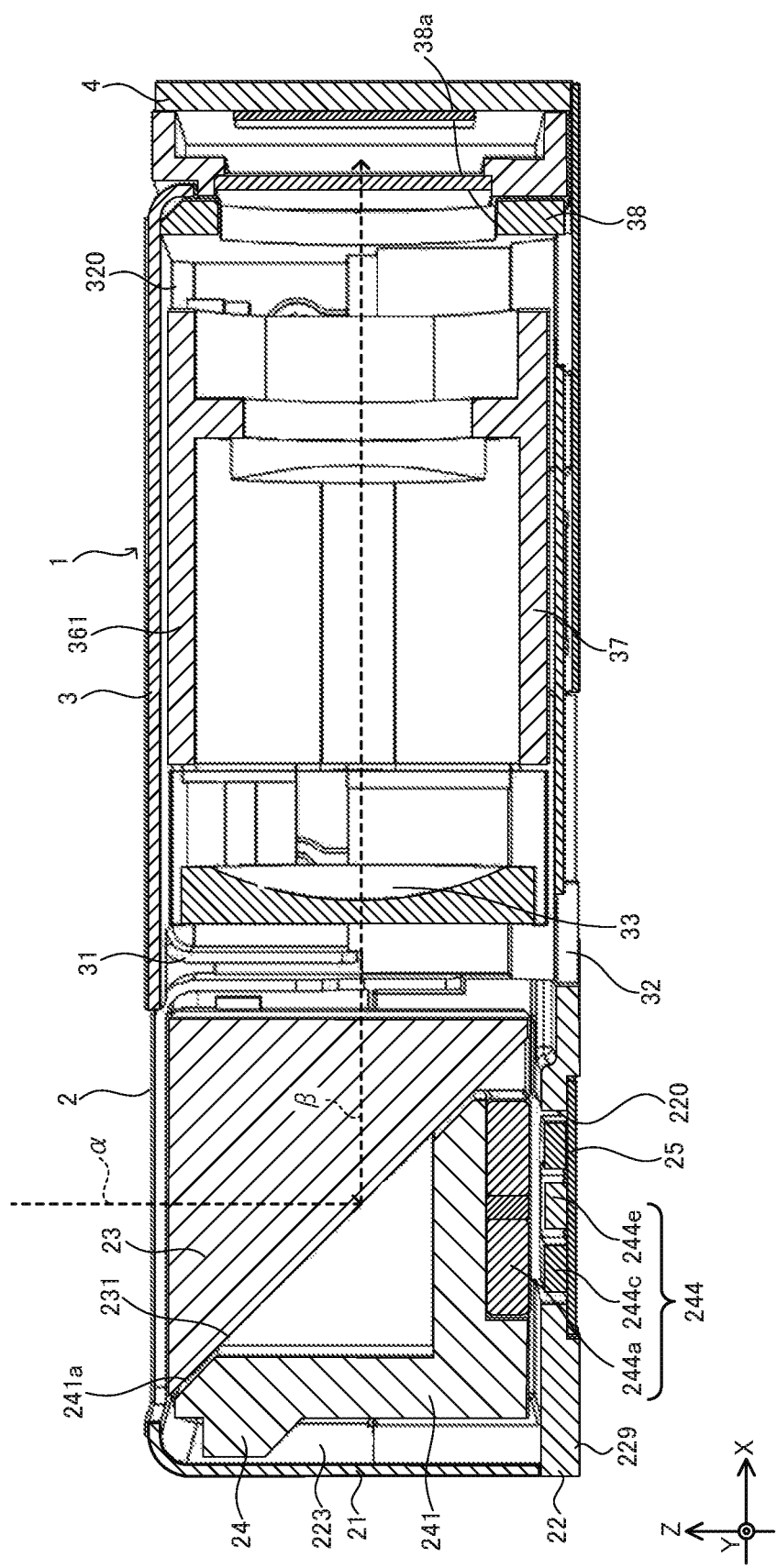
FIG. 4 is a sectional view taken along line A-A in FIG. 1A.
Figure 5:
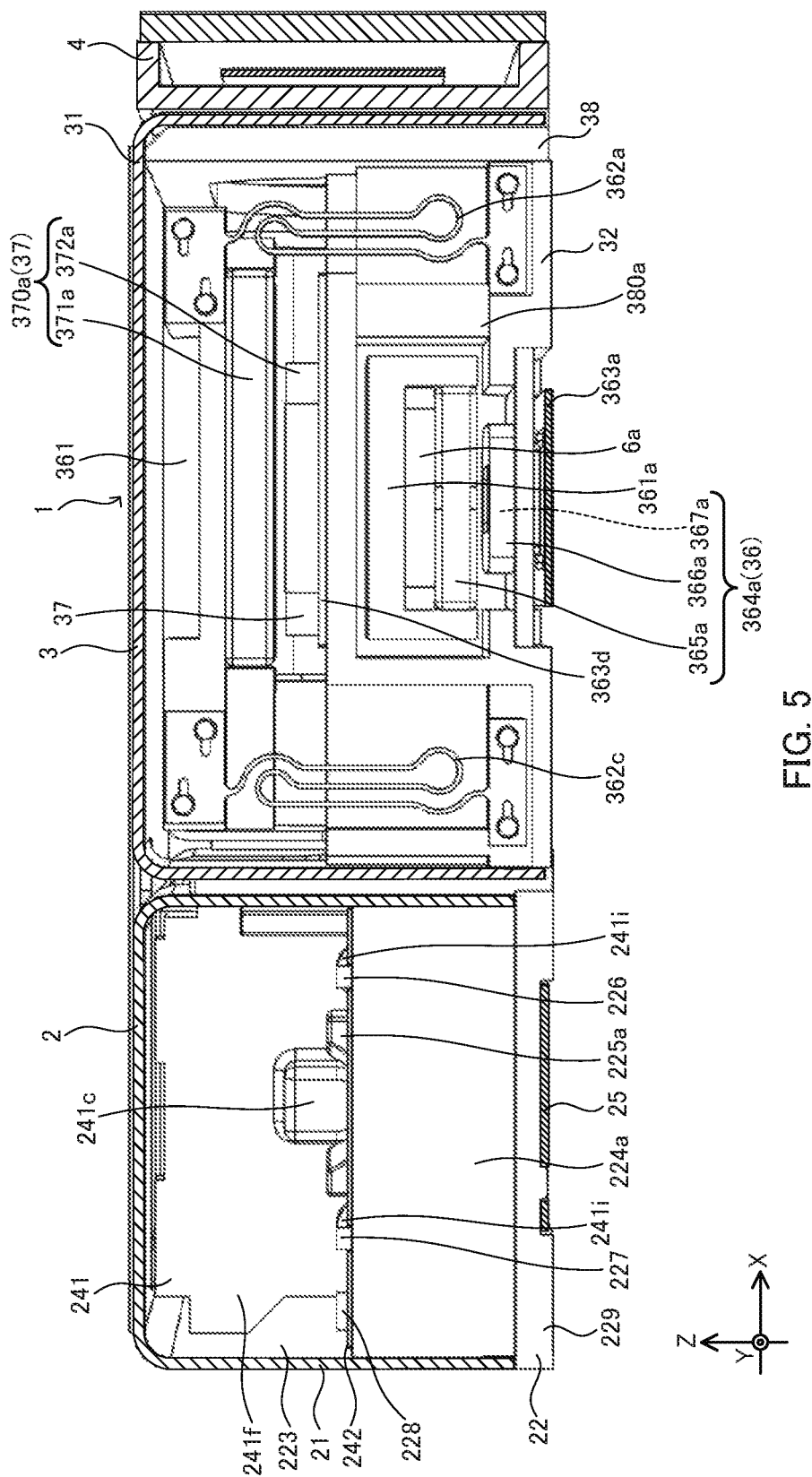
FIG. 5 is a sectional view taken along line B-B in FIG. 1A.
Figure 6:
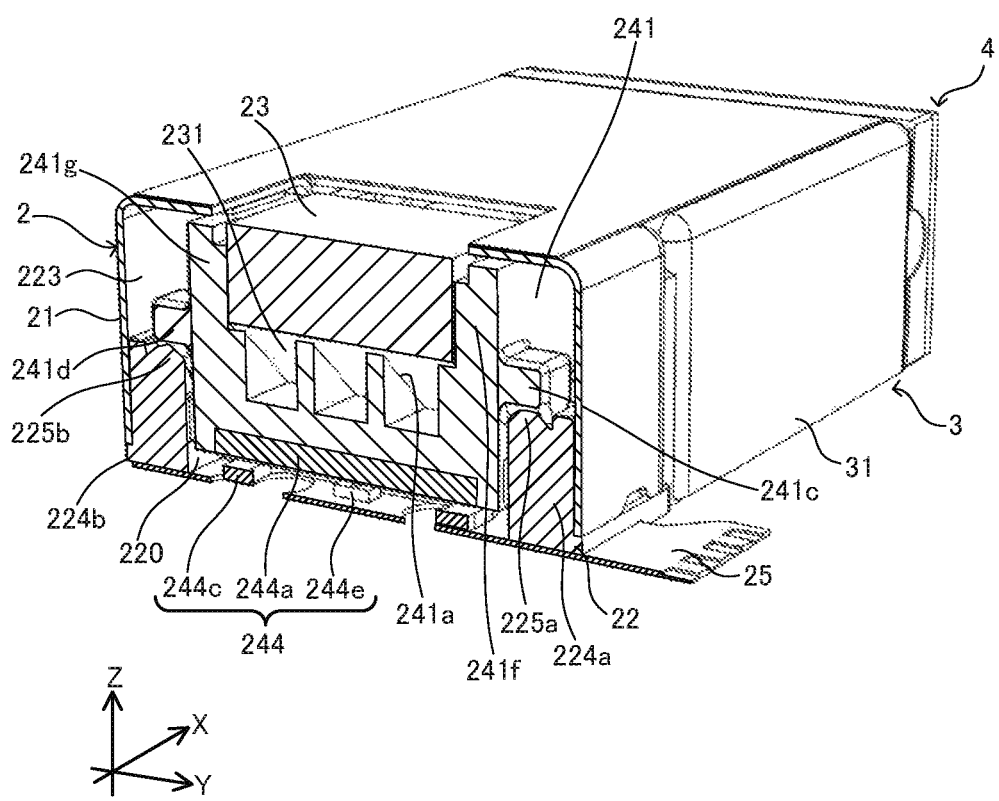
FIG. 6 is a sectional view taken along line C-C in FIG. 1A.

FIGS. 1A and 1B are perspective views of camera module 1 according to Embodiment 1 of the present invention. FIGS. 2 and 3 are perspective views of camera module 1 from which the case is removed. FIG. 4 is a sectional view taken along line A-A in FIG. 1A, and FIG. 5 is a sectional view taken along line B-B in FIG. 1A. The outline of camera module 1 and then specific structures of prism module 2, lens module 3, and image sensor module 4 included in camera module 1 will be described below.

[1.1 Camera Module]

Camera module 1 is mounted on a low-profile camera mounted apparatus such as a smartphone (see FIGS. 22A and 22B), a mobile phone, a digital camera, a notebook computer, a tablet terminal, a portable game machine, or an in-vehicle camera.

The components of camera module 1 of this embodiment will be described assuming the state where they are incorporated in camera module 1. In description of the structure of camera module 1 of this embodiment, an orthogonal coordinate system (X, Y, Z) is used. A common orthogonal coordinate system (X, Y, Z) is used in the drawings which will be described later.

When the camera mounted apparatus is used to take a picture in practice, camera module 1 is mounted so that the X direction is the left-right direction, the Y direction is the up-down direction, and the Z direction is the front-rear direction, for example. The light from the subject enters prism 23 of prism module 2 from the Z direction "+ side" (plus side) as indicated by dashed line α (also referred to as a first optical axis) in FIG. 4. The light incident on prism 23 is bent at optical path bending surface 231 of prism 23 as indicated by dashed line β (also referred to as a second optical axis) in FIG. 4 and is guided to lens part 33 of lens module 3 disposed in a stage following (that is, on the X direction "+ side" of) prism 23. A subject image formed by lens part 33 (see FIG. 4) is captured by image sensor module 4 disposed in a stage following lens module 3.

Camera module 1 described above performs shake correction (optical image stabilization (OIS)) using first shake correction apparatus 24 (see FIG. 4) incorporated in prism module 2 and second shake correction apparatus 37 (see FIG. 5) incorporated in lens module 3. Camera module 1 described above also performs autofocusing by displacing lens part 33 in the X direction using AF apparatus 36 incorporated in lens module 3.

[1.1.1 Camera Actuator]

The aforementioned camera module 1 includes a camera actuator that drives first shake correction apparatus 24, second shake correction apparatus 37, and AF apparatus 36. Such a camera actuator includes first actuator 244 that drives first shake correction apparatus 24, a pair of second actuators 370a and 370b that drives second shake correction apparatus 37, and a pair of AF actuators 364a and 364b that drives AF apparatus 36.

In the case of this embodiment, to improve the degree of freedom in the design around prism 23 that is an optical path bending member, the positioning of first actuator 244 and the positioning of second actuators 370a and 370b and AF actuators 364a and 364b in lens module 3 are devised. The positioning of each actuator will be made clear by the description of prism module 2 and lens module 3 later.

Prism module 2, lens module 3, and image sensor module 4 included in camera module 1 of this embodiment will be described below with reference to FIGS. 1A to 19.

[1.1.2 Prism Module]

As shown in FIG. 4, prism module 2 includes first cover 21, first base 22, prism 23, and first shake correction apparatus 24.

[First Cover]

As shown in FIGS. 4 and 5, first cover 21 is made of, for example, a synthetic resin or a nonmagnetic metal, and is a box-shaped member that is open on opposite sides in the Z direction and on the X direction "+ side". The light from the subject side can enter the internal space of first cover 21 through the opening of first cover 21 on the Z direction "+ side". First cover 21 described above is attached to first base 22 described later from the Z direction "+ side".

[First Base]

First base 22 supports holder 241 (see FIGS. 4 and 8) of first shake correction apparatus 24, which will be described later, so that it can swing about a first axis parallel to the Y direction. For this reason, first base 22 has first bearing part 225a and second bearing part 225b (see FIG. 7) which are bearing parts.

Figure 7:
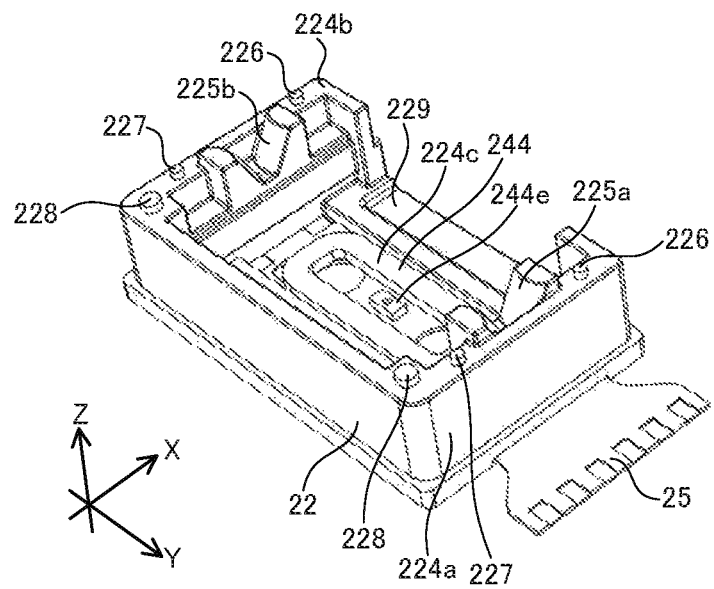
FIG. 7 is a perspective view of a first base.

In the case of this embodiment, first base 22 is a box-shaped member that is open on the Z direction "+ side" and the X direction "+ side". Note that base first opening 220 (see FIG. 4) is formed in a wall part of first base 22 on the Z direction "− side" (that is, bottom wall part 229). In FIG. 7, first coil 244c and first Hall element 244e of first actuator 244 described later and the like are disposed in base first opening 220. Such first base 22 is combined with the aforementioned first cover 21, thereby forming first accommodation space 223 (see FIG. 4) in which first shake correction apparatus 24 and prism 23 can be disposed.

First base 22 has first side wall parts 224a and 224b (see FIG. 7) opposed to each other in the Y direction, at opposite ends in the Y direction. First bearing part 225a is provided to first side wall part 224a on the Y direction "+ side". Second bearing part 225b is provided to first side wall part 224b on the Y direction "− side".

First bearing part 225a and second bearing part 225b have shapes symmetrical with respect to the Y direction. The structure of first bearing part 225a will be described below. First bearing part 225a has a substantially V-shaped notch that is open on the Z direction "+ side" when viewed in the Y direction. Both side surfaces with respect to the X direction of first bearing part 225a are curved.

In addition, first positioning protrusion 226, second positioning protrusion 227, and third positioning protrusion 228 (see FIG. 7) are formed on the end surfaces of first side wall parts 224a and 224b on the Z direction "+ side". First positioning protrusion 226 and second positioning protrusion 227 engage with a pair of holding springs 242 (see FIG. 10) described later, and prevent the pair of holding springs 242 from shifting in the Y direction. Meanwhile, third positioning protrusion 228 engages with the pair of holding springs 242 to facilitate positioning of the pair of holding springs 242 when they are assembled.

Note that the structures of the bearing parts are not limited to those shown in the drawings. The bearing part may be a bearing, such as a rolling bearing or a sliding bearing.

[Prism]

Prism 23 has a triangular prism shape, and is disposed in first accommodation space 223, while being held by holder 241 (see FIGS. 4 and 8) of first shake correction apparatus 24 described later.

Such prism 23 bends incident light from the subject side (that is, the Z direction "+ side") at optical path bending surface 231 (see FIG. 4), and guides it toward lens part 33 described later (that is, the X direction "+ side").

Optical path bending surface 231 is a surface parallel to the Y direction and is inclined a predetermined angle (45° in this embodiment) with respect to the first optical axis (that is, the Z direction) to enable the aforementioned light guide. Note that the structure of prism 23 may be different from that of this embodiment as long as incident light from the subject side can be guided to lens part 33.

[First Shake Correction Apparatus]

First shake correction apparatus 24 swings prism 23 about a first axis parallel to the Y direction, and performs shake correction in the rotational direction about the first axis. Such first shake correction apparatus 24 is disposed in first accommodation space 223 (see FIG. 4).

First shake correction apparatus 24 (see FIGS. 2 and 4) includes holder 241, a pair of holding springs 242, and first actuator 244.

In such first shake correction apparatus 24, holder 241 is supported by first base 22 so as to be swingable. In this state, holder 241 can swing about the first axis by the drive force of first actuator 244. When first actuator 244 is driven under the control by a control part (not shown), holder 241 and prism 23 swing about the first axis. Hence, the shake in the rotational direction about the first axis is corrected. The specific structures of holder 241, holding spring 242, and first actuator 244 will be described below.

[Holder]

Holder 241 (see FIGS. 6 and 8) is made of, for example, a synthetic resin and holds prism 23 in such a state that it is swingable with respect to first base 22.

Holder 241 has mounting surface 241a (see FIGS. 6 and 8) that faces the back side (Z direction "− side") of optical path bending surface 231 of prism 23. Mounting surface 241a has, for example, a surface parallel to optical path bending surface 231. Note that mounting surface 241a does not necessarily have the structure of this embodiment, and may be a boss having a shape that enables positioning of prism 23, for example.

Holder 241 has a pair of swing support parts 241c and 241d (see FIGS. 6 and 8) provided coaxially with each other. The center axis of swing support parts 241c and 241d is the swing center axis (that is, the first axis) of holder 241.

Swing support parts 241c and 241d are respectively provided on a pair of opposing wall parts 241f and 241g (see FIGS. 6 and 8) that sandwich mounting surface 241a from opposite sides in the Y direction. To be specific, swing support part 241c is provided on the Y direction "+ side" surface of opposing wall part 241f. Such swing support part 241c is engaged with first bearing part 225a of first base 22.

Meanwhile, swing support part 241d is provided on the Y direction "− side" surface of opposing wall part 241g. Such swing support part 241d is engaged with second bearing part 225b of first base 22.

Figure 8:
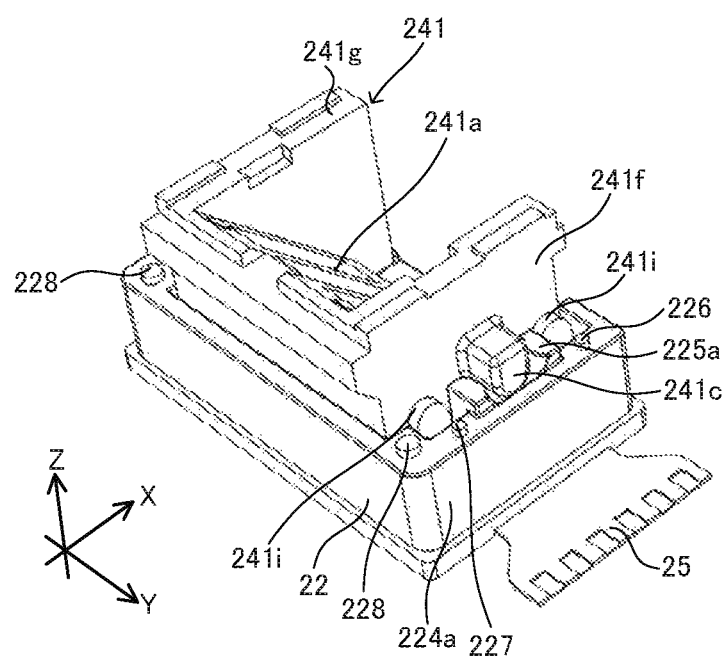
FIG. 8 is a perspective view showing the state in which a holder is assembled to the first base.
Figure 9A:
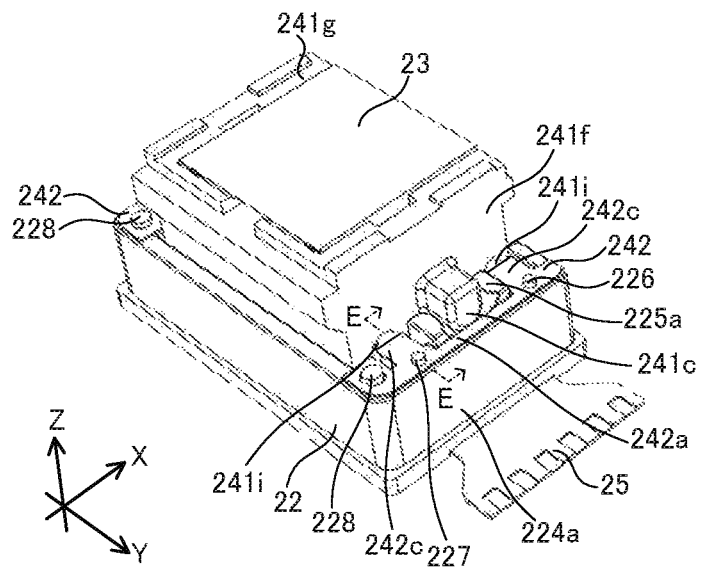
FIG. 9A is a perspective view of a prism module from which a first cover is omitted.
Figure 9B:
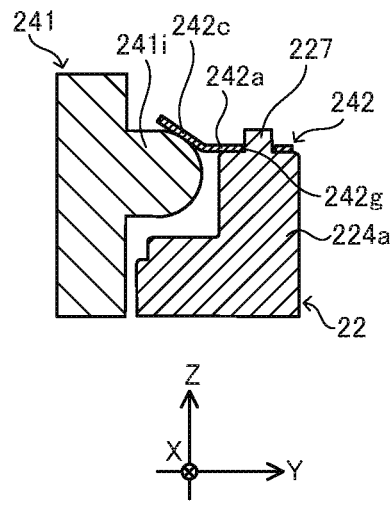
FIG. 9B is a sectional view taken along line E-E in FIG. 9A for explaining the state in which a pressing part of a holding spring presses a pressed part of the holder.

Holder 241 has pressed parts 241i and 241k (see FIGS. 2, 3, and 8). Pressed parts 241i and 241k are pressed toward the Z direction "− side" (that is, toward first base 22) by a respective pair of holding springs 242 described later. Hence, holder 241 is positioned with respect to the Z direction.

In the case of this embodiment, pressed parts 241i (see FIGS. 2 and 8) on the Y direction "+ side" are of two protrusions formed on the Y direction "+ side" surface of opposing wall part 241f. To be specific, pressed parts 241i are provided on opposite sides of swing support part 241c in the X direction, on the Y direction "+ side" surface of opposing wall part 241f.

Meanwhile, pressed parts 241k (see FIG. 3) on the Y direction "− side" are of two protrusions formed on the Y direction "− side" surface of opposing wall part 241g. To be specific, pressed parts 241k are provided on opposite sides of swing support part 241d in the X direction, on the Y direction "− side" surface of opposing wall part 241g.

Pressed parts 241i and 241k described above have a respective spherical outer peripheral surface. To be specific, any of pressed parts 241i and 241k has a sectional shape cut along a plane parallel to the ZX plane, which has a circular shape the diameter of which decreases with distance from opposing wall parts 241f and 241g. For this reason, the contact between the outer peripheral surfaces of pressed parts 241i and 241k and the pair of holding springs 242 is a point contact.

Further, since the outer peripheral surfaces of pressed parts 241i and 241k are spherical, the force of the pair of holding springs 242 pressing pressed parts 241i and 241k includes a component toward the center of holder 241 in the Y direction. With such a configuration, for holder 241, positioning in the Y direction and a reduction in backlash are achieved.

Holder 241 returns to the initial position by the elastic force of the pair of holding springs 242 when the energization of first actuator 244 described later is cut off. Note that the initial position of holder 241 refers to the state where holder 241 is not swung by first actuator 244.

[Holding Spring]

Each of the pair of holding springs 242 (see FIGS. 9A, 9B, and 10) is an urging mechanism fixed to first base 22. Each holding spring 242 presses holder 241 toward the Z direction "− side" (that is, the direction toward first base 22). Holding spring 242 also presses holder 241 respectively from opposite sides in the Y direction toward the center in the Y direction.

To be specific, each holding spring 242 is fixed to a part of the pair of first side wall parts 224a and 224b (to be specific, end surfaces on the Z direction "+ side") of first base 22 through a fixing means such as an adhesive. The fixing means may be, for example, a fixing means using a fastening part (for example, a rivet, bolt, or a set of a bolt and nut).

Figure 10:
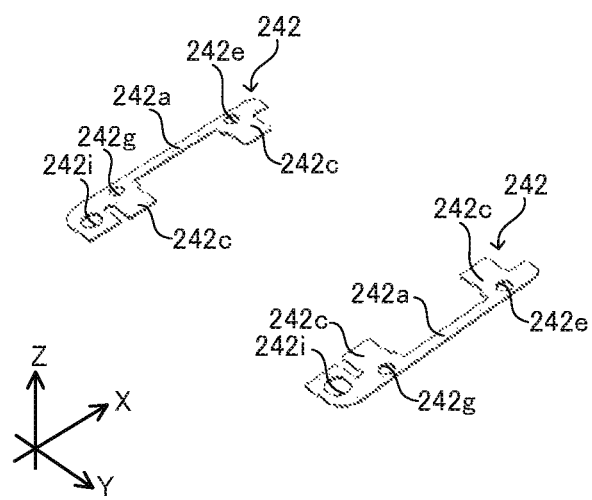
FIG. 10 is a perspective view showing only holding spring.
Figure 11:
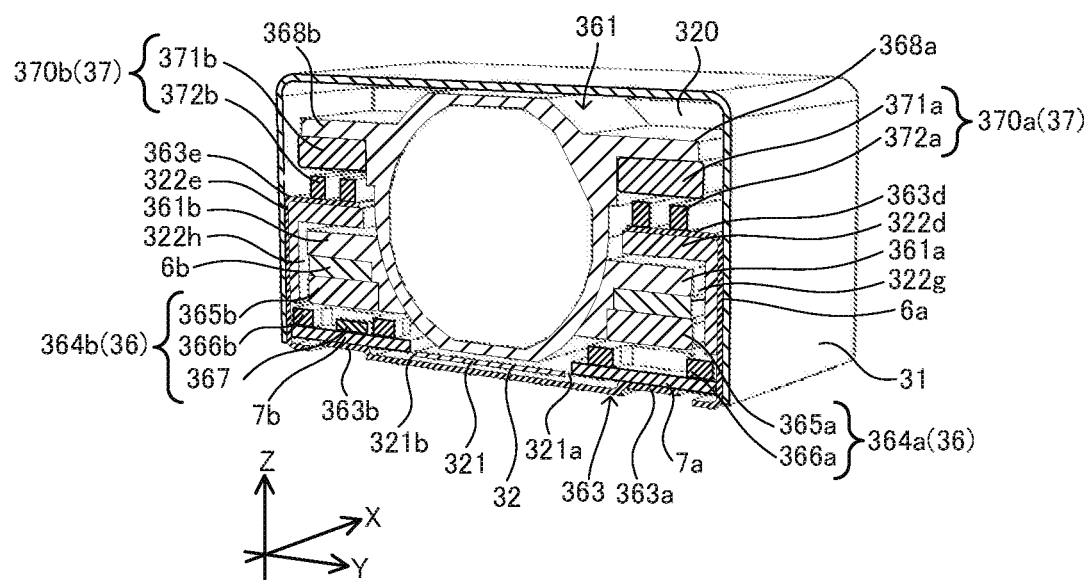
FIG. 11 is a sectional view of a lens module taken along line D-D in FIG. 1A.

As shown in FIG. 10, each of the pair of holding springs 242 described above is a metal leaf spring, and has a fixed basal part 242a and a pair of pressing parts 242c.

Fixed basal part 242a is a portion fixed to first base 22. In such fixed basal part 242a, spring-side first hole 242e, spring-side second hole 242g, and spring-side third hole 242i are formed.

First positioning protrusion 226 and second positioning protrusion 227 of first base 22 are inserted through spring-side first hole 242e and spring-side second hole 242g (see FIGS. 2 and 3). This configuration prevents the displacement of holding spring 242 in the Y direction due to the reaction force from holder 241.

Third positioning protrusion 228 of first base 22 is inserted through spring-side third hole 242i (see FIGS. 2 and 3). This configuration facilities positioning when holding spring 242 is to be assembled to first base 22.

Each of the pair of pressing parts 242c extends toward holder 241 from the corresponding one of two points of fixed basal part 242a. Each of the pair of pressing parts 242c presses pressed part 241i of holder 241 toward the Z direction "− side". Accordingly, swing support part 241c of holder 241 is pressed against first bearing part 225 a of first base 22. Each of the pair of pressing parts 242c presses pressed part 241i of holder 241 toward the center of holder 241 in the Y direction.

[First Actuator]

First actuator 244 (see FIGS. 4 and 6) swings holder 241 about the first axis. In the case of this embodiment, first actuator 244 is disposed behind prism 23 and holder 241 (that is, on the Z direction "− side") so as to overlap optical path bending surface 231 of prism 23 and holder 241 in the Z direction (that is, the direction of the first optical axis). In this embodiment, the direction of the first optical axis corresponds to the first direction.

To be specific, first actuator 244 includes first magnet 244a, first coil 244c, and first Hall element 244e. Such first actuator 244 is a so-called moving magnet-type actuator in which first magnet 244a is fixed to holder 241, which is a movable member, and first coil 244c is fixed to first base 22, which is a fixed member.

Note that first actuator 244 may be a so-called moving coil-type actuator in which first coil 244c is fixed to holder 241, and first magnet 244a is fixed to first base 22. Since the structure of each component of first actuator 244 is almost the same as a conventionally known structure, its detailed description is omitted here. The positioning of each component of first actuator 244 will be described below.

First magnet 244a is fixed to the rear surface of holder 241 (that is, the surface on the Z direction "− side"). In this embodiment, first magnet 244a is magnetized in the Z direction and has two magnetic poles on one side. First coil 244c and first Hall element 244e are fixed to the front surface of a flexible printed circuit board (hereinafter referred to as FPC) 25 (that is, the surface on the Z direction "+ side") fixed to the rear surface of first base 22.

First coil 244c and first Hall element 244e are disposed in base first opening 220 (see FIGS. 4 and 6) of first base 22. In the case of this embodiment, first coil 244c is a so-called air-core coil having an oval shape. First Hall element 244e is disposed on the inner side of first coil 244c in the radial direction.

In the case of first actuator 244 having the aforementioned configuration, when current flows through first coil 244c via FPC 25 under the control by a camera shake correction control part (not shown), a Lorentz force is generated that displaces first magnet 244a in the X direction. Since first magnet 244a is fixed to holder 241, a moment about the first axis acts on holder 241 by the Lorentz force. Consequently, holder 241 swings about the first axis. Adjusting the direction of the current flowing through first coil 244c changes the displacement direction of holder 241.

[1.1.3 Lens Module]

As shown in FIGS. 11 to 19, lens module 3 includes second cover 31, second base 32, lens part 33, AF apparatus 36, second shake correction apparatus 37, and reference member 38.

[Second Cover]

Second cover 31 is made of, for example, a synthetic resin or a nonmagnetic metal, and is a box-shaped member that is open on opposite sides in the X direction and on the Z direction "− side" (that is, back side). Second cover 31 described above is attached to second base 32 described later from the Z direction "+ side".

[Second Base]

Second base 32 (see FIGS. 14 and 15) is combined with the aforementioned second cover 31, thereby forming second accommodation space 320 (see FIG. 11) in which lens part 33, AF apparatus 36, and second shake correction apparatus 37 can be disposed.

Second base 32 has bottom part 321 and a pair of second side wall parts 322a and 322b. Bottom part 321 has a base made of synthetic resin and metal reinforcing plate 323 insert-molded on the base. Such reinforcing plate 323 contributes to an increase in the rigidity of bottom part 321 and a decrease in the thickness of bottom part 321.

Reinforcing plate 323 of second base 32 is disposed so as to overlap lens guide 361 on the Z direction "− side" with respect to lens guide 361 described later. To be specific, regardless of whether lens guide 361 is in a position in the range in which it can move during autofocus operation (that is, the range in which it can move in the X direction) or the range in which it can move during shake correction operation (that is, the range in which it can move in the Y direction), lens guide 361 is present on the Z direction "+ side" with respect to reinforcing plate 323. For this reason, a surface of reinforcing plate 323 (that is, the surface on the Z direction "+ side") is always covered with lens guide 361 and not exposed. Hence, the light reflected by reinforcing plate 323 is prevented from entering lens part 33 and eventually the image sensor of image sensor module 4 described later.

Bottom through holes 321a and 321b (see FIG. 15) are formed on opposite sides of reinforcing plate 323 in bottom part 321 in the Y direction. AF coils 366a and 366b of a pair of AF actuators 364a and 364b, which will be described later, are disposed in bottom through holes 321a and 321b (see FIGS. 5 and 11).

Second side wall parts 322a and 322b extend from opposite ends of bottom part 321 in the Y direction to the Z direction "+ side". Second side wall parts 322a and 322b have coil mount parts 322d and 322e, respectively. Second coils 372a and 372b of second shake correction apparatus 37, which will be described later, are placed on the coil mount parts 322d and 322e, respectively (see FIGS. 5 and 11).

A pair of magnet spaces 322g and 322h (see FIG. 11) are formed between the pair of coil mount parts 322d and 322e and bottom part 321. AF magnets 365a and 365b of a pair of AF actuators 364a and 364b described later are disposed in such magnet spaces 322g and 322h, respectively.

In the case of this embodiment, bottom through holes 321a and 321b and coil mount parts 322d and 322e overlap with each other in the Z direction with a predetermined gap therebetween. Consequently, AF coils 366a and 366b disposed in bottom through holes 321a and 321b and second coils 372a and 372b mounted on coil mount parts 322d and 322e overlap with each other in the Z direction with a predetermined gap therebetween.

Second side wall part 322a has spring positioning parts 324a and 324c (see FIG. 2) for positioning springs 362a and 362c, which will be described later, at opposite ends in the X direction on the side surface present on the Y direction "+ side". Meanwhile, second side wall part 322b has spring positioning parts 324b and 324d (see FIG. 3) for positioning springs 362b and 362d, which will be described later, at opposite ends in the X direction on the side surface present on the Y direction "− side". Note that gel-like damping members covering springs 362a to 362d may be disposed in spring positioning parts 324a to 324d, respectively.

[Lens Part]

Lens part 33 is disposed in second accommodation space 320 while being held by lens guide 361 which will be described later. Such lens part 33 has a cylindrical lens barrel and one or more lenses held in the lens barrel. For example, lens part 33 includes a 3× or more optical telephoto lens group, for example, which is fixed between the end of the lens barrel on the X direction "− side" and the end on the X-direction "+ side". Note that the structure of lens part 33 is not limited to the aforementioned structure.

[AF Apparatus]

AF apparatus 36 (see FIG. 5) displaces lens part 33 in the X direction for autofocusing. To be specific, AF apparatus 36 includes lens guide 361, a plurality of (four in this embodiment) springs 362a to 362d, FPC 363, and a pair of AF actuators 364a and 364b.

[Lens Guide]

Lens guide 361 (see FIGS. 11 and 16) has an accommodation space in which the lens barrel can be held. Such lens guide 361 is disposed in the aforementioned second accommodation space 320 in a state where displacement in the X direction (that is, the direction of the second optical axis) and the Y direction is possible.

Lens guide 361 has a pair of first magnet holding parts 361a and 361b (see FIG. 11) for holding AF magnets 365a and 365b of a pair of AF actuators 364a and 364b which will be described later. In the case of this embodiment, the pair of first magnet holding parts 361a and 361b are disposed in magnet spaces 322g and 322h of second base 32, respectively.

Lens guide 361 has a pair of second magnet holding parts 368a and 368b (see FIG. 11) for holding second magnets 371a and 371b of a pair of second actuators 370a and 370b which will be described later. In the case of this embodiment, the pair of second magnet holding parts 368a and 368b overlap with coil mount parts 322d and 322e of second base 32, respectively, in the Z direction with a predetermined gap therebetween.

[Spring]

A plurality of (four in the case of this embodiment) springs 362a to 362d (see FIGS. 12, 13, and 17) elastically support lens guide 361 on second base 32. In this state, lens part 33 can be displaced in the X direction and the Y direction with respect to second base 32.

Figure 12:
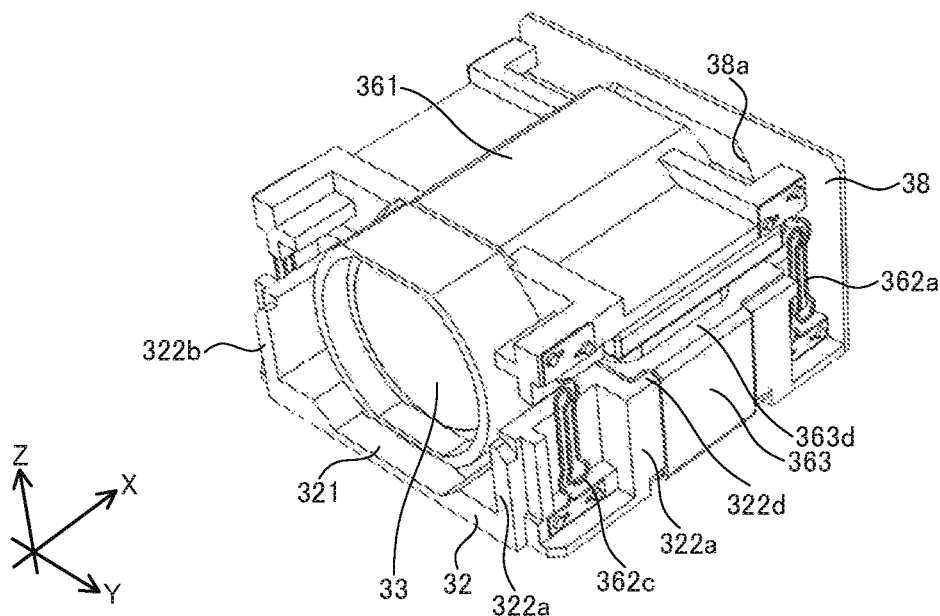
FIG. 12 is a perspective view of the lens module from which a second cover is omitted.
Figure 13:
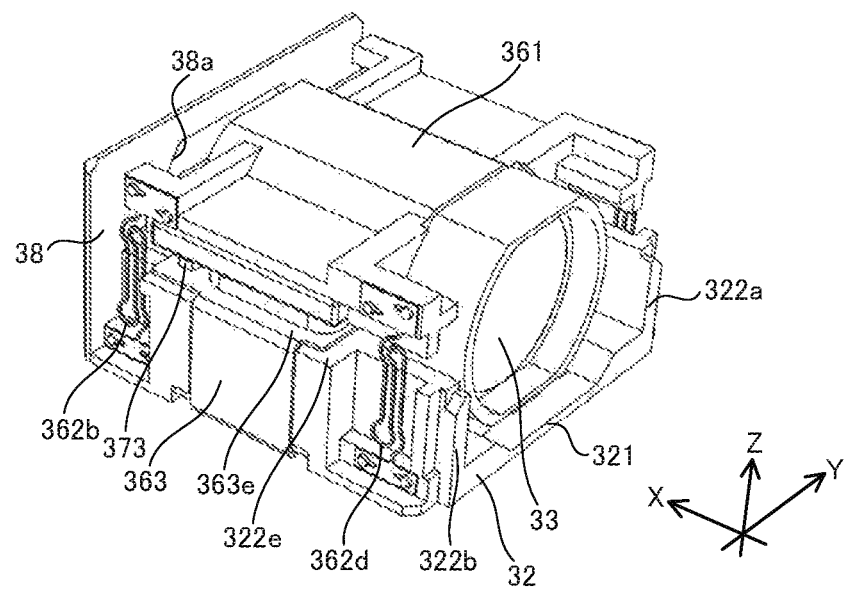
FIG. 13 is a perspective view of the lens module, from which the second cover is omitted, viewed from an angle different from that in FIG. 12.
Figure 14:
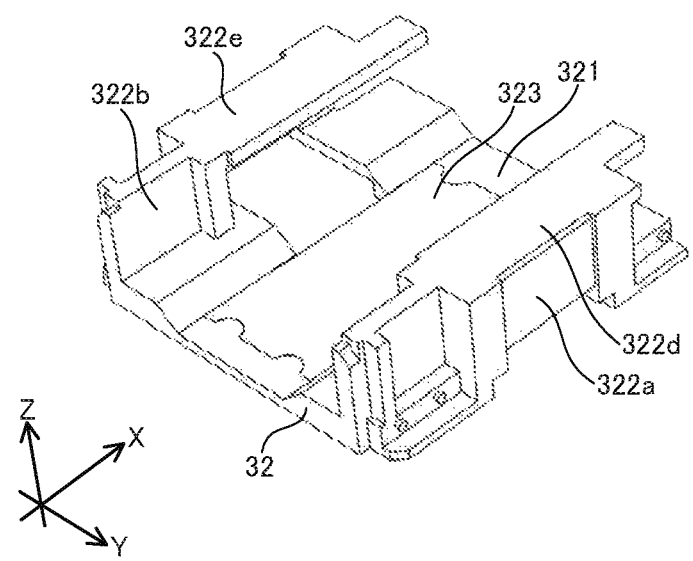
FIG. 14 is a perspective view of a second base.
Figure 15:
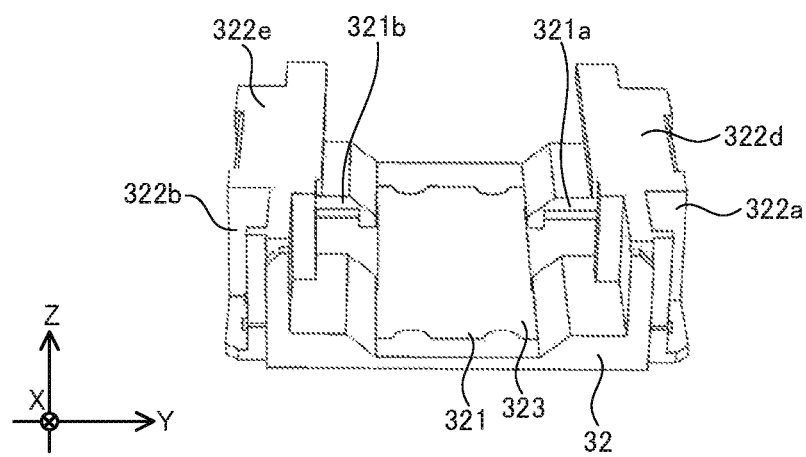
FIG. 15 is a perspective view of the second base viewed from an angle different from that in FIG. 14.
Figure 16:
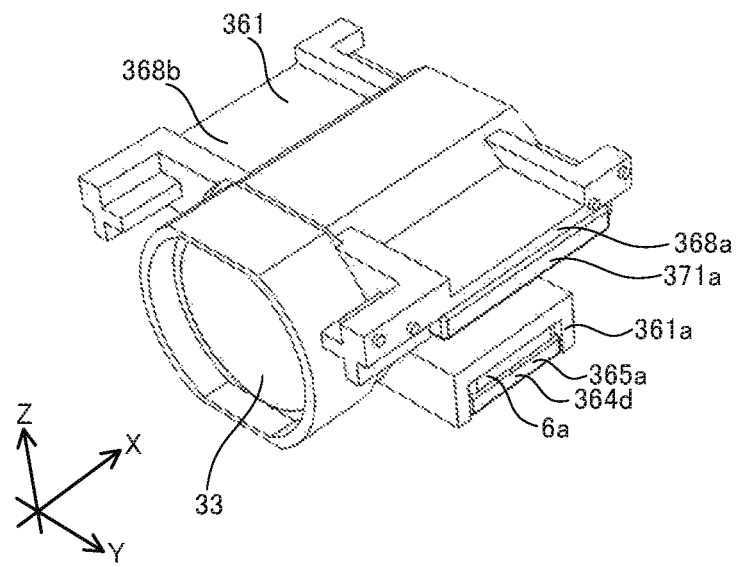
FIG. 16 is a perspective view of a lens guide.

In the case of this embodiment, spring 362a supports the ends of lens guide 361 on the X direction "+ side" and the Y direction "+ side" on second base 32 (see FIG. 12). Spring 362b supports the ends of lens guide 361 on the X direction "+ side" and the Y direction "− side" on second base 32 (see FIG. 13). Spring 362c supports the ends of lens guide 361 on the X direction "− side" and the Y direction "+ side" on second base 32 (see FIG. 12). Spring 362d supports the ends of lens guide 361 on the X direction "− side" and the Y direction "− side" on second base 32 (see FIG. 13).

Figure 17:
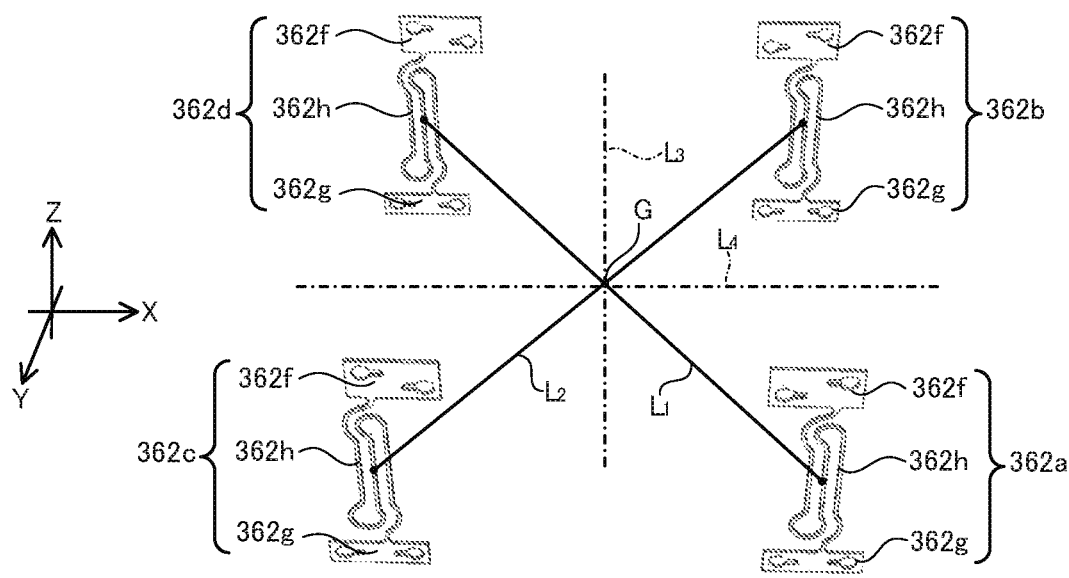
FIG. 17 is a perspective view showing the spring removed in an assembled state.
Figure 18:
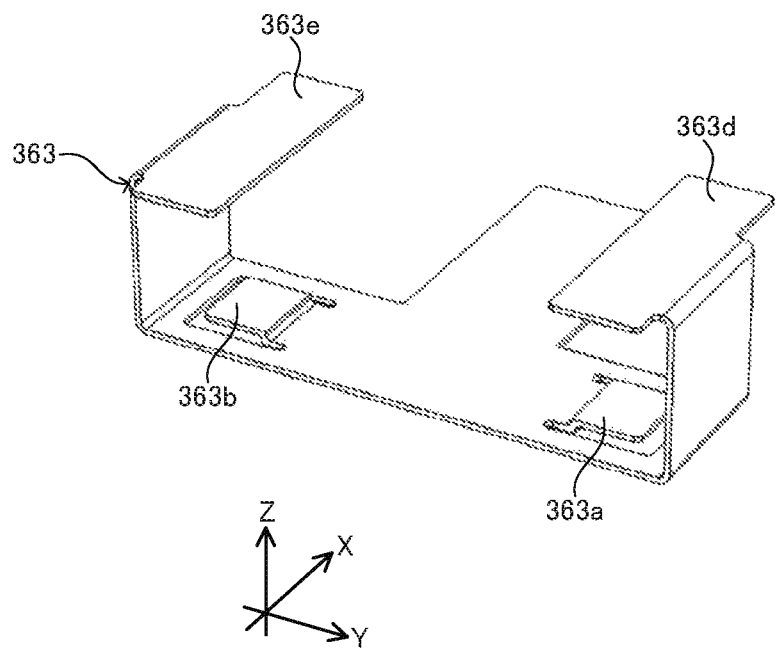
FIG. 18 is a perspective view showing only the removed FPC of the lens module.
Figure 19:
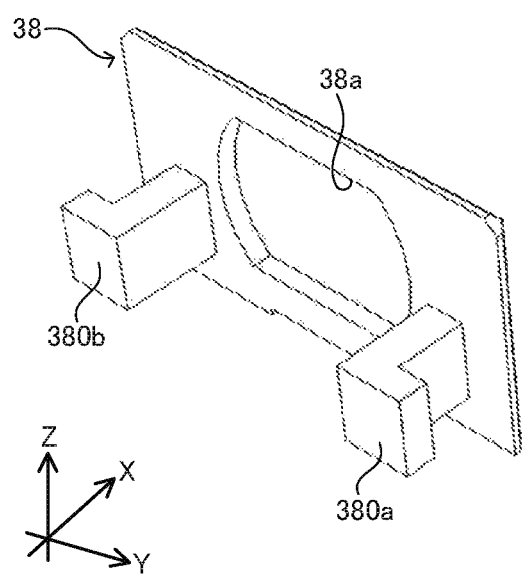
FIG. 19 is a perspective view showing only the removed reference member.

Each of springs 362a to 362d has first fixed part 362f, second fixed part 362g, and elastic deformable part 362h (see FIG. 17). Note that FIG. 17 shows springs 362a to 362d in the assembled state.

First fixed part 362f is fixed to lens guide 361 which is a movable member. Second fixed part 362g is fixed to second base 32 which is a fixed member. Elastic deformable part 362h is continuous with first fixed part 362f and second fixed part 362g. Elastic deformable part 362h consists of a linear member that is bent into a meander, for example.

In the case of this embodiment, elastic deformable part 362h has directionality in the X direction. The aforementioned springs 362a to 362d are disposed so that their elastic deformable parts 362h have the same directionality in the X direction.

In the case of this embodiment, as shown in FIG. 17, when a line segment connecting the center of spring 362a disposed in the position diagonal to lens guide 361 and the center of spring 362d when viewed from the Z direction is $L_1$, and a line segment connecting the center of spring 362b and the center of spring 362c is $L_2$, the intersection of $L_1$ and $L_2$ (also referred to as the center position of dispersed arrangement) coincides or substantially coincides with the center of gravity G of the movable part in the reference position. In the case of this embodiment, the movable part is lens guide 361 and the members that are fixed to lens guide 361 and can be displaced together with lens guide 361. To be specific, in the case of this embodiment, the movable part includes lens guide 361, lens part 33, AF magnets 365a and 365b of the pair of AF actuators 364a and 364b, second magnets 371a and 371b of a pair of second actuators 370a and 370b, which will be described later, and shield plates 6a and 6b.

The center of each spring is, for example, the center position in the Z direction and the center position in the X direction of each spring. The reference position of lens guide 361 is a state in which lens guide 361 is not displaced in the X direction by the autofocus function and lens guide 361 is not displaced in the Y direction by second shake correction apparatus 37 which will be described later. This configuration reduces resonance of lens guide 361 around straight line L3 passing through the center of gravity of the movable part and parallel to the Z direction.

Note that springs 362a to 362d described above are disposed in the following manner. When a straight line that passes through the center of gravity G and is parallel to the direction of the second optical axis (that is, the X direction) is straight line $L_4$ (see FIG. 17), springs 362a and 362b in a pair on the X direction "+ side" are disposed at two points symmetrical with respect to straight line L4 and separated from the center of gravity G toward the X direction "+ side" (the right side in FIG. 17) by a predetermined distance. Meanwhile, springs 362c and 362d in a pair on the X direction "− side" are disposed at two points symmetrical with respect to straight line L4 and separated from the center of gravity G toward the X direction "− side" (the left side in FIG. 17) by the predetermined distance. Hence, the intersection of that straight line $L_1$ and straight line $L_2$ coincides with the center of gravity G.

[FPC]

FPC 363 (see FIGS. 11 and 18) is a flexible printed circuit board and is fixed to second base 32. Such FPC 363 supplies electric power to, for example, AF apparatus 36 and second actuators 370a and 370b of second shake correction apparatus 37 which will be described later.

To be specific, FPC 363 is a continuous flexible printed circuit board, and includes a pair of first coil fixed parts 363a and 363b and a pair of second coil fixed parts 363d and 363e.

AF coil 366a of AF apparatus 36 (see FIG. 11) is fixed to first coil fixed part 363a via board 7a. In this state, first coil fixed part 363a and AF coil 366a are disposed in bottom through hole 321a of second base 32.

AF coil 366b of AF apparatus 36 (see FIG. 11) is fixed to first coil fixed part 363b via board 7b. In this state, first coil fixed part 363b and AF coil 366b are disposed in bottom through hole 321b of second base 32. Note that the aforementioned boards 7a and 7b are fixed to first coil fixed parts 363a and 363b with solder. In contrast to such a structure, when an FPC reinforcing plate is provided on first coil fixed parts 363a and 363b, the aforementioned boards 7a and 7b may be omitted and AF coils 366a and 366b may be directly provided on FPC 363. With such a structure, boards 7a and 7b can be omitted, and soldering between boards 7a and 7b and first coil fixed parts 363a and 363b is therefore unnecessary.

Second coil fixed parts 363d and 363e overlap first coil fixed parts 363a and 363b, respectively, in the Z direction with a predetermined gap therebetween. Second coils 372a and 372b of second shake correction apparatus 37, which will be described later, are fixed on the surfaces of second coil fixed parts 363d and 363e, respectively (see FIG. 11). In this state, second coil fixed parts 363d and 363e are mounted on the surfaces of coil mount parts 322d and 322e of second base 32.

[AF Actuator]

Each of the pair of AF actuators 364a and 364b (see FIG. 11) is a third actuator for autofocusing. AF actuator 364a on the Y direction "+ side" includes AF magnet 365a and AF coil 366a. On the other hand, AF actuator 364b on the Y direction "− side" includes AF magnet 365b, AF coil 366b, and AF Hall element 367.

Such AF actuators 364a and 364b are moving magnet-type actuators in which AF magnets 365a and 365b are fixed to lens guide 361, which is a movable member, and AF coils 366a and 366b are fixed to second base 32, which is a fixed member, via FPC 363.

Note that AF actuators 364a and 364b may be moving coil-type actuators. Since the structure of each component of such AF actuators 364a and 364b is substantially the same as a conventionally known structure, detailed description thereof is omitted here. The positioning of each component of AF actuators 364a and 364b will be described below.

AF magnets 365a and 365b are held by first magnet holding parts 361a and 361b of lens guide 361, respectively. In this state, AF magnets 365a and 365b are disposed in magnet spaces 322g and 322h (see FIG. 11) of second base 32, respectively. In the case of this embodiment, AF magnets 365a and 365b are each magnetized in the Z direction and have two magnetic poles on one side.

AF coils 366a and 366b are a so-called air-core coils having an oval shape. AF coils 366a and 366b are fixed to first coil fixed parts 363a and 363b of FPC 363 via boards 7a and 7b in a state where the major axis coincides with the Y direction. AF Hall element 367 is disposed on the inner side of AF coil 366b in the radial direction.

In the case of AF actuators 364a and 364b having the aforementioned configuration, when current flows through AF coils 366a and 366b via FPC 363 under the control by an autofocus control part (not shown), a Lorentz force is generated that displaces AF magnets 365a and 365b in the X direction. Since AF magnets 365a and 365b are fixed to lens guide 361, lens guide 361 is displaced in the X direction (also referred to as a third direction) by the Lorentz force. Note that adjusting the direction of the current flowing through AF coils 366a and 366b changes the displacement direction of lens guide 361. Autofocusing is performed in the aforementioned manner.

In the case of this embodiment, the resonance of lens guide 361 around straight line $L_3$ (see FIG. 17) is reduced by devising the positioning of springs 362a to 362d and lens guide 361 as described above. However, if the resonance cannot be completely eliminated, lens guide 361 may be swung in a direction in which the resonance is canceled, by making a difference between the drive force of AF actuator 364a and the drive force of AF actuator 364b. Note that making the currents flowing through AF actuators 364a and 364b different can make the drive forces of AF actuators 364a and 364b different.

[Second Shake Correction Apparatus]

Second shake correction apparatus 37 (see FIG. 5) performs shake correction in the Y direction by displacing lens part 33 in the Y direction (also referred to as the second direction). Such second shake correction apparatus 37 is disposed in the aforementioned second accommodation space 320 (see FIG. 4).

Second shake correction apparatus 37 includes lens guide 361 described above, the plurality of springs 362a to 362d described above, FPC 363 described above, and a pair of second actuators 370a and 370b. Lens guide 361, springs 362a to 362d, and FPC 363 are shared with AF apparatus 36.

Second actuator 370a (see FIG. 11) on the Y direction "+ side" is overlapped with AF actuator 364a in the Z direction (also referred to as the first direction) with a predetermined gap therebetween. Such second actuator 370a includes second magnet 371a and second coil 372a.

Second actuator 370b on the Y direction "− side" is overlapped with AF actuator 364b in the Z direction (also referred to as the first direction) with a predetermined gap therebetween. Such second actuator 370b includes second magnet 371b, second coil 372b, and second Hall element 373.

Through such arrangement of second actuators 370a and 370b and AF actuators 364a and 364b, the centers of the drive forces of second actuators 370a and 370b coincide with the centers of the drive forces of AF actuators 364a and 364b. This configuration makes it difficult for lens guide 361 to be tilt-displaced (that is, swinging displacement about an axis parallel to the X direction or the Y direction) during autofocusing and shake correction.

Second actuators 370a and 370b described above are moving magnet-type actuators in which second magnets 371a and 371b are fixed to lens guide 361, which is a movable member, and second coils 372a and 372b are fixed to second base 32, which is a fixed member, via FPC 363. Note that second actuators 370a and 370b may be moving coil-type actuators.

Since the structure of each component of such second actuators 370a and 370b is substantially the same as a conventionally known structure, detailed description thereof is omitted here. The positioning of each component of second actuators 370a and 370b will be described below.

Second magnets 371a and 371b are held by second magnet holding parts 368a and 368b of lens guide 361, respectively. In the case of this embodiment, second magnets 371a and 371b are each magnetized in the Z direction and have two magnetic poles on one side.

Second coils 372a and 372b are a so-called air-core coils having an oval shape. Second coils 372a and 372b are fixed to second coil fixed parts 363d and 363e of FPC 363 in a state where the major axis coincides with the X direction.

In this state, second coils 372a and 372b overlap second magnets 371a and 371b, respectively, in the Z direction with a predetermined gap therebetween. Second Hall element 373 is fixed on the surface of second coil fixed part 363e of FPC 363 and on the outer side of second coil 372b in the radial direction. Note that second Hall element 373 may be disposed on the inner side of second coil 372b in the radial direction.

In the case of second actuators 370a and 370b having the aforementioned configuration, when current flows through second coils 372a and 372b via FPC 363 under the control by a camera shake correction control part (not shown), a Lorentz force is generated that displaces second magnets 371a and 371b in the Y direction. Since second magnets 371a and 371b are fixed to lens guide 361, lens guide 361 is displaced in the Y direction by the Lorentz force. Note that adjusting the direction of the current flowing through second coils 372a and 372b changes the displacement direction of lens guide 361.

In the case of this embodiment, in order to prevent crosstalk between second actuators 370a and 370b and AF actuators 364a and 364b, magnetic metal shield plates 6a and 6b are disposed between second magnets 371a and 371b and AF magnets 365a and 365b in the Z direction.

[Reference Member]

Reference member 38 (see FIGS. 12 and 19) is a plate-like member fixed to the end of second base 32 on the X direction "+ side". The side surface of such reference member 38 on the X direction "+ side" serves as a reference surface of image sensor module 4 in the X direction, which will be described later. Through hole 38a that guides the light that has passed through lens part 33 to image sensor module 4 is formed in the central portion of reference member 38.

A pair of stopper parts 380a and 380b is provided on the side surface of reference member 38 on the X direction "− side" in order to restrict the displacement of lens part 33 toward the X direction "+ side" during autofocusing to a predetermined range. As shown in FIG. 5, in the state where lens guide 361 is in the reference position, the end surfaces of such stopper parts 380a and 380b on the X direction "− side" (hereinafter simply referred to as "stopper surfaces") face a part of lens guide 361 in the X direction with a predetermined gap therebetween.

In the case of this embodiment, the stopper surfaces face the end surfaces of first magnet holding parts 361a and 361b of lens guide 361 on the X direction "+ side" (hereinafter referred to as "first stopper surfaces") in the X direction. When lens guide 361 is displaced toward the X direction "+ side" by a distance larger than the predetermined gap, the first stopper surface comes into contact with the stopper surface. Hence, the displacement of lens guide 361 toward the Y direction "+ side" is regulated within a predetermined range.

Meanwhile, the displacement of lens guide 361 toward the Y direction "− side" is regulated within a predetermined range by the end surfaces of first magnet holding parts 361a and 361b of lens guide 361 on the X direction "− side" (hereinafter referred to as "second stopper surfaces"), and a part of second base 32 that faces the second stopper surface in the X direction (also referred to as second stopper surface).

Further, the displacement of lens guide 361 in the Y direction is regulated within a predetermined range by opposite end surfaces of first magnet holding parts 361a and 361b in the Y direction, and a pair of second side wall parts 322a and 322b of second base 32.

The displacement of lens guide 361 toward the Z direction "+ side" is regulated within a predetermined range by the end surface of lens guide 361 on the Z direction "+ side" and second cover 31. The displacement of lens guide 361 toward the Z direction "− side" is regulated within a predetermined range by the end surface of lens guide 361 on the Z direction − side and bottom part 321 of second base 32.

Note that spring positioning part 324*a* (see FIGS. 2 and 3) in which spring 362*a* can be placed is formed on the Y direction "+ side" with respect to stopper part 380*a*. Spring positioning part 324*b* in which spring 362*b* can be placed is formed more on the Y direction "− side" with respect to stopper part 380*b*.

Gel-like damping members that cover springs 362*a* and 362*b* may be disposed in spring positioning parts 324*a* and 324*b*, respectively.

[1.1.4 Image Sensor Module]

Image sensor module 4 is disposed on the X direction "+ side" with respect to lens part 33. Image sensor module 4 includes an image sensor, such as a charge-coupled device (CCD) image sensor or a complementary metal oxide semiconductor (CMOS) image sensor. The image sensor of image sensor module 4 captures a subject image formed by lens part 33 and outputs an electrical signal corresponding to the subject image. A printed wiring board (not shown) is electrically connected to the board (not shown) of image sensor module 4, and power supply to image sensor module 4 and the electrical signal of the subject image captured by image sensor module 4 is output through the printed wiring board. A conventionally known structure can be used as such image sensor module 4.

[1.2 Actions and Advantageous Effects of this Embodiment]

In the case of the camera actuator and camera module 1 of this embodiment having the aforementioned configuration, only first actuator 244 of first shake correction apparatus 24 is provided in prism module 2. In addition, first actuator 244 is disposed behind prism 23 (that is, on the Z direction "− side") so as to overlap prism 23 in the Z direction (that is, the direction of the first optical axis). Accordingly, camera actuators are not disposed around prism 23 in the X direction and the Y direction. For this reason, degree of freedom in the design around prism 23 in the X direction and the Y direction can be improved. Such an improvement in the degree of freedom in the design contributes to a reduction in the size of prism module 2 in the X direction and the Y direction.

In lens module 3, the pair of second actuators 370*a* and 370*b* that are drive apparatuses for second shake correction apparatus 37 overlaps the pair of AF actuators 364*a* and 364*b* in the Z direction with a predetermined gap therebetween. Such an arrangement contributes to miniaturization of lens module 3 in the X direction and the Y direction.

Figure 22A:
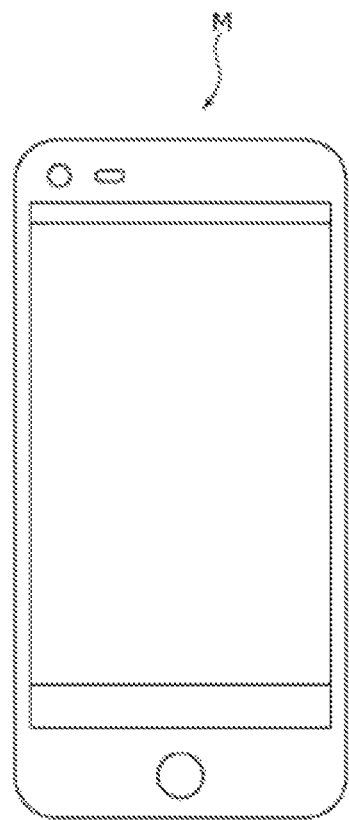
FIGS. 22A and 22B are diagrams showing an example of a camera mounted apparatus on which a camera module is mounted.
Figure 22B:
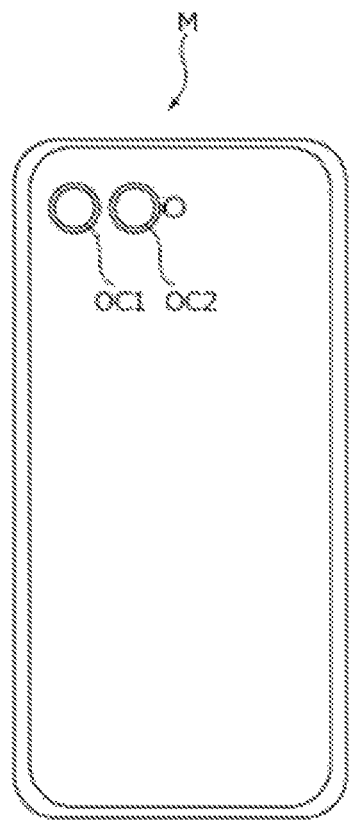
Figure 23:
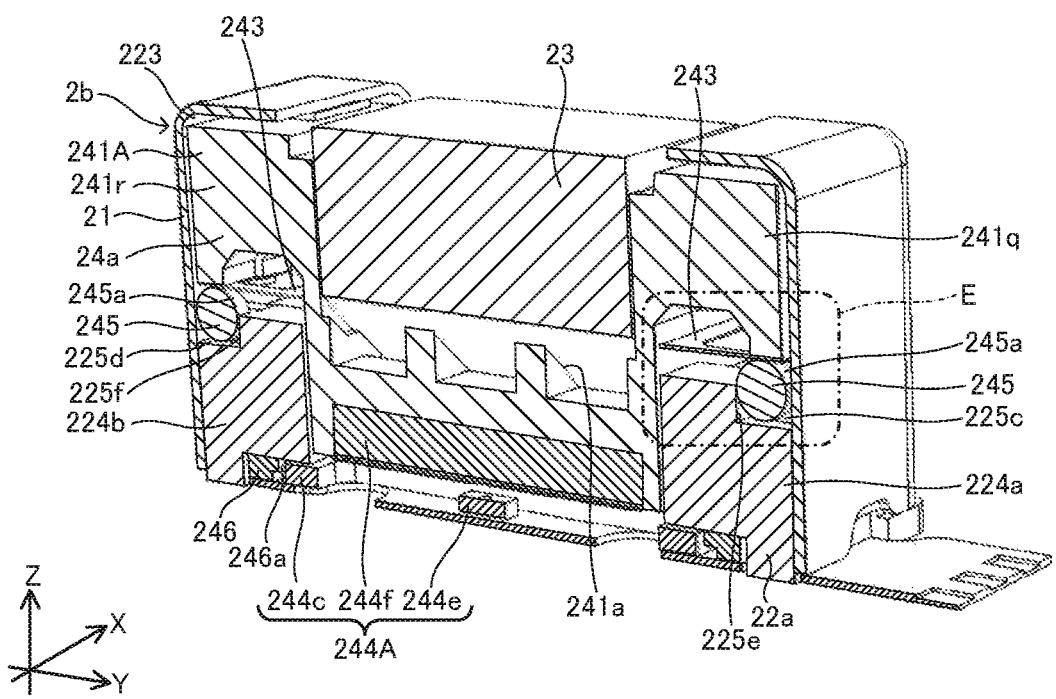
FIG. 23 is a sectional view of a prism module of a camera module according to Embodiment 3 cut along line C-C in FIG. 1A.
Figure 24:
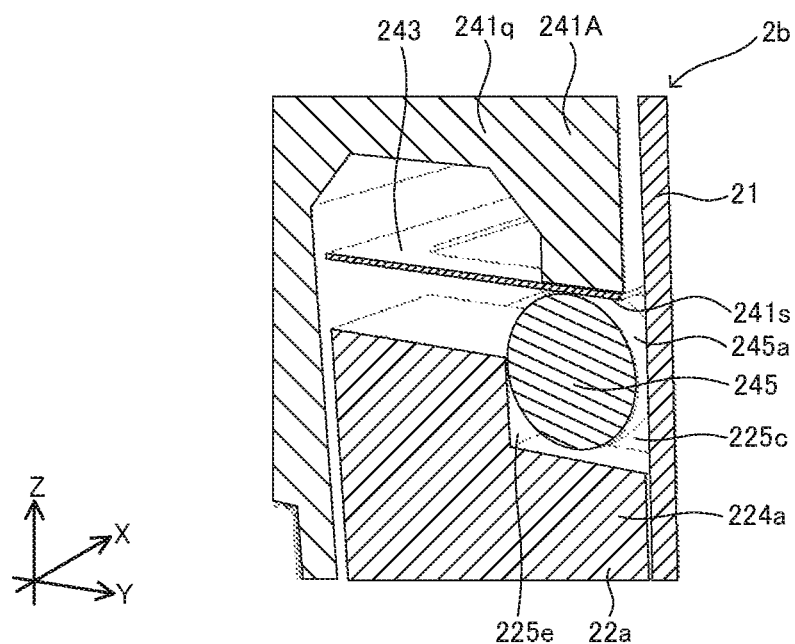
FIG. 24 is an enlarged view of portion E in FIG. 23.

For example, a camera mounted apparatus (smartphone M in the case shown in the drawing) equipped with a dual camera composed of wide-angle camera OC1 and telephoto camera OC2 shown in FIGS. 22A and 22B has been conventionally known. In such a smartphone M, wide-angle camera OC1 is disposed on the X direction "− side" (the left side in FIG. 22B) of telephoto camera OC2. To be specific, when camera module 1 of this embodiment shown in FIGS. 1A and 4 is telephoto camera OC2, wide-angle camera OC1 is disposed on the X direction − side (the left side in FIGS. 1A and 4) with respect to camera module 1. Smartphone M also includes a control part (not shown) that controls wide-angle camera OC1 and telephoto camera OC2. Note that wide-angle camera OC1 may be disposed on the Y direction "+ side" (the front side in FIG. 4) with respect to camera module 1.

Such a structure is known for causing so-called crosstalk when the camera actuator of telephoto camera OC2 and the camera actuator of wide-angle camera OC1 are close to each other. An example arrangement with which such crosstalk becomes a problem, is that in which the first actuator of telephoto camera OC2 is disposed on the X direction "− side" of prism 23, for example, in FIGS. 1A and 4.

In contrast, in the case of this embodiment, first actuator 244 of camera module 1 is disposed on the Z direction "− side" of prism 23 remote from wide-angle camera OC1. Consequently, when applied to the aforementioned dual camera, camera module 1 according to this embodiment can suppress the occurrence of crosstalk with the actuator of wide-angle camera OC1.

If camera module 1 of this embodiment is employed as telephoto camera OC2 of smartphone M described above, first actuator 244 is disposed in a position away from the actuator of wide-angle camera OC1, which reduces the risk of crosstalk with wide-angle camera OC1.

[1.3 Notes]

In this embodiment, second actuators 370*a* and 370*b* of second shake correction apparatus 37 are disposed on the Z direction "+ side", and AF actuators 364*a* and 364*b* of AF apparatus 36 are disposed on the Z direction "− side". Alternatively, second actuators 370*a* and 370*b* of second shake correction apparatus 37 may be disposed on the Z direction "− side", and AF actuators 364*a* and 364*b* of AF apparatus 36 may be disposed on the Z direction "+ side".

Note that camera module 1 of this embodiment includes prism module 2 and lens module 3 described above at the same time. However, prism module 2 and lens module 3 described above are not necessarily implemented at the same time. In particular, a camera module including one of prism module 2 described above and lens module 3 described above can be implemented. Alternatively, a partial structure may be removed from prism module 2 or lens module 3 described above to be implemented.

2. Embodiment 2

Figure 20:
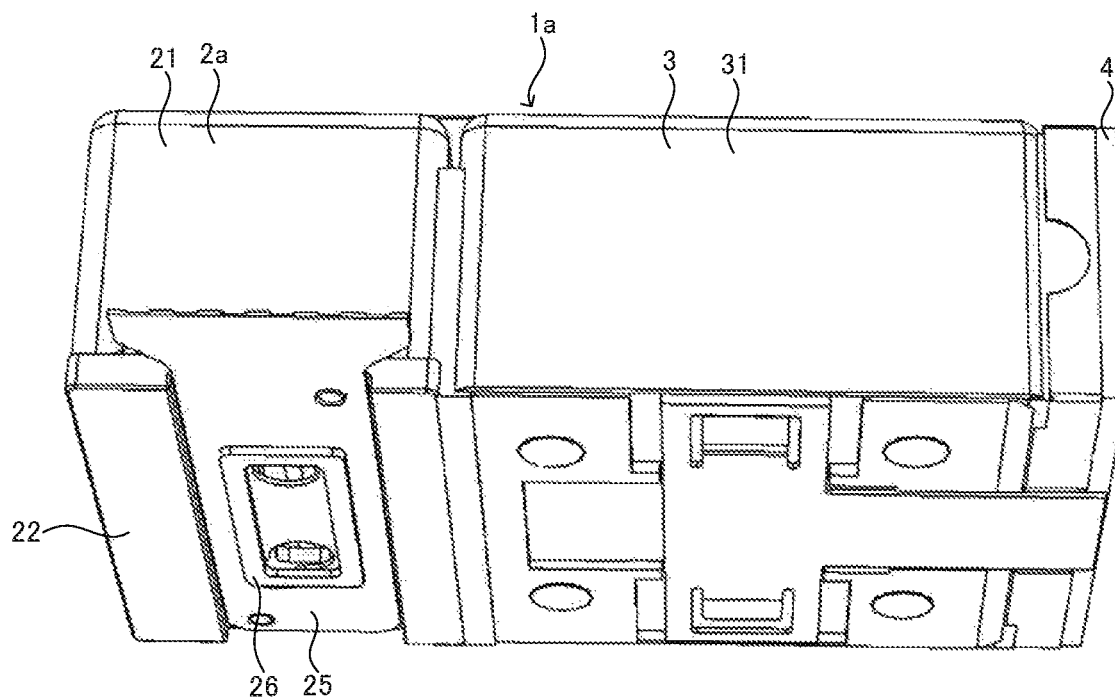
FIG. 20 is a perspective view of a camera module according to Embodiment 2.
Figure 21:
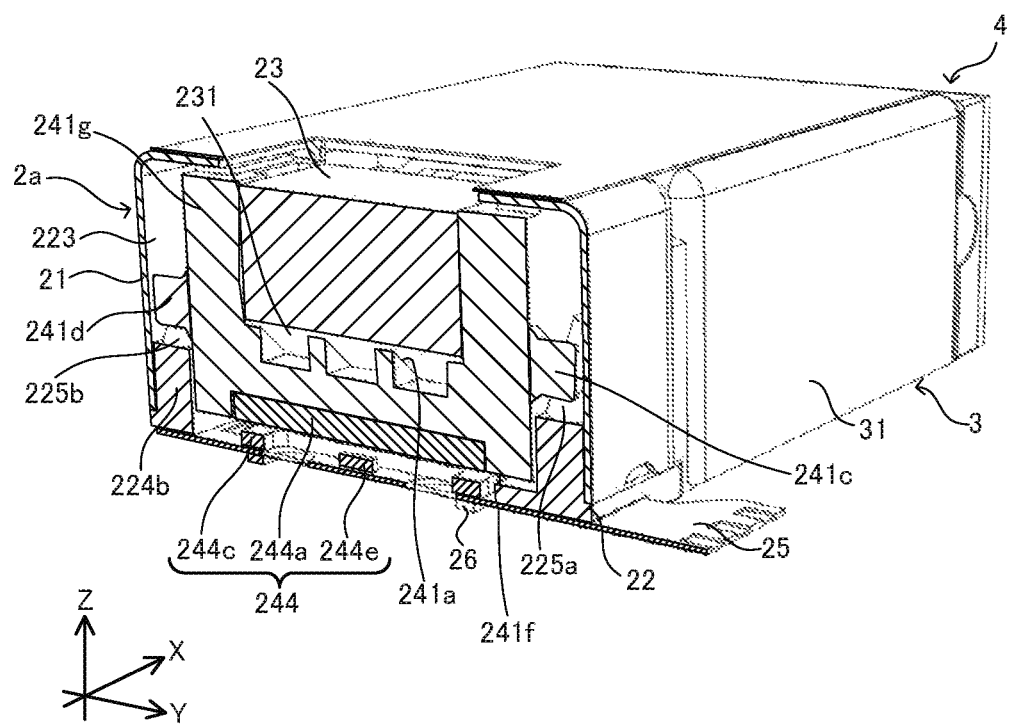
FIG. 21 is a sectional view of a prism module portion of the camera module.

FIGS. 20 and 21 are perspective views showing camera module 1*a* according to Embodiment 2 of the present invention. Camera module 1*a* of this embodiment is different from that of Embodiment 1 described above in the structure of the urging mechanism that presses holder 241 of prism module 2*a* toward the Z direction "− side" (that is, the direction toward first base 22). Other structures of camera module 1*a* are the same as those of Embodiment 1 described above. For this reason, the structure of camera module 1*a* according to this embodiment will be described below focusing on the structure of a portion different from that of Embodiment 1 described above.

Prism module 2*a* of camera module 1*a* does not have holding spring 242 (see FIGS. 9A, 9B, and 10) that prism module 2 of Embodiment 1 described above has. Alternatively, prism module 2*a* has rectangular annular yoke 26 made of magnetic metal and fixed to the rear surface of FPC 25 fixed to a rear surface of first base 22 (that is, the surface on the Z direction "− side"). The shape of yoke 26 is not limited to that of this embodiment.

In the case of this embodiment, holder 241 is pressed against first base 22 by the magnetic force in the mutually attracting direction generated between yoke 26 and first magnet 244*a* fixed to the rear surface of holder 241 (that is, the surface on the Z direction "− side"). Hence, holder 241 is positioned along the Z direction.

In the case of this embodiment, when energization of first actuator 244 is cut, holder 241 returns to the initial position by the magnetic force in the mutually attracting direction generated between first magnet 244*a* and yoke 26. Other structures, acts, and advantageous effects are the same as those of Embodiment 1 described above.

3. Embodiment 3

A camera module according to Embodiment 3 of the present invention will be described with reference to FIGS. 23 to 32. In the case of this embodiment, the structure of prism module 2b is different from that of Embodiment 1 described above. To be specific, the structure of the portion that supports holder 241A in a swingable manner with respect to first base 22a described later is different from that of Embodiment 1.

Meanwhile, the structure of the lens module is the same as that of Embodiment 1. The structure of the camera module according to this embodiment will be described below focusing on the structure of a portion different from that of Embodiment 1.

[3.1 Prism Module]

Prism module 2b of the camera module according to this embodiment includes first cover 21, first base 22a, prism 23, and first shake correction apparatus 24a. The structures of first cover 21 and prism 23 are the same as those in Embodiment 1 described above.

[First Base]

Like first base 22 of Embodiment 1 described above, first base 22a is a box-shaped member that is open on the Z direction "+ side" and the X direction "+ side". Base first opening 220 (see FIG. 25) is formed in bottom wall part 229 of first base 22a on the Z direction "− side".

In the case of this embodiment, first coil 244c and first Hall element 244e of first actuator 244A described later, and spacer 246 described later are disposed in base first opening 220.

First base 22a supports holder 241A (see FIGS. 23, 28, and 29) of first shake correction apparatus 24a, which will be described later, so that it can swing about the first axis parallel to the Y direction. For this purpose, first base 22a has first receiver part 225c and second receiver part 225d (see FIG. 26) for holding swing guide member 245 described later.

First receiver part 225c is provided to first side wall part 224a on the Y direction "+ side" of first base 22a. Second receiver part 225d is provided to first side wall part 224b on the Y direction "− side" of first base 22a.

Such first receiver part 225c and second receiver part 225d have shapes symmetrical with respect to the Y direction. To be specific, first receiver part 225c and second receiver part 225d each have a substantially V-shaped notch that is open on the Z direction "+ side" when viewed in the Y direction.

Further, first receiver part 225c and second receiver part 225d are closed at the center of first base 22a in the Y direction, by stopper surfaces 225e and 225f, respectively. First receiver part 225c and second receiver part 225d are opened on the outer sides of first base 22a in the Y direction (also referred to as width direction), respectively.

First positioning protrusion 226a and second positioning protrusion 227a (see FIGS. 26 and 27) are formed on the end surfaces of first side wall parts 224a and 224b on the Z direction "+ side", respectively. First positioning protrusion 226a and second positioning protrusion 227a engage with a pair of swing support springs 243 (see FIGS. 27 and 30) described later, and position the pair of swing support springs 243.

[First Shake Correction Apparatus]

As in Embodiment 1 described above, first shake correction apparatus 24a swings prism 23 about the first axis parallel to the Y direction, and performs shake correction in the rotational direction about the first axis. Such first shake correction apparatus 24a is disposed in first accommodation space 223 (see FIG. 25).

First shake correction apparatus 24a includes a pair of swing guide members 245, a pair of swing support springs 243, spacer 246, holder 241A, and first actuator 244A.

Also in the case of this embodiment, in first shake correction apparatus 24a, holder 241A is supported by first base 22a in a swingable manner. In this state, holder 241A swings about the first axis by the drive force of first actuator 244A. When first actuator 244A is driven under the control by a control part (not shown), holder 241A and prism 23 swing about the first axis. Hence, the shake in the rotational direction about the first axis is corrected. The structure of each member included in first shake correction apparatus 24a will be described in detail below.

[Swing Guide Member]

The pair of swing guide members 245 is, for example, spheres of ceramic, metal, or synthetic resin. Swing guide member 245, which is one of the pair of swing guide members 245 (that is, the one on the Y direction "+ side"), is disposed in first receiver part 225c of first base 22a. On the other hand, the other swing guide member 245 (that is, the one on the Y direction "− side") is disposed in second receiver part 225d of first base 22a.

In this state, there are two contact points: one swing guide member 245 is in contact with first receiver part 225c, and the other swing guide member 245 is in contact with second receiver part 225d.

The half of the pair of swing guide members 245 in the Z direction "+ side" is swing guide surface 245a (also referred to as a swing guide part). Swing guide surface 245a protrudes toward the Z direction "+ side" of first receiver part 225c and second receiver part 225d.

The end of each swing guide surface 245a on the Z direction "+ side" is on the Z direction "+ side" with respect to portions of the end surfaces, other than first positioning protrusion 226a and second positioning protrusion 227a, of first side wall parts 224a and 224b on the Z direction "+ side".

Swing guide member 245 is not limited to a sphere, and may be, for example, a hemisphere, a cylinder, or a half cylinder. Swing guide member 245 may be integrated with first base 22a. In other words, the swing guide member may be a part of first base 22a.

[Swing Support Spring]

The pair of swing support springs 243 supports holder 241A, which will be described later, so that it is swingable with respect to first base 22a. Swing support springs 243 in a pair are metal leaf springs and are disposed on the Z direction "+ side" of the respective swing guide members 245 in a pair.

Swing support springs 243, which is one of the pair of swing support springs 243 (that is, the one on the Y direction "+ side") will be described below. The other swing support spring 243 (that is, the one on the Y direction "− side") is symmetrical with the one swing support spring 243 with respect to the Y direction.

Figure 30:
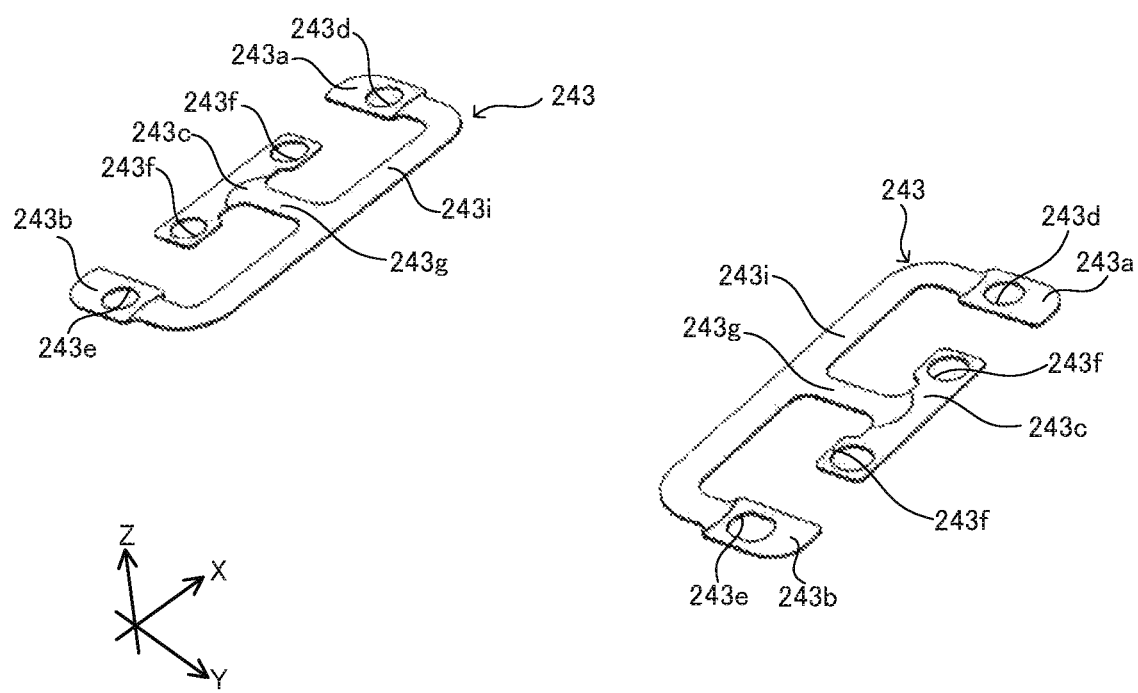
FIG. 30 is a perspective view showing a swing support spring removed in the assembled state.
Figure 31:
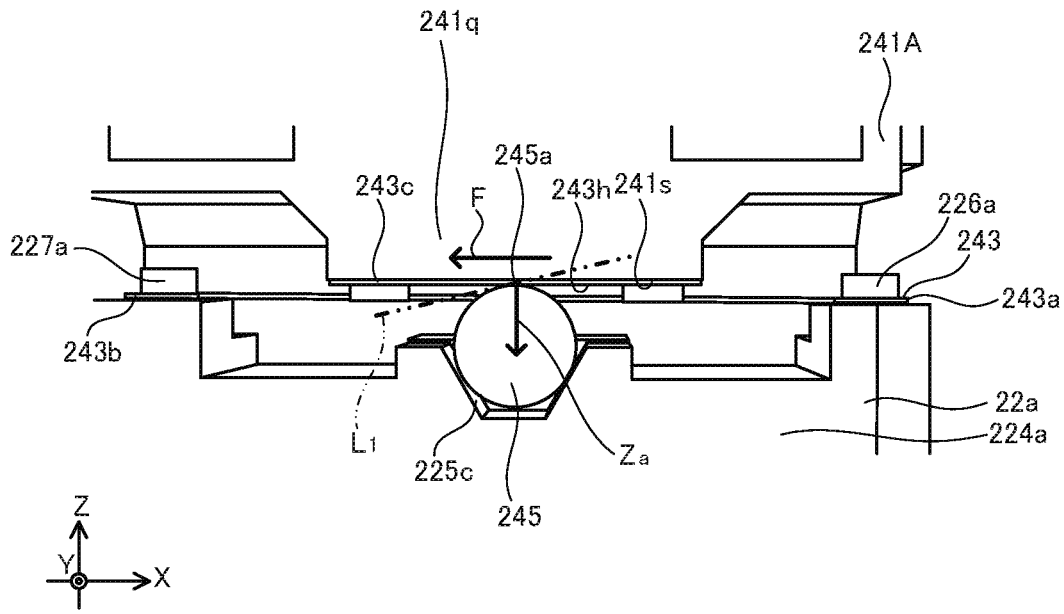
FIG. 31 is a partial side view seen from the right side of FIG. 29.
Figure 32:
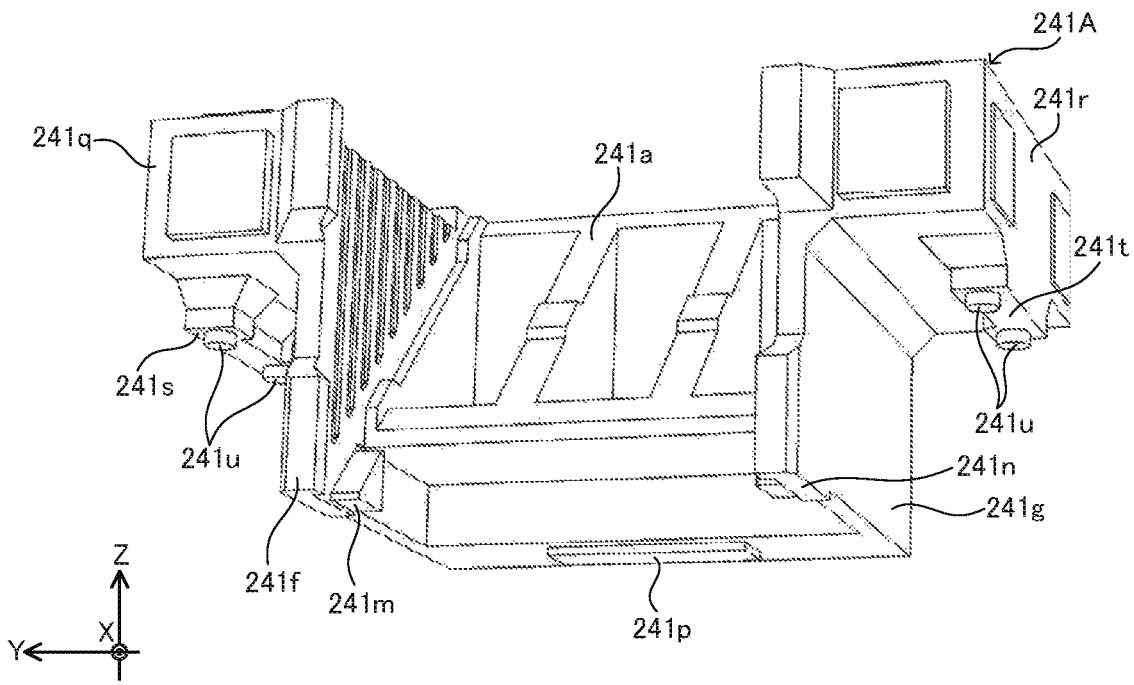
FIG. 32 is a perspective view of a holder.

As shown in FIGS. 30 and 31, the one swing support spring 243 has a pair of first locking parts 243a and 243b, second locking part 243c, twist allowing part 243g, and spring side guide surface 243h.

First locking part 243a, which is one of the pair of first locking parts 243a and 243b (that is, the one on the X direction "+ side"), is provided at the end of the one swing support spring 243 on the X direction "+ side". Such first locking part 243a, which is one of the pair, has first through hole 243d.

First locking part 243b, which is the other of the pair (that is, the one on the X direction "– side"), is provided at the end of the one swing support spring 243 on the X direction "– side". Such first locking part 243b, which is the other of the pair, has first through hole 243e. First locking parts 243a and 243b in a pair are made continuous by continuous part 243i extending in the X direction.

The surfaces of the pair of first locking parts 243a and 243b on the Z direction "– side" are bonded and fixed to the end surfaces of first side wall part 224a of first base 22a on the Z direction "+ side". In this state, first positioning protrusion 226a of first base 22a is inserted through first through hole 243d, and second positioning protrusion 227a of first base 22a is inserted through first through hole 243e.

In the case of the other swing support spring 243 (on the Y direction "– side"), the surfaces of the pair of first locking parts 243a and 243b on the Z direction "– side" are bonded and fixed to the end surfaces of first side wall part 224b of first base 22a on the Z direction "+ side".

Second locking part 243c is provided between first locking parts 243a and 243b in the X direction with gaps therebetween in the X direction. Second locking part 243c has a pair of second through holes 243f.

The surface of second locking part 243c on the Z direction "+ side" is bonded and fixed to spring seat surface 241s (see FIG. 32) of holder 241A described later. In this state, a pair of holder-side positioning protrusions 241u (see FIG. 32) of holder 241A are inserted through the pair of second through holes 243f, respectively. In the case of the other swing support spring 243 (on the Y direction "– side"), the surface of second locking part 243c on the Z direction "+ side" is bonded and fixed to spring seat surface 241t of holder 241A.

Twist allowing part 243g is a plate-like member extending in the Y direction, and connects the intermediate portion of continuous part 243i in the X direction and second locking part 243c. By being twisted, such twist allowing part 243g allows second locking part 243c to twist with respect to first locking parts 243a and 243b.

Further, twist allowing part 243g allows relative displacement in the Z direction between first locking parts 243a and 243b and second locking part 243c by elastic deformation.

Spring side guide surface 243h is the rear surface of second locking part 243c (that is, the surface on the Z direction "– side"). Such spring side guide surface 243h is in contact with swing guide surface 245a of swing guide member 245.

Swing support springs 243 in a pair are plate members that are entirely flat in a free state (also referred to as a non-assembled state). Meanwhile, in the assembled state, in the pair of swing support springs 243, second locking part 243c is positioned on the Z direction "+ side" with respect to first locking parts 243a and 243b according to the elastic deformation of twist allowing part 243g (see FIG. 31).

To be specific, in the assembled state, twist allowing part 243g is elastically deformed so as to be more on the Z direction "+ side" toward second locking part 243c. Spring side guide surface 243h of the pair of swing support springs 243 urges swing guide member 245 toward the Z direction "– side" according to such elastic deformation.

[Spacer]

Spacer 246 is disposed in bottom groove 229a (see FIGS. 26 and 29) formed in the surface (that is, the bottom surface) of bottom wall part 229 of first base 22a on the Z direction "– side". Such spacer 246 prevents first magnet 244f and first coil 244c from colliding in the Z direction.

To be specific, spacer 246 is a plate-like member and has spacer-side through hole 246a in which first coil 244c of first actuator 244A, which will be described later, can be disposed.

A part of spacer 246 is disposed between first coil 244c of first actuator 244A described later and base first opening 220 (see FIGS. 25 and 26).

Figure 25:
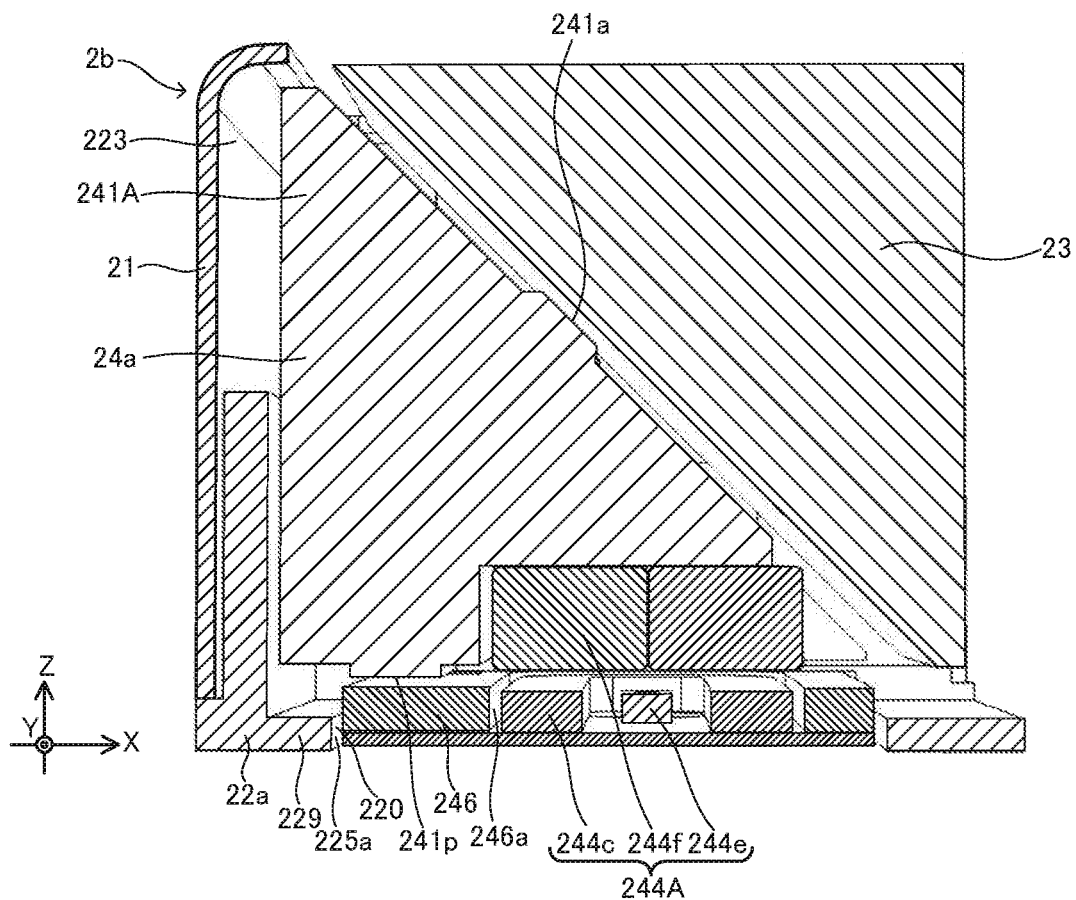
FIG. 25 is a sectional view of the prism module taken along line A-A in FIG. 1A.
Figure 26:
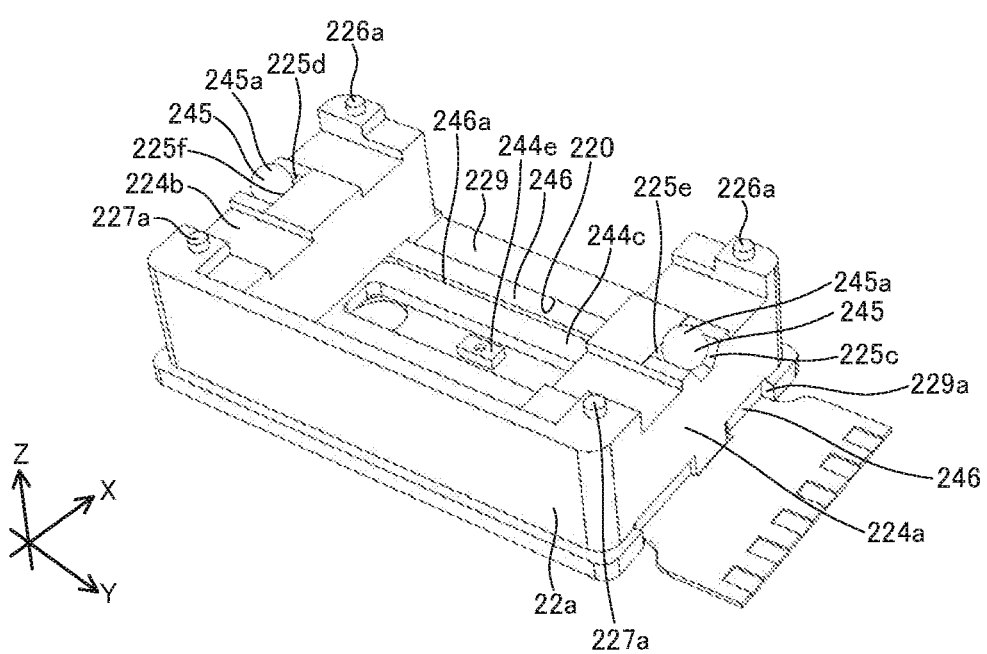
FIG. 26 is a perspective view showing the state in which some members are assembled to a first base.
Figure 27:
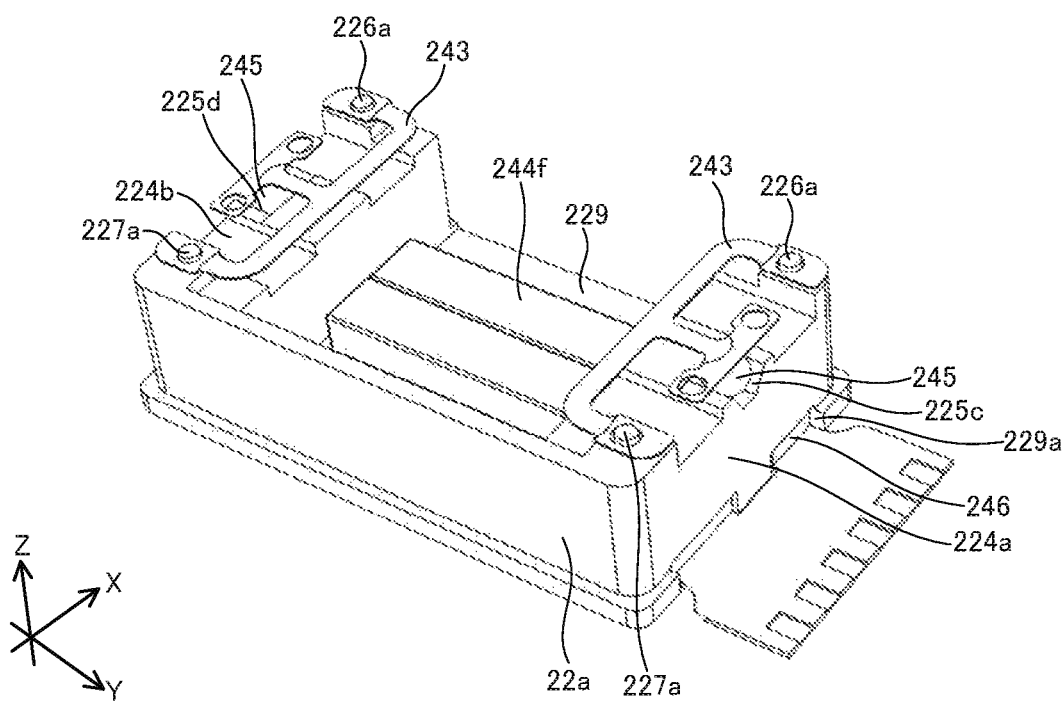
FIG. 27 is a perspective view showing the state in which a swing support spring is assembled to the first base in the state shown in FIG. 26.
Figure 28:
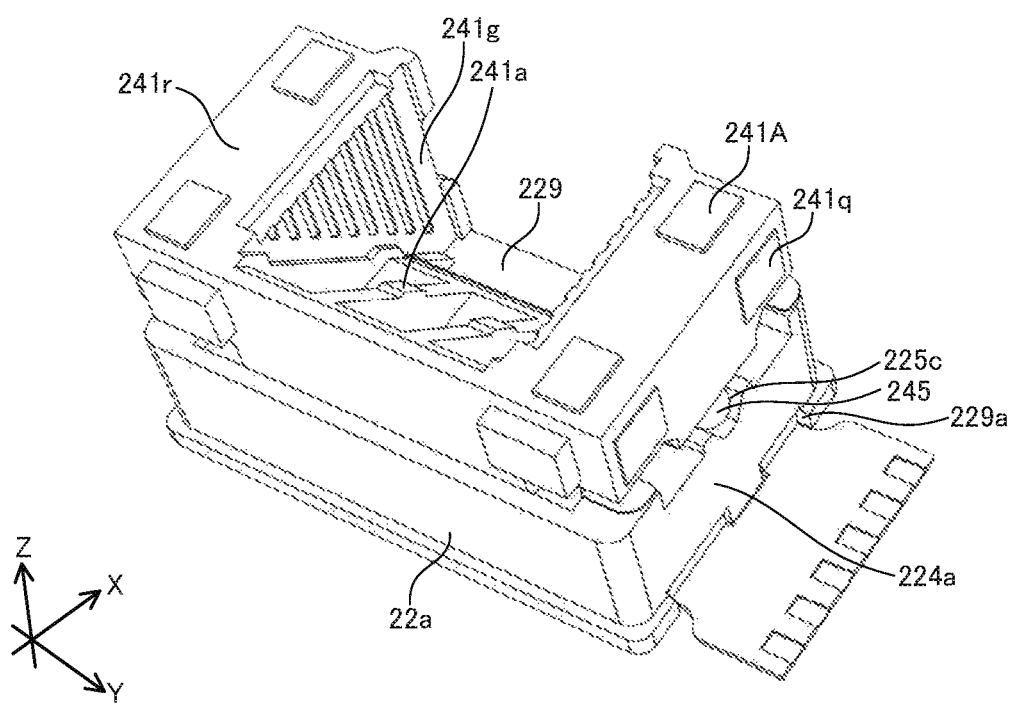
FIG. 28 is a perspective view of the prism module from which a first cover and a prism are omitted.
Figure 29:
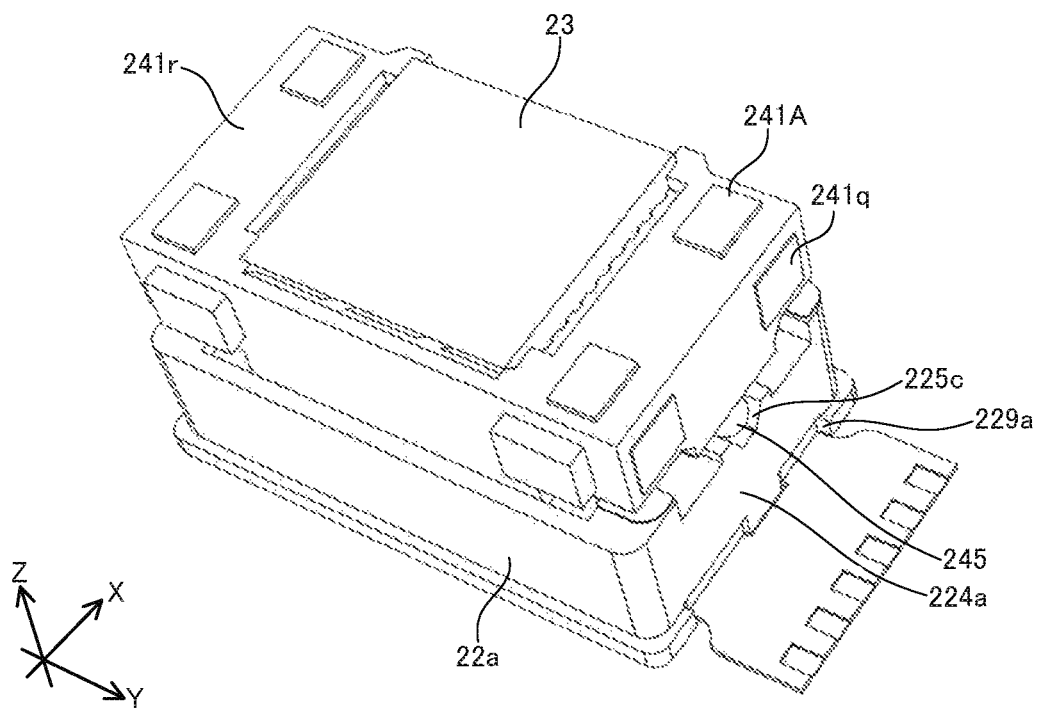
FIG. 29 is a perspective view of the prism module from which the first cover is omitted.

The surface (also referred to as a collision prevention surface) of the portion (also referred to as a collision prevention portion) on the Z direction "+ side" disposed around first coil 244c in spacer 246 is on the Z direction "+ side" with respect to the surface of first coil 244c on the Z direction "+ side" (see FIG. 25).

The collision prevention surface is opposed to collision prevention protrusions 241m, 241n, and 241p (see FIGS. 25 and 32) of holder 241A, which will be described later, in the Z direction.

In this state, a gap that exists between the collision prevention surface and collision prevention protrusions 241m, 241n, and 241p in the Z direction is smaller than the gap that exists between first magnet 244f and first coil 244c of first actuator 244A in the Z direction.

Accordingly, even when first magnet 244f is displaced toward the Z direction "– side" together with holder 241A described later, collision prevention protrusions 241m, 241n, and 241p come into contact with spacer 246 before first magnet 244f comes into contact with first coil 244c. Hence, the collision between first magnet 244f and first coil 244c is prevented. Note that spacer 246 may be omitted. Although not shown in the drawings, when spacer 246 is omitted, a part of the surface of bottom wall part 229 of first base 22a (that is, the front surface) (also referred to as a collision prevention surface) on the Z direction "+ side" is located on the Z direction "+ side" with respect to the surface of first coil 244c on the Z direction "+ side". In this case, the positions of collision prevention protrusions 241m, 241n, and 241p (see FIGS. 25 and 32) of holder 241A described later are adjusted, and the collision prevention surface and collision prevention protrusions 241m, 241n, and 241p are opposed to each other in the Z direction. Consequently, the contact between first magnet 244f and first coil 244c is prevented.

[Holder]

Holder 241A (see FIGS. 29 and 32) is made of, for example, a synthetic resin and holds prism 23 in such a state that it is swingable with respect to first base 22a.

Holder 241A includes mounting surface 241a, a pair of opposing wall parts 241f and 241g, a plurality of collision prevention protrusions 241m, 241n, and 241p, and a pair of overhang parts 241q and 241r. The configurations of mounting surface 241a and the pair of opposing wall parts 241f and 241g are substantially the same as those in holder 241 of Embodiment 1 described above.

The plurality of collision prevention protrusions 241m, 241n, and 241p are respectively provided in a plurality of positions (three positions in this embodiment) on the rear surface (that is, the surface on the Z direction "– side") of holder 241A. Note that the position of the collision prevention protrusion is not limited to the position according to this embodiment.

The front end surfaces (that is, the end surfaces on the Z direction "– side") of collision prevention protrusions 241m, 241n, and 241p are located on the Z direction "– side" with respect to the other parts of holder 241A. The front end surfaces of such collision prevention protrusions 241m, 241n, and 241p are opposed to the surface of spacer 246 (that is, the surface on the Z direction "+ side") in the Z direction with a gap therebetween.

The pair of overhang parts 241q and 241r are provided on the pair of opposing wall parts 241f and 241g, respectively. Each of the pair of overhang parts 241q and 241r supports holder 241A so that it is swingable with respect to first base 22a.

To be specific, overhang part 241q, which is one of the pair (that is, the one on the Y direction "+ side"), is provided on the Y direction "+ side" surface of opposing wall part 241f so as to overhang from the side surface toward the Y direction "+ side".

On the other hand, overhang part 241r, which is the other of the pair (that is, the one on the Y direction "− side"), is provided on the Y direction "− side" surface of opposing wall part 241g so as to overhang from the side surface toward the Y direction "− side".

The pair of overhang parts 241q and 241r have flat spring seat surfaces 241s and 241t on the rear surface (that is, the surface on the Z direction "− side"), respectively.

A pair of holder-side positioning protrusions 241u protruding toward the Z direction "− side" are formed in two positions of spring seat surfaces 241s and 241t separated in the X direction.

The surfaces of second locking parts 243c of the pair of swing support springs 243 on the Z direction "+ side" are bonded and fixed to spring seat surfaces 241s and 241t, respectively. In this state, the pair of holder-side positioning protrusions 241u are inserted through the pair of second through holes 243f of swing support spring 243, respectively. With this structure, holder 241A is supported so that it is swingable with respect to first base 22a.

[First Actuator]

First actuator 244A swings holder 241A about the first axis. In the case of this embodiment, the first axis is a straight line parallel to the Y axis that passes through a contact between swing guide surfaces 245a of the pair of swing guide members 245 and spring side guide surfaces 243h of the pair of swing support springs 243.

As in Embodiment 1 described above, first actuator 244A is disposed behind prism 23 and holder 241A (that is, on the Z direction "− side") so as to overlap optical path bending surface 231 of prism 23 and holder 241A in the Z direction (that is, the direction of the first optical axis). Also in this embodiment, the direction of the first optical axis corresponds to the first direction.

Also in this embodiment, first actuator 244A includes first magnet 244f, first coil 244c, and first Hall element 244e.

First magnet 244f is fixed to the rear surface of holder 241A (that is, the surface on the Z direction "− side") which is a movable member. In the case of this embodiment, first magnet 244f is composed of two magnet elements adjacent in the X direction. These magnet elements are each magnetized in the Z direction and have one magnetic pole on one side. The direction of the magnetic pole of each magnet element is opposite to each other.

In first magnet 244f described above, the non-magnetized portion at the center of first magnet 244f in the X direction can be made smaller than that in a structure having two magnetic poles on one side as in Embodiment 1 described above.

First coil 244c and first Hall element 244e are fixed to the front surface of a flexible printed circuit board (hereinafter referred to as FPC) 25 (that is, the surface on the Z direction "+ side") fixed to the rear surface of first base 22a.

First coil 244c and first Hall element 244e are disposed in base first opening 220 (see FIGS. 25 and 26) of first base 22a. In the case of this embodiment, first coil 244c is a so-called air-core coil having an oval shape. First Hall element 244e is disposed on the inner side in the radial direction of first coil 244c. Spacer 246 is disposed outside first coil 244c.

First actuator 244A having the above configuration swings holder 241A about the first axis under the control by a camera shake correction control part (not shown), as in Embodiment 1 described above.

The operation performed when holder 241A swings about the first axis will be described below with reference to FIG. 31.

When current flows through first coil 244c, first actuator 244A generates a Lorentz force that displaces first magnet 244f in the X direction. Since first magnet 244f is fixed to holder 241A, a force that displaces holder 241A in the X direction (for example, the direction indicated by arrow F in FIG. 31) acts on holder 241A by the Lorentz force.

By the way, as described above, spring side guide surfaces 243h of the pair of swing support springs 243 fixed to holder 241A pressurize the respective swing guide surfaces 245a of the pair of swing guide members 245 toward the Z direction "− side" (the direction indicated by arrow $Z_a$ in FIG. 31).

The pressurization described above causes a tilt indicated by two-dot chain line $L_1$ in FIG. 31 (that is, rolling on swing guide surfaces 245a). For convenience of explanation, the inclination angle of two-dot chain line $L_1$ is exaggerated from the actual inclination angle of each spring side guide surface 243h.

At this time, each twist allowing part 243g of the pair of swing support springs 243 is twisted so as to allow the inclination of each spring side guide surface 243h. As described above, when each spring side guide surface 243h is inclined, holder 241A swings about the first axis.

Note that adjusting the direction of the current flowing through first coil 244c changes the displacement direction of holder 241A. When the energization of first actuator 244A is cut off, holder 241A returns to the initial position according to the elastic force of the pair of swing support springs 243. The initial position of holder 241A is the state where holder 241A is not swinging. Other structures, acts, and advantageous effects are the same as those of Embodiment 1 described above.

4. Embodiment 4

Figure 33:
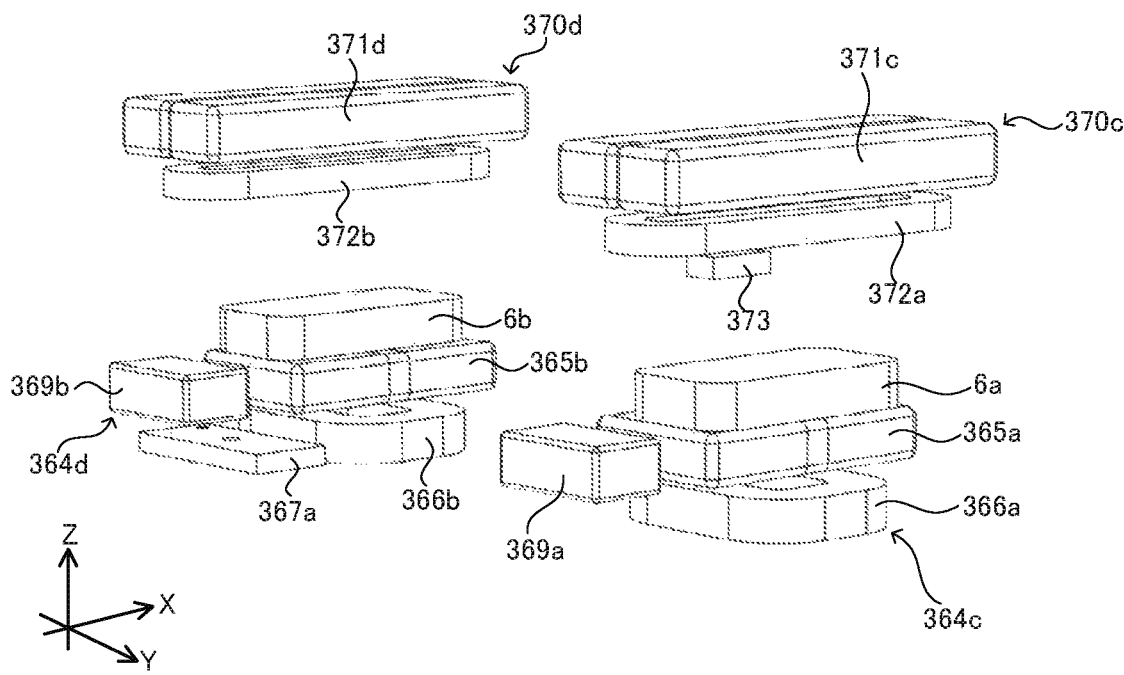
FIG. 33 is a perspective view showing a removed second actuator and AF actuator of a camera module according to Embodiment 4.

A camera module according to Embodiment 4 of the present invention will be described with reference to FIG. 33. In the case of this embodiment, the structure of the lens module is different from that of Embodiment 1 described above. In particular, in the case of this embodiment, the structures of the pair of AF actuators 364c and 364d and the pair of second actuators 370c and 370d constituting the lens module are different from those of Embodiment 1 described above.

A pair of AF actuators 364c and 364d described later is mainly different from that of Embodiment 1 in the structures of AF magnets 365a and 365b, the positioning of AF Hall element 367a, and additionally provided second AF magnets 369a and 369b. The pair of second actuators 370c and 370d is different from that of Embodiment 1 in the structures of second magnets 371c and 371d and the positioning of second Hall element 373.

The structures of the pair of AF actuators 364c and 364d and the pair of second actuators 370c and 370d will be described below with reference to FIG. 33. FIG. 33 is a perspective view showing only the removed pair of AF actuators 364c and 364d and a pair of second actuators 370c and 370d.

Although not shown in the drawings, the structure of the lens guide is also different from lens guide 361 (see FIGS. 11 and 16) of Embodiment 1 described above.

The structure of the lens guide will be briefly described together with the pair of AF actuators 364c and 364d and the pair of second actuators 370c and 370d. The structure of the lens module other than the pair of AF actuators 364c and 364d, the pair of second actuators 370c and 370d, and the lens guide is substantially the same as lens module 3 of Embodiment 1.

Note that the structure of the prism module is the same as that of Embodiments 1-3 described above. The structure of the camera module according to this embodiment will be described below focusing on the structure of a portion different from that of Embodiment 1 described above.

[4.1 AF Actuator]

Each of the pair of AF actuators 364c and 364d is a third actuator for autofocusing. One AF actuator 364c (that is, the one on the Y direction "+ side") includes AF magnet 365a, AF coil 366a, and second AF magnet 369a.

On the other hand, the other AF actuator 364d (that is, the one on the Y direction "− side") includes AF magnet 365b, AF coil 366b, AF Hall element 367a, and second AF magnet 369b.

Note that the structures and positioning of AF magnets 365a and 365b and AF coils 366a and 366b are the same as those in Embodiment 1 described above. AF actuators 364c and 364d in a pair are symmetrical with respect to the Y direction except for AF Hall element 367a. For this reason, the description of the same structure as in Embodiment 1 will be omitted, and only the structures and positioning of AF Hall element 367a and second AF magnet 369b in the other AF actuator 364d will be described below.

AF Hall element 367a of the other AF actuator 364d incorporates a device driver for the AF apparatus. Such AF Hall element 367a is disposed in the vicinity of AF coil 366b and on the X direction "− side" with respect to AF coil 366b.

AF Hall element 367a is directly fixed to FPC (not shown) by solder. Further, a reinforcing plate (not shown) is provided on the rear surface of a portion of an FPC (not shown) where AF Hall element 367a is fixed. Note that AF Hall element 367a may be fixed to the FPC via a board (not shown). In this case, the aforementioned reinforcing plate may be omitted.

Second AF magnet 369b is a magnet different from AF magnet 365b. To be specific, second AF magnet 369b is magnetized in the Z direction and has one magnetic pole on one side.

Second AF magnet 369b faces AF Hall element 367a in the Z direction in the vicinity of AF magnet 365b and on the X direction "− side". Such second AF magnet 369b increases the density of the magnetic flux that passes through AF Hall element 367a. Note that second AF magnet 369b is also held by a holding part provided to a lens guide (not shown).

[4.2 Second Actuator]

Second actuator 370c, which is one of the pair of second actuators 370c and 370d (that is, the one on the Y direction "+ side"), faces one AF actuator 364c (that is, the one on the Y direction "+ side") in the Z direction with a predetermined gap therebetween. The one second actuator 370c includes second magnet 371c, second coil 372a, and second Hall element 373.

On the other hand, the other second actuator 370d (that is, the one on the Y direction "− side") faces the other AF actuator 364d (that is, the one on the Y direction "− side") in the Z direction with a predetermined gap therebetween. The other second actuator 370d includes second magnet 371d and second coil 372b.

Note that the structures and positioning of second coils 372a and 372b are the same as those in Embodiment 1 described above. Second actuators 370c and 370d in a pair are symmetrical with respect to the Y direction except for second Hall element 373. For this reason, the description of the same structure as in Embodiment 1 will be omitted, and only the structures and positioning of second magnet 371c and second Hall element 373 in the one second actuator 370c will be described below.

Second magnet 371c in the one second actuator 370c is composed of two magnet elements adjacent in the Y direction. Each magnet element is a rectangular parallelepiped that is long in the X direction, and is magnetized in the Z direction. The direction of the magnetic pole of each magnet element is opposite to each other. Note that second magnet 371c is held by a holding part provided to a lens guide (not shown).

Second Hall element 373 is disposed in the vicinity of second coil 372a and on the Z direction "− side" with respect to second coil 372a. Second Hall element 373 is directly fixed to an FPC (not shown) by solder. Such positioning of second Hall element 373 allows second coil 372a to be made large. If large second coil 372a is employed, the output of second shake correction apparatus 37 increases.

[4.3 Notes]

Magnetic metal shield plate 6a and 6b are provided between second magnets 371c and 371d and AF magnets 365a and 365b in the Z direction. Hence, crosstalk between the pair of second actuators 370c and 370d and the pair of AF actuators 364c and 364d is prevented. Other structures, acts, and advantageous effects are the same as those of Embodiment 1 described above.

5. Embodiment 5

Figure 34:
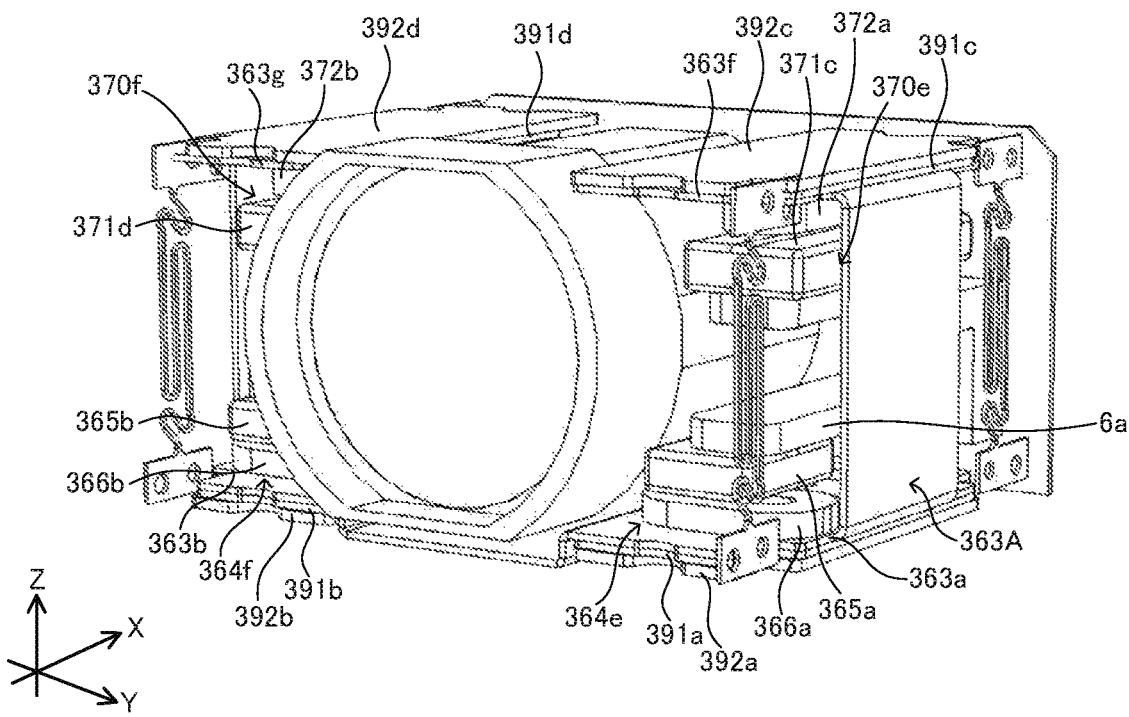
FIG. 34 is a perspective view showing the lens module of a camera module according to Embodiment 5, from which some members are omitted.
Figure 35:
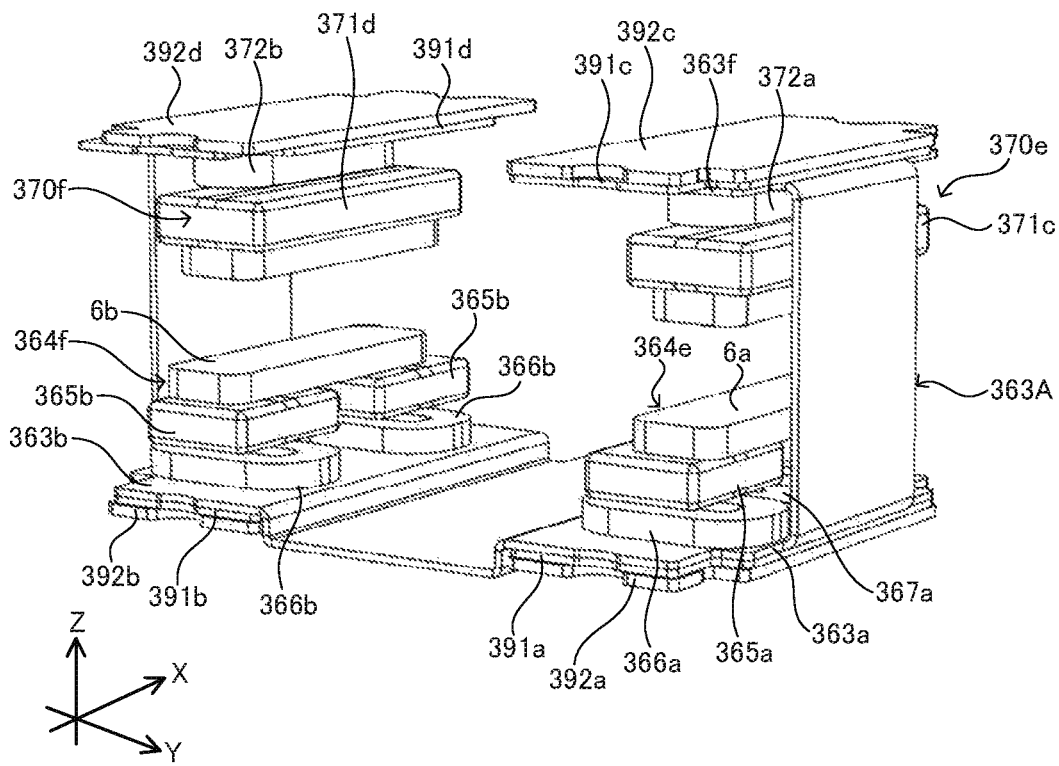
FIG. 35 is a perspective view showing second actuator, AF actuator, reinforcing plate, and FPC removed.
Figure 36:
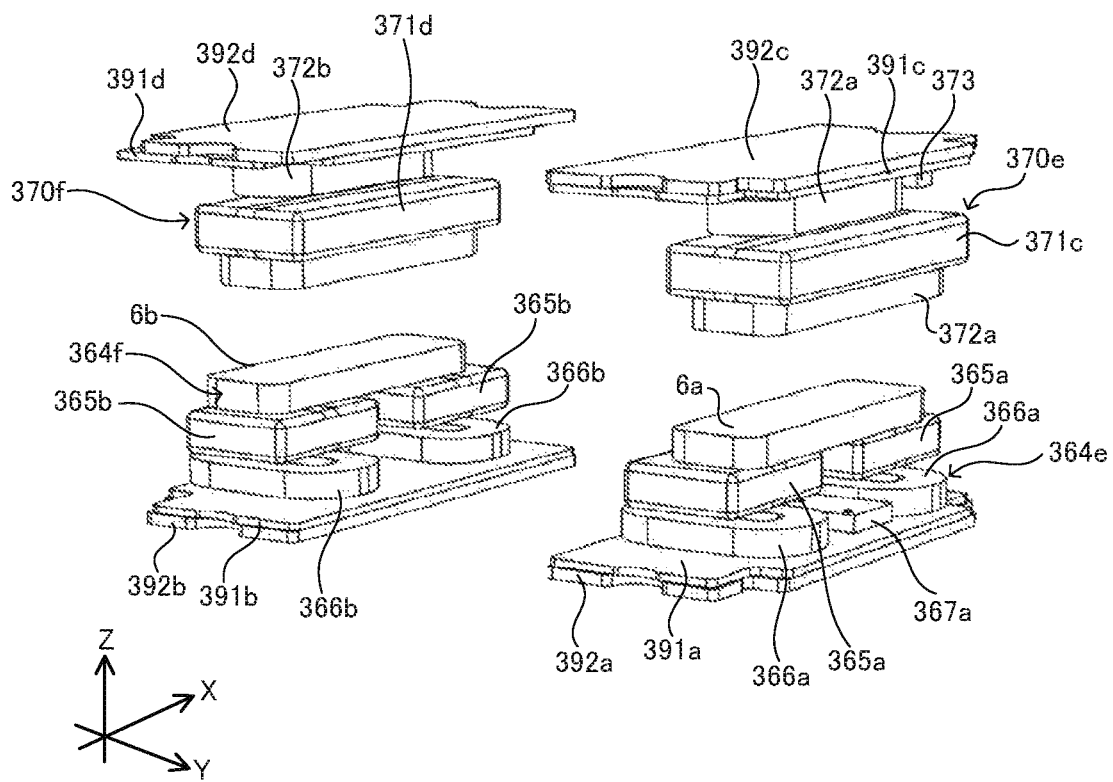
FIG. 36 is a perspective view showing the second actuator, the AF actuator, and the reinforcing plate removed.

A camera module according to Embodiment 5 of the present invention will be described with reference to FIGS. 34 to 36. In the case of this embodiment, the structure of the lens module is different from that of Embodiment 1 described above. In particular, in the case of this embodiment, the structures of the pair of AF actuators 364e and 364f, the pair of second actuators 370e and 370f, and FPC 363A constituting the lens module are different from those of Embodiment 1.

A pair of AF actuators 364e and 364f is mainly different from that of Embodiment 1 in the structures and the number of AF magnets 365a and 365b, the number of AF coils 366a and 366b, and positioning of AF Hall element 367a.

[5.1 AF Actuator]

Each of the pair of AF actuators 364e and 364f is a third actuator for autofocusing. One AF actuator 364e (that is, the one on the Y direction "+ side") includes a pair of AF magnets 365a, a pair of AF coils 366a, and AF Hall element 367a.

On the other hand, the other AF actuator 364f (that is, the one on the Y direction "− side") includes a pair of AF magnets 365b and a pair of AF coils 366b.

Note that AF actuators 364e and 364f in a pair are symmetrical with respect to the Y direction except for AF Hall element 367a. Therefore, only the structure and positioning of one AF actuator 364e will be described below.

In one AF actuator 364e, the pair of AF magnets 365a are adjacent to each other but separated in the X direction. Each of the pair of AF magnets 365a may have a structure in which two magnet elements having one magnetic pole on one side are combined. Alternatively, each of the pair of AF magnets 365a may have two magnetic poles on one side. Each of such a pair of AF magnets 365a is held by a holding part of a lens guide (not shown).

The pair of AF coils 366a are adjacent to each other but separated in the X direction. Such AF coils 366a in a pair are disposed on the Z direction "− side" of the respective AF magnets 365a in a pair. In this state, AF coils 366a in a pair are opposed to the respective AF magnets 365a in a pair in the Z direction with a predetermined gap therebetween.

To be specific, each of the pair of AF coils 366a is a so-called air-core coil having an oval shape. A pair of AF coils 366a is directly fixed to first coil fixed parts 363a of FPC 363A in a state where the major axis coincides with the Y direction.

Note that first reinforcing plate 391a is provided on the rear surface of first coil fixed part 363a in FPC 363A. In FPC 363A, first reinforcing plate 391b is provided on the rear surface of first coil fixed part 363b to which the pair of AF coils 366b of the other AF actuator 364f is fixed. Second reinforcing plate 392a made of a nonmagnetic material is provided on the rear surface of first reinforcing plate 391a. Second reinforcing plate 392b made of a nonmagnetic material is provided on the rear surface of first reinforcing plate 391b. Note that second reinforcing plates 392a and 392b may be made of a magnetic material. The magnetic second reinforcing plates 392a and 392b contribute to an improvement in the density of the magnetic flux that passes through AF coils 366a and 366b, respectively.

AF Hall element 367a incorporates a device driver for the AF apparatus. Such AF Hall element 367a is disposed between the pair of AF coils 366a. Such AF Hall element 367a is directly fixed to the front surface of first coil fixed part 363a of FPC 363A by solder.

Note that the pair of AF actuators 364e and 364f may be replaced with the pair of AF actuators 364c and 364d of Embodiment 4 described above.

[5.2 Second Actuator]

Second actuator 370e, which is one of the pair of second actuators 370e and 370f (that is, the one on the Y direction "+ side"), faces one AF actuator 364e in the Z direction with a predetermined gap therebetween. Such second actuator 370e includes second magnet 371c, second coil 372a, and second Hall element 373.

On the other hand, the other second actuator 370f (that is, the one on the Y direction "− side") has second magnet 371d and second coil 372b.

Note that the structures of second magnets 371c and 371d, second coils 372a and 372b, and second Hall element 373 are the same as those in Embodiment 4 described above. However, in the case of this embodiment, the positioning of these members is different from that of Embodiment 4 described above.

Second actuators 370e and 370f in a pair are symmetrical with respect to the Y direction except for second Hall element 373. For this reason, the description of the same portions as in Embodiment 4 described above will be omitted, and portions of one second actuator 370e different from those in Embodiment 4 described above will be described.

Second coil 372a of one second actuator 370e is provided on the Z direction "+ side" with respect to second magnet 371c. Second coil 372a is fixed to the rear surface of second coil fixed part 363f of FPC 363A.

First reinforcing plate 391c is provided on the front surface of second coil fixed part 363f in FPC 363A. Note that in FPC 363A, first reinforcing plate 391d is provided on the surface of second coil fixed part 363g to which second coil 372b of the other second actuator 370f is fixed. Second reinforcing plate 392c made of a nonmagnetic material is provided on the surface of first reinforcing plate 391c. Second reinforcing plate 392d made of a nonmagnetic material is provided on the surface of first reinforcing plate 391d. Note that second reinforcing plates 392c and 392d may be made of a magnetic material. Magnetic second reinforcing plates 392c and 392d contribute to an improvement in the density of the magnetic flux that passes through second coils 372a and 372b, respectively.

Second Hall element 373 is disposed in the vicinity of second coil 372a and on the X direction "+ side" with respect to second coil 372a.

[5.3 Notes]

A pair of shield plates 6a and 6b made of magnetic metal is disposed between second magnet 371c and AF magnet 365a, and between second magnet 371d and AF magnet 365b in the Z direction, respectively. Hence, crosstalk between the pair of second actuators 370e and 370f and the pair of AF actuators 364e and 364f is prevented. Other structures, acts, and advantageous effects are the same as those of Embodiment 1 described above.

6. Embodiment 6

Figure 37:
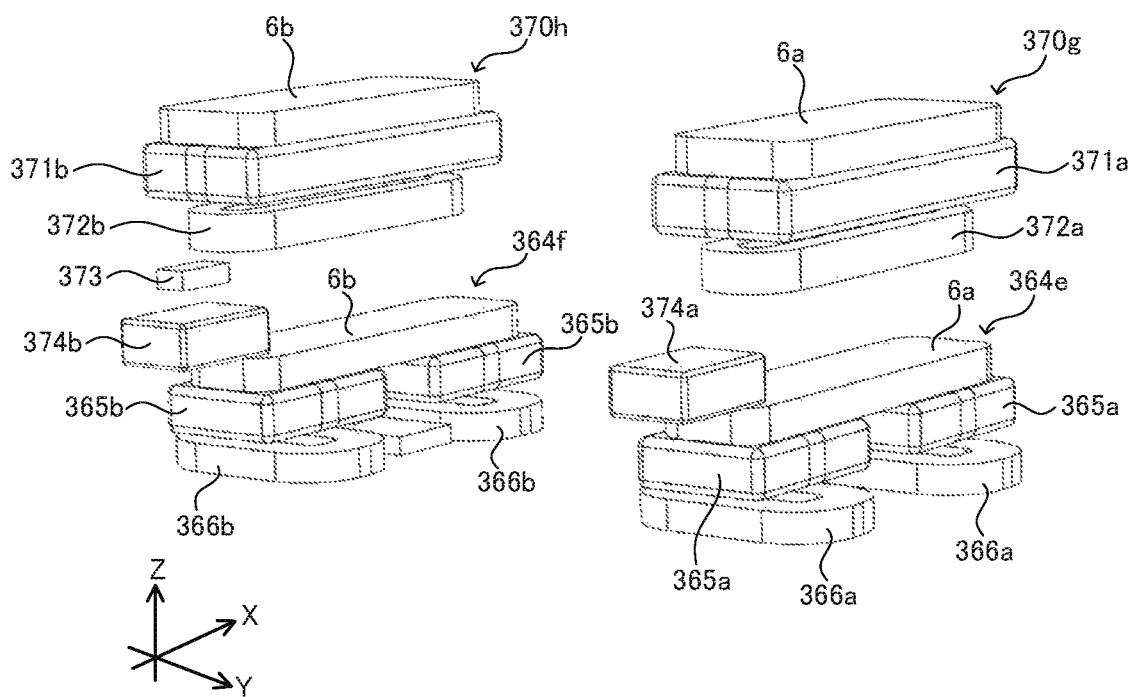
FIG. 37 is a perspective view showing a removed second actuator and AF actuator of a camera module according to Embodiment 6.

A camera module according to Embodiment 6 of the present invention will be described with reference to FIG. 37. In the case of this embodiment, the structures of the pair of AF actuators 364e and 364f are substantially the same as those of Embodiment 5 described above except that the position of AF Hall element 367a is exchanged between the pair of AF actuators 364e and 364f. Therefore, detailed description of the pair of AF actuators 364e and 364f will be omitted.

[6.1 Second Actuator]

Second actuator 370g, which is one of the pair of second actuators 370g and 370h (that is, the one on the Y direction "+ side"), includes second magnet 371a, second coil 372a, and third magnet 374a.

On the other hand, the other second actuator 370h (that is, the one on the Y direction "− side") includes second magnet 371b, second coil 372b, second Hall element 373, and third magnet 374b.

The structures and positioning of second magnets 371a and 371b and second coils 372a and 372b are the same as those in Embodiment 1 described above. Second actuators 370g and 370h in a pair are symmetrical with respect to the Y direction except for second Hall element 373. For this reason, the description of the same portions as in Embodiment 1 described above will be omitted, and only the structures and positioning of second Hall element 373 and third magnet 374b in the other second actuator 370h will be described. Note that second magnets 371a and 371b may have a structure in which two magnet elements having one magnetic pole on one side are combined. Alternatively, second magnets 371a and 371b may have two magnetic poles on one side.

Second Hall element 373 of the other second actuator 370h is disposed on the Z direction "− side" and the X direction "− side" with respect to second coil 372b. Such second Hall element 373 is fixed to an FPC (not shown).

Third magnet 374b of the other second actuator 370h is a magnet different from second magnet 371b. To be specific, third magnet 374b is magnetized in the Y direction and has one magnetic pole on one side. Such third magnet 374b is disposed on the Z direction "− side" with respect to second Hall element 373 and is opposed to second Hall element 373 in the Z direction. Third magnet 374b is held by a holding part provided to a lens guide (not shown).

[6.2 Notes]

In the case of this embodiment, magnetic metal shield plates (also referred to as yokes) 6a and 6b are disposed in positions adjacent to the second magnets 371a and 371b on the Z direction "+ side". Such shield plates 6a and 6b function as yokes of second magnets 371a and 371b. Other structures, acts, and advantageous effects are the same as those of Embodiment 1 described above.

7. Embodiment 7

Figure 38:
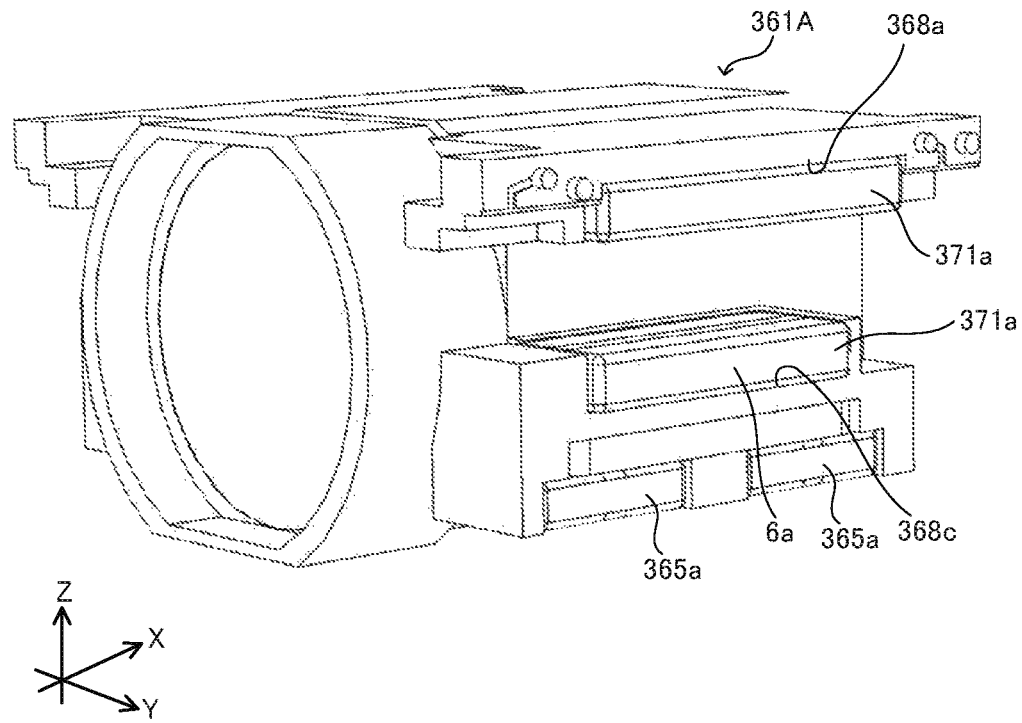
FIG. 38 is a perspective view showing a lens module of a camera module according to Embodiment 7, from which some members are omitted.
Figure 39:
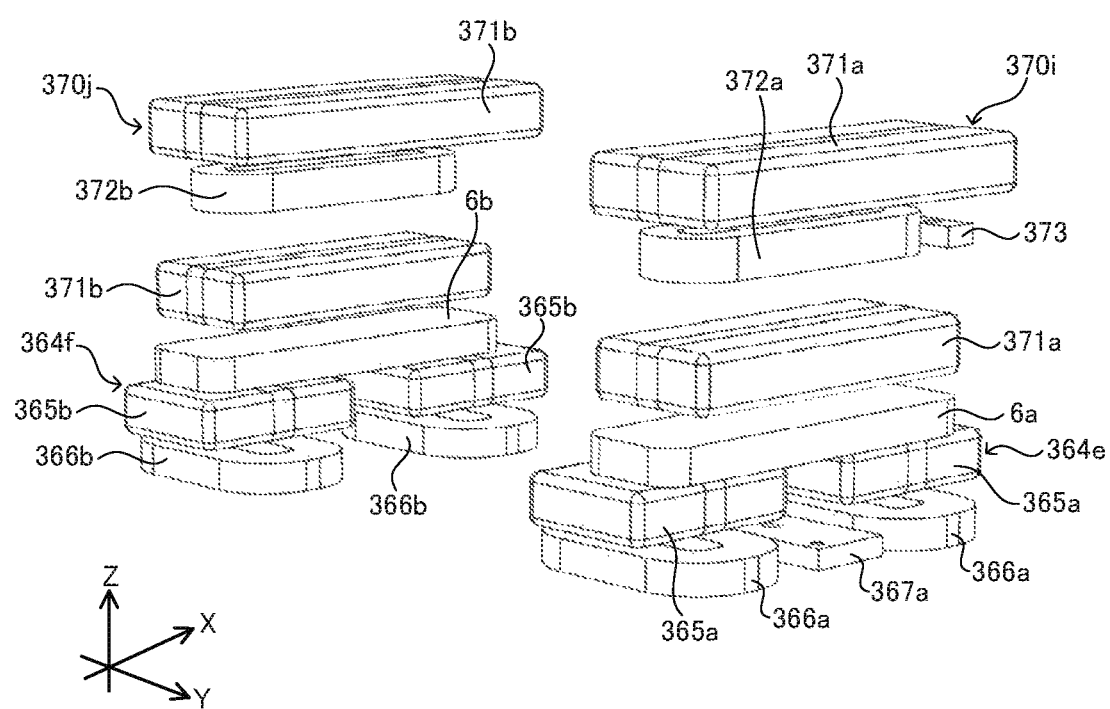
FIG. 39 is a perspective view showing a second actuator and the AF actuator removed.

A camera module according to Embodiment 7 of the present invention will be described with reference to FIGS. 38 and 39. In the case of this embodiment, the structure of the pair of AF actuators 364e and 364f is substantially the same as that of Embodiment 5 described above.

[7.1 Second Actuator]

Second actuator 370i, which is one of the pair of second actuators 370i and 370j on the Y direction "+ side", includes a pair of second magnets 371a, second coil 372a, and second Hall element 373. In the case of this embodiment, the number of second magnets 371a is increased by one from that in the structure of Embodiment 1 described above. The structures of these members are the same as those in Embodiment 1.

Each of the pair of second magnets 371a and the pair of second magnets 371b described later may have a structure in which two magnet elements having one magnetic pole on one side are combined. Alternatively, each of the pair of second magnets 371a and the pair of second magnets 371b may have two magnetic poles on one side.

Such a pair of second magnets 371a is disposed so as to sandwich second coil 372a from the Z direction with a predetermined gap therebetween. One second magnet 371a (that is, the one on the Z direction "+ side") is held by one second magnet holding part 368a of lens guide 361A. On the other hand, second magnet 371a on the Z direction "− side" is held by one third magnet holding part 368c of lens guide 361A.

On the other hand, the other second actuator 370j (that is, the one on the Y direction "− side") has a pair of second magnets 371b and second coil 372b. Also in the other second actuator 370j, the number of second magnets 371b is increased by one from that in the structure of Embodiment 1 described above. The structures of these members are the same as those in Embodiment 1.

Such a pair of second magnets 371b is disposed so as to sandwich second coil 372b from the Z direction with a predetermined gap therebetween. One second magnet 371b (that is, the one on the Z direction "+ side") is held by the other second magnet holding part (not shown) of lens guide 361A. On the other hand, the other second magnet 371b (that is, the one on the Z direction "− side") is held by the other third magnet holding part (not shown) of lens guide 361A.

In the case of this embodiment described above, the pair of second magnets 371a and 371b are provided in the pair of second actuators 370i and 370j, respectively; thus, the output of second shake correction apparatus 37 (see FIG. 5) can be increased. Other structures, acts, and advantageous effects are the same as those of Embodiment 1 described above.

8 Embodiment 8

A camera module according to Embodiment 8 of the present invention will be described with reference to FIGS. 40 to 52. In the case of this embodiment, the structures of prism module 2c and lens module 3a are different from those of Embodiments 1 and 3 described above. The structure of the camera module according to this embodiment will be described below focusing on portions different from those of Embodiments 1 and 3.

[8.1 Prism Module]

Figure 40:
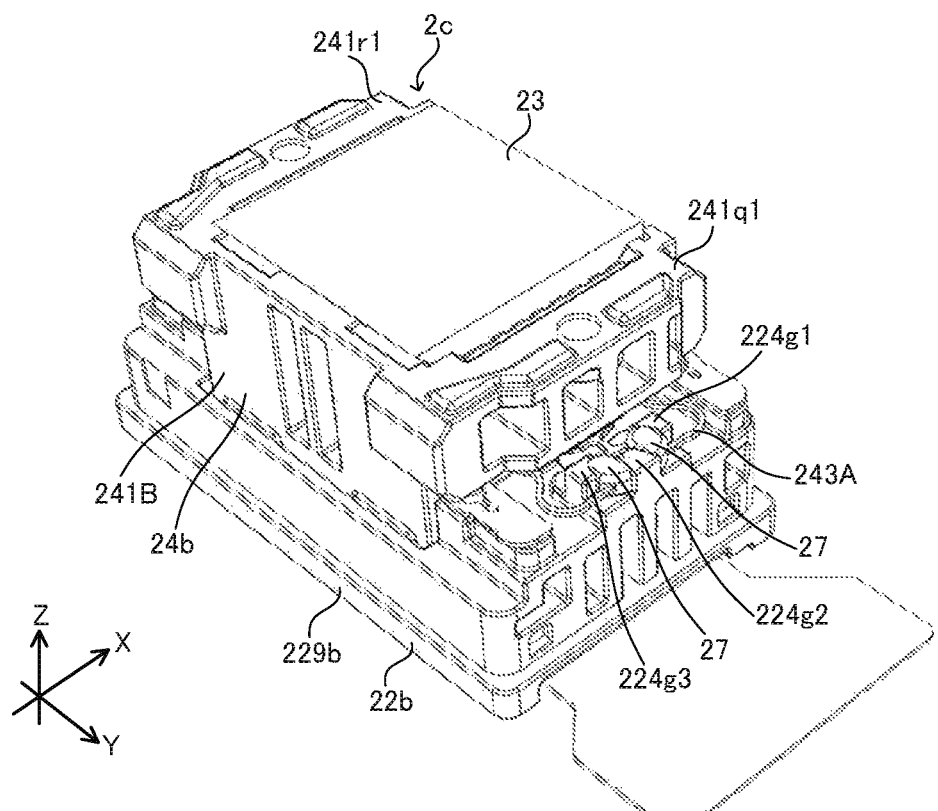
FIG. 40 is a perspective view showing a prism module of a camera module according to Embodiment 8 of the present invention, from which some members are omitted.
Figure 41:
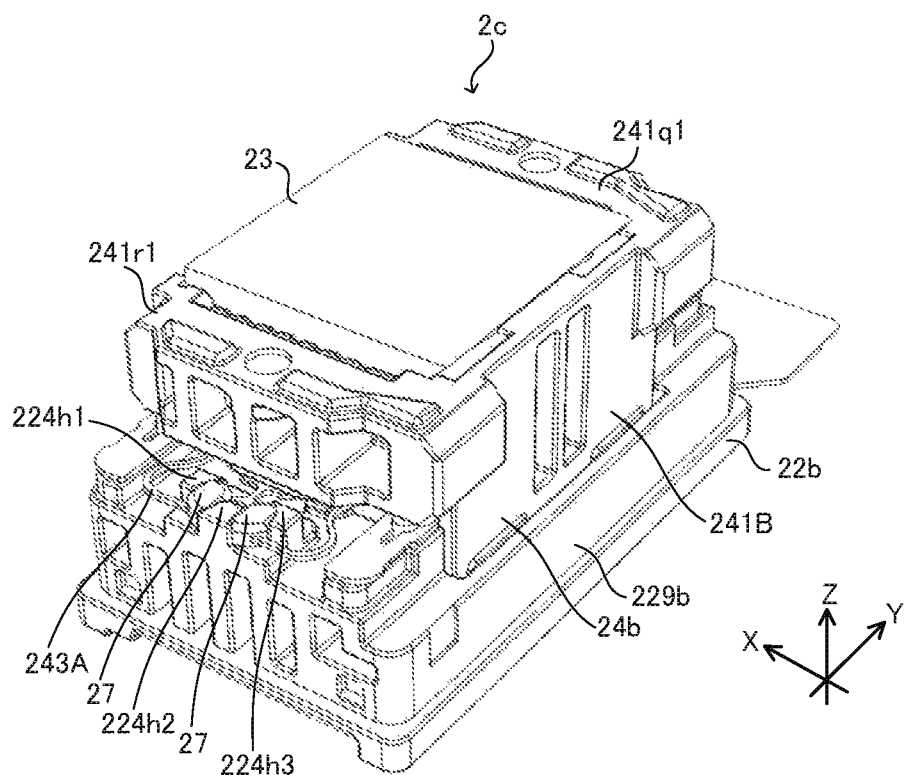
FIG. 41 is a perspective view showing the prism module, from which some members are omitted, viewed from an angle different from that in FIG. 40.
Figure 42:
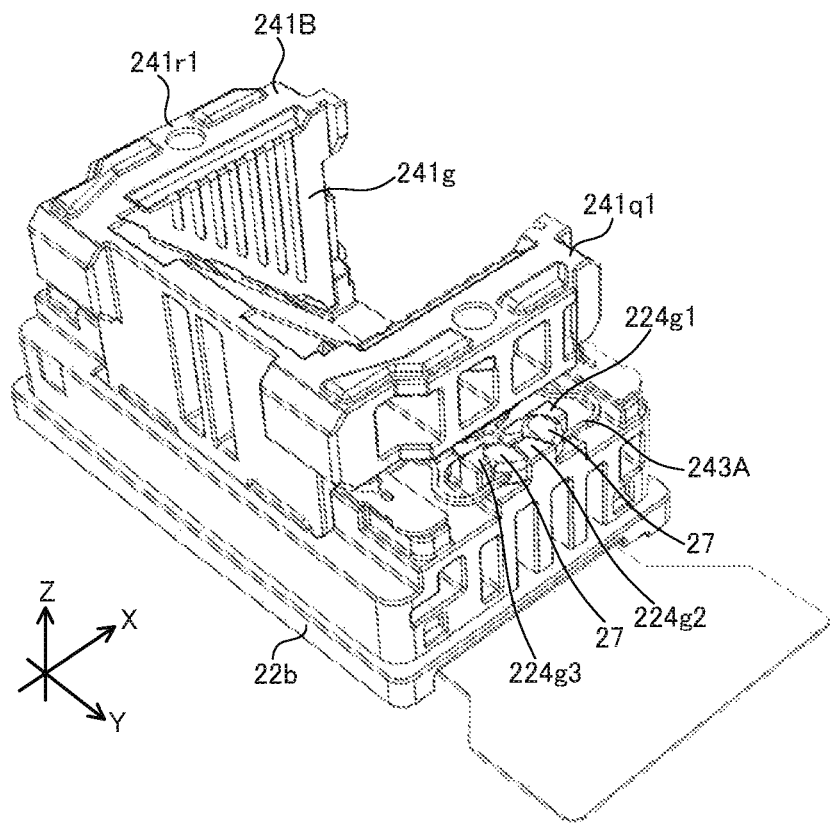
FIG. 42 is a perspective view showing the state in which a holder is assembled to a first base.

Prism module 2c of the camera module according to this embodiment includes first cover 21 (see FIG. 1A), first base 22b, prism 23, and first shake correction apparatus 24b (see FIGS. 40 and 41). The structures of first cover 21 and prism 23 are the same as those in Embodiment 1 described above.

[First Base]

Like first base 22 of Embodiment 1 described above, first base 22b is a box-shaped member that is open on the Z direction "+ side" and the X direction "+ side". First base 22b has base first opening 220 (see FIG. 43) in bottom wall part 229b on the Z direction "− side".

In this embodiment, first coil 244c and first Hall element 244e of first actuator 244A are disposed in base first opening 220.

First base 22b supports holder 241B (see FIG. 40) of first shake correction apparatus 24b so that it can swing about the first axis parallel to the Y direction. For this purpose, as in Embodiment 3 described above, first base 22b has first receiver part 225c1 and second receiver part 225d1 (see FIG. 44) for holding swing guide member 245.

First receiver part 225c1 is provided to first side wall part 224a1 on the Y direction "+ side" of first base 22b. On the other side, second receiver part 225d1 is provided to first side wall part 224b1 on the Y direction "− side" of first base 22b.

Such first receiver part 225c1 and second receiver part 225d1 have shapes symmetrical with respect to the Y direction. To be specific, first receiver part 225c1 and second receiver part 225d1 are cylindrical recesses that open only on the end surface (upper surface) of first side wall part 224a1 and first side wall part 224b1 on the Z direction "+ side", respectively.

First side wall part 224a1 has first weir part 224c1 (see FIG. 44) between the Y direction inner edge of the upper surface and first receiver part 225c1. On the other hand, first side wall part 224b1 has first weir part 224c2 (see FIG. 44) between the Y direction inner edge of the upper surface and second receiver part 225d1. First weir part 224c1 and first weir part 224c2 contribute to prevention of an adhesive that fixes swing guide member 245 (see FIG. 43) to first receiver part 225c1 and second receiver part 225d1 from flowing into the center in the Y direction.

First side wall part 224a1 has second weir part 224d1 (see FIG. 44) in a portion surrounding a part of the Y direction outer half of first receiver part 225c1 on the upper side. On the other hand, first side wall part 224b1 has second weir part 224d2 in a portion surrounding a part of the Y direction outer half of second receiver part 225d1 on the upper side. Second weir part 224d1 and second weir part 224d2 contribute to prevention of an adhesive that fixes swing guide member 245 to first receiver part 225c1 and second receiver part 225d1 from flowing into the outside in the Y direction.

First side wall part 224a1 has spring positioning spaces 224e1 and 224e2 (see FIG. 44) in a portion on the Y direction outer side with respect to second weir part 224d1 on the upper surface. In the case of this embodiment, spring positioning space 224e1 and spring positioning space 224e2 are separated in the X direction.

On the other hand, first side wall part 224b1 has spring positioning spaces 224f1 and 224f2 (see FIG. 44) in a portion on the Y direction outer side with respect to second weir part 224d2 on the upper surface. Spring positioning space 224f1 and spring positioning space 224f2 are separated in the X direction. In spring positioning spaces 224e1 and 224e2 and spring positioning spaces 224f1 and 224f2, a part of continuous part 243i1 (to be specific, proximal continuous part 243j1) of swing support spring 243A (see FIG. 45) described later is disposed.

First side wall part 224a1 has three protrusions 224g1, 224g2, and 224g3 in this order from the X direction "+ side" in a portion on the Y direction outer side with respect to second weir part 224d1 on the upper surface. Protrusion 224g1 and protrusion 224g3 are separated in the X direction and overlap each other when viewed from the top in the X direction. Protrusion 224g2 is located on the Y direction outer side (the lower side in FIG. 44) with respect to protrusion 224g1 and protrusion 224g3.

Spring positioning space 224e1 is a space that exists between protrusion 224g1 and protrusion 224g2. On the other hand, spring positioning space 224e2 is a space that exists between protrusion 224g2 and protrusion 224g3.

First side wall part 224b1 has three protrusions 224h1, 224h2, and 224h3 in this order from the X direction "+ side" in a portion on the Y direction outer side with respect to second weir part 224d2 on the upper surface. Protrusion 224h1 and protrusion 224h3 are separated in the X direction and overlap each other when viewed from the top in the X direction. Protrusion 224h2 is located on the Y direction outer side (the upper side in FIG. 44) with respect to protrusion 224h1 and protrusion 224h3.

Spring positioning space 224f1 is a space that exists between protrusion 224h1 and protrusion 224h2. On the other hand, spring positioning space 224f2 is a space that exists between protrusion 224h2 and protrusion 224h3.

First side wall parts 224a1 and 224b1 have first positioning protrusion 226a1 and second positioning protrusion 227a1 (see FIG. 44), respectively, at opposite ends in the X direction on the upper surface. First positioning protrusion 226a1 and second positioning protrusion 227a1 engage with a pair of swing support springs 243A (see FIG. 45) described later, and position the pair of swing support springs 243A.

[First Shake Correction Apparatus]

As in Embodiments 1 and 3 described above, first shake correction apparatus 24b swings prism 23 about the first axis parallel to the Y direction, and performs shake correction in the rotational direction about the first axis. Such first shake correction apparatus 24b is disposed in first accommodation space 223 (see FIG. 6).

Figure 43:
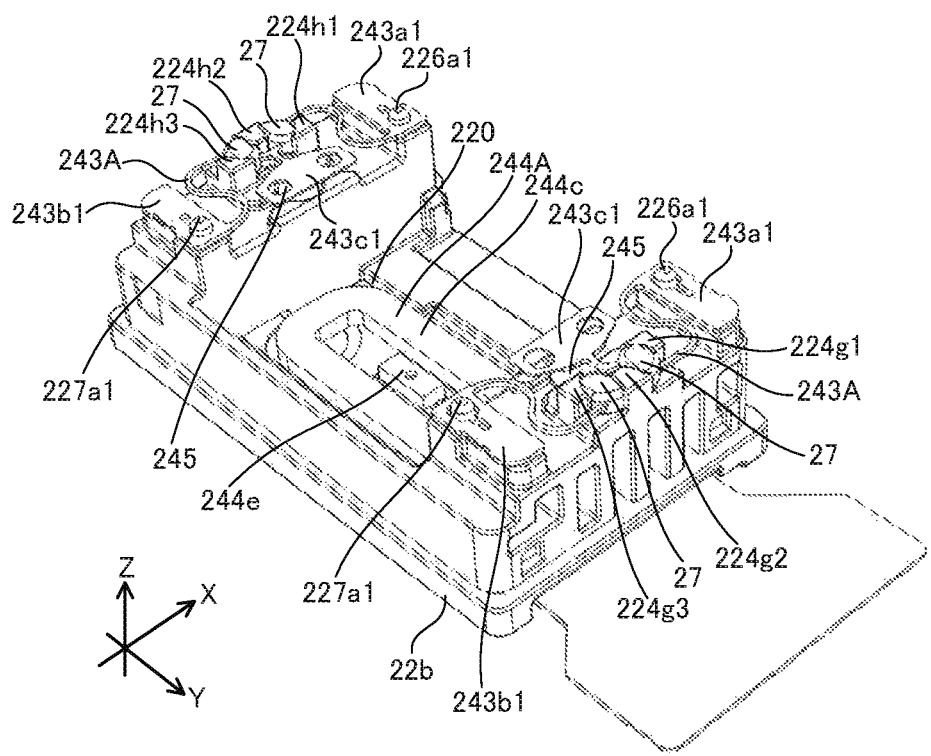
FIG. 43 is a perspective view of the first base.
Figure 44:
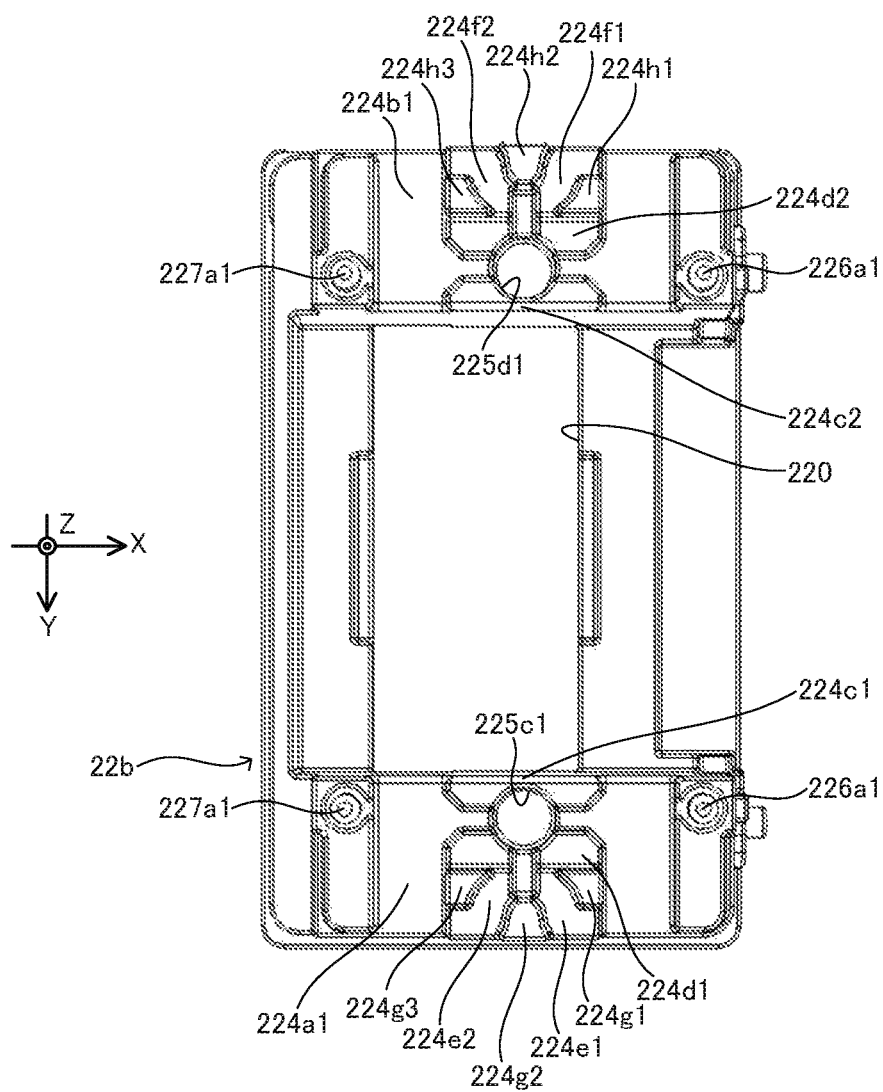
FIG. 44 is a plan view of the first base.

First shake correction apparatus 24b includes a pair of swing guide members 245 (see FIG. 43), a pair of swing support springs 243A, holder 241B (see FIG. 42), and first actuator 244A (see FIG. 43).

Also in the case of this embodiment, in first shake correction apparatus 24b, holder 241B is supported by first base 22b in a swingable manner. In this state, holder 241B swings about the first axis by the drive force of first actuator 244A. When first actuator 244A is driven under the control by a control part (not shown), holder 241B and prism 23 swing about the first axis. Hence, the shake in the rotational direction about the first axis is corrected. The structure of each member included in first shake correction apparatus 24b will be described in detail below.

[Swing Guide Member]

The pair of swing guide members 245 is, for example, a sphere of ceramic, metal, or synthetic resin. Swing guide member 245, which is one of the pair of swing guide members 245 (that is, the one on the Y direction "+ side"), is disposed in first receiver part 225c1 of first base 22b (see FIG. 44). On the other hand, the other swing guide member 245 (that is, the one on the Y direction "– side") is disposed in second receiver part 225d1 of first base 22b.

Swing guide members 245 in a pair are fixed to first receiver part 225c1 and second receiver part 225d1, respectively, with an adhesive. In this state, the half of the pair of swing guide members 245 on the Z direction "+ side" is swing guide surface 245a (also referred to as swing guide part; see FIG. 23). Swing guide surface 245a protrudes toward the Z direction "+ side" more than first receiver part 225c1 and second receiver part 225d1.

The end of each swing guide surface 245a on the Z direction "+ side" is on the Z direction "+ side" with respect to portions of the end surfaces, other than first positioning protrusion 226a1 and second positioning protrusion 227a1, of first side wall parts 224a1 and 224b1 on the Z direction "+ side" (see FIG. 31). Swing guide member 245 is not limited to a sphere, and may be, for example, a hemisphere, a cylinder, or a half cylinder. Swing guide member 245 may be integrated with first base 22b. In other words, the swing guide member may be a part of first base 22b.

[Swing Support Spring]

The pair of swing support springs 243A supports holder 241B, which will be described later, so that it is swingable with respect to first base 22b. Swing support springs 243A in a pair are metal leaf springs and are disposed on the Z direction "+ side" of the respective swing guide members 245 in a pair.

Figure 45:
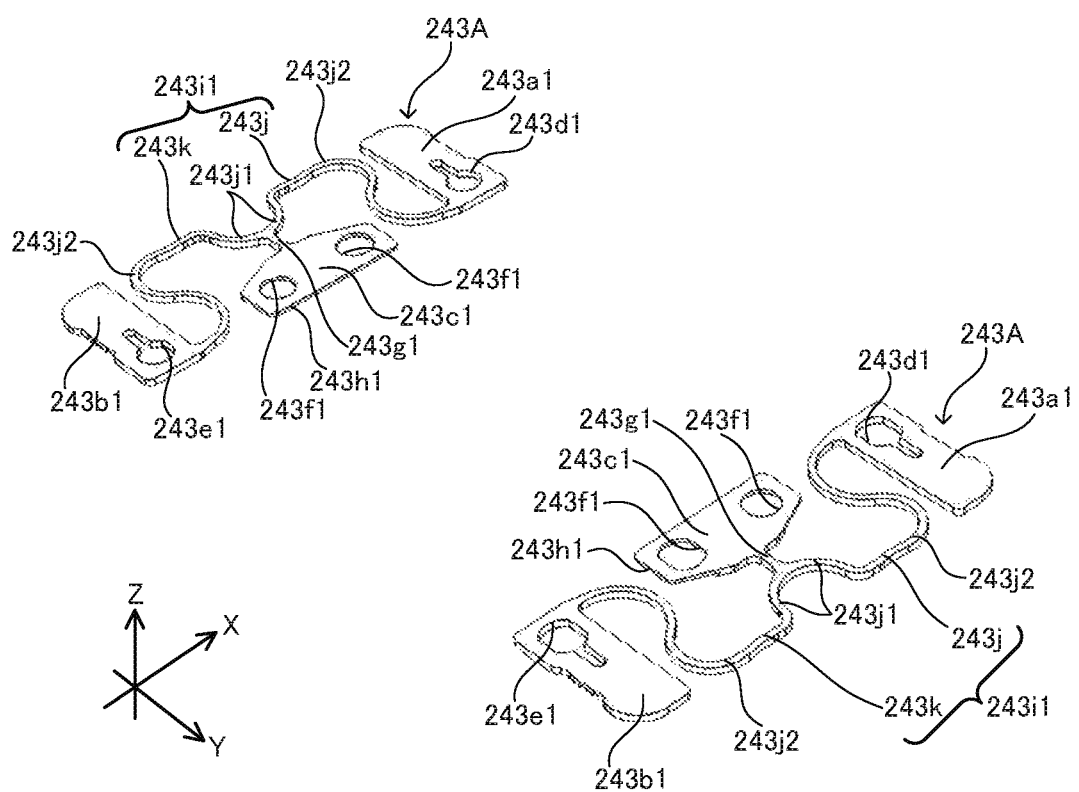
FIG. 45 is a perspective view showing only holding spring.

Swing support springs 243A, which is one of the pair of swing support springs 243A (that is, the one on the Y direction "+ side") will be described below with reference to FIG. 45. The other swing support spring 243A (that is, the one on the Y direction "– side") is symmetrical with the one swing support spring 243A with respect to the Y direction.

The one swing support spring 243A has a pair of first locking parts 243a1 and 243b1, second locking part 243c1, twist allowing part 243g1, and spring side guide surface 243h1.

First locking part 243a1, which is one of the pair of first locking parts 243a1 and 243b1 (that is, the one on the X direction "+ side"), is disposed at the end of the one swing support spring 243A on the X direction "+ side". Such first locking part 243a1, which is one of the pair, has first through hole 243d1.

On the other hand, first locking part 243b1, which is the other of the pair (that is, the one on the X direction "– side"), is provided at the end of the one swing support spring 243A on the X direction "– side". Such first locking part 243b1, which is the other of the pair, has first through hole 243e1. First locking parts 243a1 and 243b1 in a pair are made continuous by continuous part 243i1 extending in the X direction.

Continuous part 243i1 has continuous part element 243j disposed on the X direction "+ side" with respect to twist allowing part 243g1, which will be described later, and continuous part element 243k disposed on the X direction "– side" with respect to twist allowing part 243g1. Continuous part element 243j connects twist allowing part 243g1 and first locking part 243*a*1. On the other hand, continuous part element 243*k* connects twist allowing part 243*g*1 and first locking part 243*b*1.

Continuous part element 243*j* will be described below. Continuous part element 243*j* has proximal continuous part 243*j*1 and meandering continuous part 243*j*2. Proximal continuous part 243*j*1 and meandering continuous part 243*j*2 are continuous.

Proximal continuous part 243*j*1 is provided at the end of continuous part element 243*j* adjacent to twist allowing part 243*g*1. One end of proximal continuous part 243*j*1 (the end adjacent to twist allowing part 243*g*1) is continuous with twist allowing part 243*g*1. Meandering continuous part 243*j*2 has a generally S shape.

One end of meandering continuous part 243*j*2 (the end adjacent to twist allowing part 243*g*1) is continuous with proximal continuous part 243*j*1. The other end of meandering continuous part 243*j*2 (the end remote from twist allowing part 243*g*1) is continuous with first locking part 243*a*1. Continuous part element 243*k* is symmetrical to continuous part element 243*j* with respect to the X direction. For this reason, for continuous part element 243*k*, the same reference numerals as those of the components of continuous part element 243*j* are used, and their description is omitted.

The surfaces of the pair of first locking parts 243*a*1 and 243*b*1 on the Z direction "− side" are bonded and fixed to the end surfaces of first side wall part 224*a*1 of first base 22*b* on the Z direction "+ side". In this state, first positioning protrusion 226*a*1 of first base 22*b* is inserted through first through hole 243*d*1, and second positioning protrusion 227*a*1 of first base 22*b* is inserted through first through hole 243*e*1 (See FIG. 43).

In the case of the other swing support spring 243A (on the Y direction "− side"), the Z direction "− side" surfaces of the pair of first locking parts 243*a*1 and 243*b*1 are bonded and fixed to the end surfaces of first side wall part 224*b*1 of first base 22*b* on the Z direction "+ side".

Second locking part 243*c*1 is provided between first locking parts 243*a*1 and 243*b*1 in the X direction with gaps therebetween in the X direction. Second locking part 243*c*1 has a pair of second through holes 243*f*1.

The surface of second locking part 243*c*1 on the Z direction "+ side" is bonded and fixed to spring seat surface 241*s* (see FIG. 32) of holder 241B described later. In this state, a pair of holder-side positioning protrusions 241*u* (see FIG. 32) of holder 241B are inserted through the pair of second through holes 243*f*1, respectively. In the case of the other swing support spring 243A (on the Y direction "− side"), the surface of second locking part 243*c*1 on the Z direction "+ side" is bonded and fixed to spring seat surface 241*t* of holder 241B (see FIG. 32).

Twist allowing part 243*g*1 is a plate-like member extending in the Y direction, and connects the intermediate portion of continuous part 243*i*1 in the X direction (specifically, one end of each proximal continuous part 243*j*1) and second locking part 243*c*1. By being twisted, such twist allowing part 243*g*1 allows second locking part 243*c*1 to twist with respect to first locking parts 243*a*1 and 243*b*1.

Further, twist allowing part 243*g*1 allows relative displacement in the Z direction between first locking parts 243*a*1 and 243*b*1 and second locking part 243*c*1 by elastic deformation.

Spring side guide surface 243*h*1 is the rear surface of second locking part 243*c*1 (that is, the surface on the Z direction "− side"). Such spring side guide surface 243*h*1 is in contact with swing guide surface 245*a* (see FIG. 31) of swing guide member 245.

Swing support springs 243A in a pair are plate members that are entirely flat in a free state (also referred to as a non-assembled state). Meanwhile, in the assembled state, in the pair of swing support springs 243A, second locking part 243*c*1 is positioned on the Z direction "+ side" with respect to first locking parts 243*a*1 and 243*b*1 according to the elastic deformation of twist allowing part 243*g*1 (see FIG. 31).

To be specific, in the assembled state, twist allowing part 243*g*1 is elastically deformed so as to be more on the Z direction "+ side" toward second locking part 243*c*1. Spring side guide surface 243*h*1 of the pair of swing support springs 243A urges swing guide member 245 toward the Z direction "− side" according to such elastic deformation.

In the assembled state of the pair of swing support springs 243A described above, proximal continuous parts 243*j*1 of the pair of swing support springs 243A are disposed in spring positioning spaces 224*e*1 and 224*e*2 and spring positioning spaces 224*f*1 and 224*f*2, respectively. Further, gel-like damping member 27 is disposed in spring positioning spaces 224*e*1 and 224*e*2 and spring positioning spaces 224*f*1 and 224*f*2 so as to cover proximal continuous part 243*j*1 (see FIG. 43).

Damping member 27 is effective in suppressing unnecessary resonance of the pair of swing support springs 243A. To suppress unnecessary resonance, it is preferable that damping member 27 be provided in the vicinity of a portion of the pair of swing support springs 243A that deforms the most during use. In the case of this embodiment, the portion that deforms the most during use is twist allowing part 243*g*1. For this reason, it is preferable that damping member 27 cover a portion of the pair of swing support springs 243A that is in the vicinity of twist allowing part 243*g*1.

[Holder]

Holder 241B (see FIG. 40) is made of, for example, a synthetic resin and holds prism 23 in such a state that it is swingable with respect to first base 22*b*. The basic configuration of holder 241B is substantially the same as holder 241A (see FIG. 32) of Embodiment 3 described above. Holder 241B will be described below focusing on its configuration that is different from that of holder 241A of Embodiment 3.

Overhang parts 241*q*1 and 241*r*1 of holder 241B protrude from the pair of opposing wall parts 241*f* and 241*g* (see FIG. 32) in the Y direction less than overhang parts 241*q* and 241*r* (see FIG. 32) of holder 241A of Embodiment 3. Therefore, in the assembled state, the opposite end surfaces of holder 241B in the Y direction (that is, the outer end surfaces of overhang parts 241*q*1 and 241*r*1 in the Y direction) are located at the center in the Y direction from the opposite end surfaces of first base 22*b* in the Y direction. Such a configuration contributes to a reduction in the size and weight of holder 241B.

In this embodiment, spacer 246 (see FIG. 25) of Embodiment 3 is omitted and collision prevention protrusions 241*m*, 241*n*, and 241*p* (see FIG. 32) are thus not formed on the rear surface of holder 241B (that is, the surface on the Z direction "− side"). The structure of the other holder 241B is substantially the same as holder 241 of Embodiment 1 or holder 241A of Embodiment 3 described above.

[First Actuator]

First actuator 244A swings holder 241B about the first axis. In the case of this embodiment, the first axis is a straight line parallel to the Y axis that passes through a contact between swing guide surfaces 245*a* of the pair of swing guide members 245 and spring side guide surfaces 243*h*1 of the pair of swing support springs 243A. Note that the structure of first actuator 244A is the same as that of Embodiment 3 described above. Such first actuator 244A swings holder 241B about the first axis under the control by a camera shake correction control part (not shown), as in Embodiment 3 described above. The operation in which holder 241B swings about the first axis is the same as that of Embodiment 3 described above with reference to FIG. 31.

Next, lens module 3a of a camera module according to this embodiment will now be described. The basic configuration of lens module 3a is substantially the same as lens module 3 of Embodiment 1 described above. Lens module 3a will be described below focusing on differences from lens module 3 of Embodiment 1.

[8.2 Lens Module]

As shown in FIGS. 46 to 52, lens module 3a includes second cover 31 (see FIG. 1A), second base 32A, lens part 33, AF apparatus 36A, second shake correction apparatus 37A, and reference member 38. Second cover 31, lens part 33, and reference member 38 are the same as those in Embodiment 1 described above.

[Second Base]

Second base 32A (see FIGS. 46 and 47) is combined with the aforementioned second cover 31, thereby forming second accommodation space 320 (see FIG. 4) in which lens part 33, AF apparatus 36A, and second shake correction apparatus 37A can be disposed.

The basic configuration of second base 32A is substantially the same as second base 32 of Embodiment 1 described above. Second base 32A will be described below focusing on differences from second base 32 of Embodiment 1.

Second side wall part 322a1 of second base 32A has spring positioning parts 324a1 and 324c1 (see FIG. 46) at opposite ends in the X direction on the side surface present on the Y direction "+ side". Spring 362a1 and spring 362c1, which will be described later, are disposed in spring positioning part 324a1 and spring positioning part 324c1, respectively.

Second side wall part 322a1 of second base 32A has slit 322i (see FIG. 46) on the side surface present on the Y direction "+ side". Slit 322i has a space in which first continuous part 363i of FPC 363B (see FIG. 50) described later can be disposed. The space is a space extending parallel to the ZY plane. Slit 322i opens on the Y direction "+ side" and at opposite ends in the Z direction.

On the other hand, second side wall part 322b1 of second base 32A has spring positioning parts 324b1 and 324d1 (see FIG. 47) at opposite ends in the X direction on the side surface present on the Y direction "– side". Spring 362b1 and spring 362d1, which will be described later, are disposed in spring positioning part 324b1 and spring positioning part 324d1, respectively.

Second side wall part 322b1 of second base 32A has a pair of recesses 322j on the side surface present on the Y direction "– side". A pair of second continuous parts 363j of FPC 363B, which will be described later, are disposed in recesses 322j. Note that the structures of recesses 322j are not limited to those shown in the drawings.

Spring positioning parts 324a1 to 324d1 have gel positioning parts 324e to 324h, respectively. In the case of this embodiment, spring positioning parts 324a1 to 324d1 have gel positioning parts 324e to 324h at the ends on the Z direction "+ side", respectively. Gel positioning parts 324e to 324h are operable such that they can hold gel damping members 325a to 325d that cover portions of springs 362a1 to 362d1, respectively.

[Lens Part]

Lens part 33 is disposed in second accommodation space 320 while being held by lens guide 361B which will be described later. Such lens part 33 has a cylindrical lens barrel and one or more lenses held in the lens barrel. For example, lens part 33 includes a 3× or more optical telephoto lens group, for example, which is fixed between the end of the lens barrel on the X direction "– side" and the end of the lens barrel on the X-direction "+ side". Note that the structure of lens part 33 is not limited to the aforementioned structure.

[AF Apparatus]

AF apparatus 36A (see FIGS. 48 and 49) displaces lens part 33 in the X direction for autofocusing. To be specific, AF apparatus 36A includes lens guide 361B, a plurality of (four in this embodiment) springs 362a1 to 362d1, FPC 363B, and a pair of AF actuators 364a1 and 364b1.

[Lens Guide]

Lens guide 361B (see FIGS. 46 and 48) has an accommodation space in which the lens barrel can be held. Such lens guide 361B is disposed in the aforementioned second accommodation space 320 in a state where displacement in the X direction (that is, the direction of the second optical axis) and the Y direction is possible.

Figure 48:
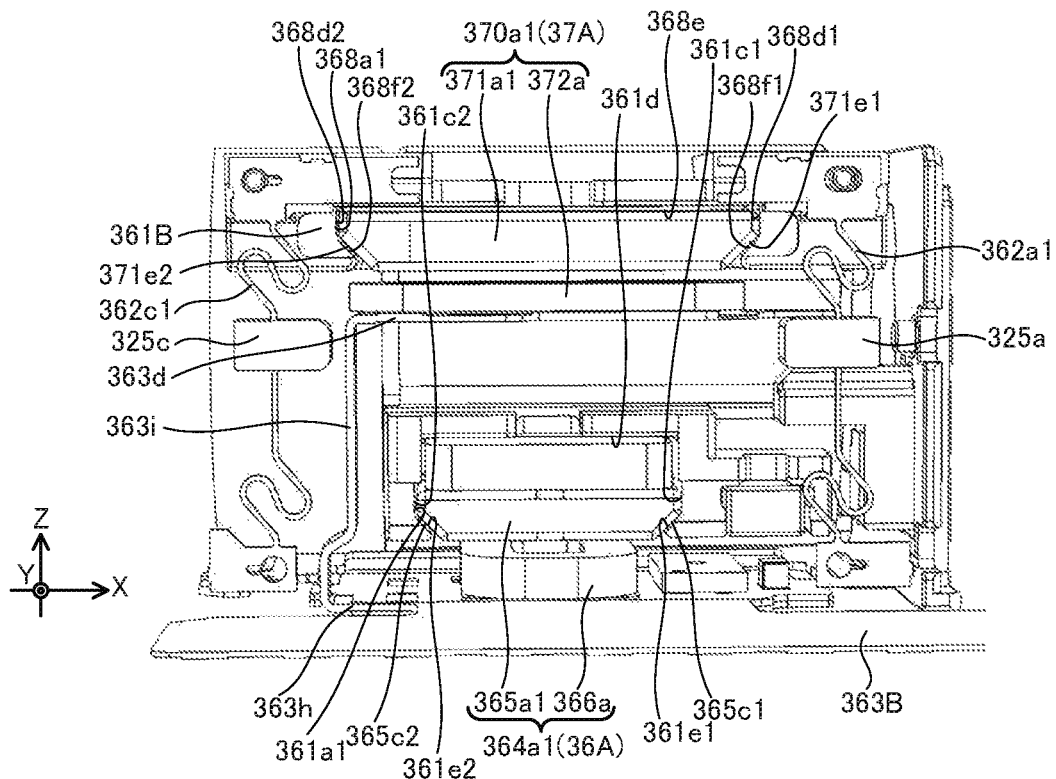
FIG. 48 is a side view of the lens module from which a second base is omitted.

Lens guide 361B has a pair of first magnet holding parts 361a1 and 361b1 (see FIGS. 48 and 49) for holding AF magnets 365a1 and 365b1 of a pair of AF actuators 364a1 and 364b1 described later. In the case of this embodiment, the pair of first magnet holding parts 361a1 and 361b1 are disposed in magnet spaces 322g and 322h (see FIG. 11) of second base 32A, respectively. FIG. 48 is a side view of lens module 3a from the Y direction "+ side" with some members omitted. On the other hand, FIG. 49 is a side view of lens module 3a from the Y direction "– side" with some members omitted.

Figure 49:
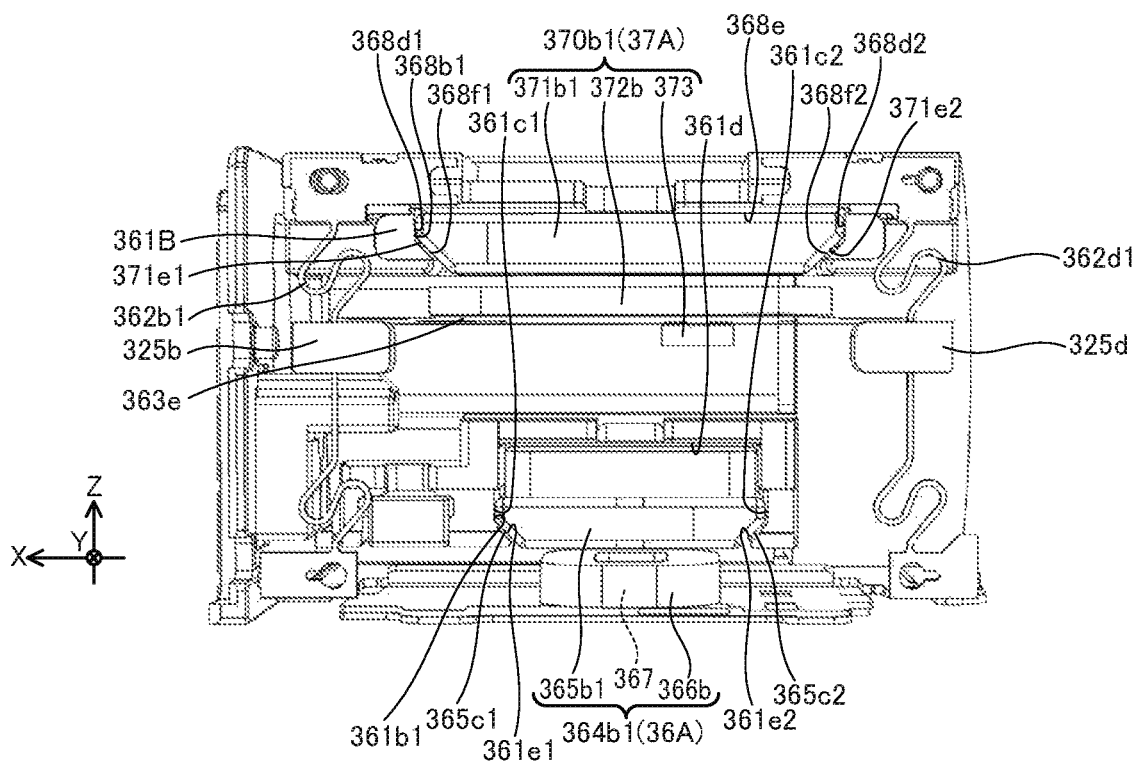
FIG. 49 is a side view of the lens module, from which the second base is omitted, viewed from the opposite side to that in FIG. 48.
Figure 50:
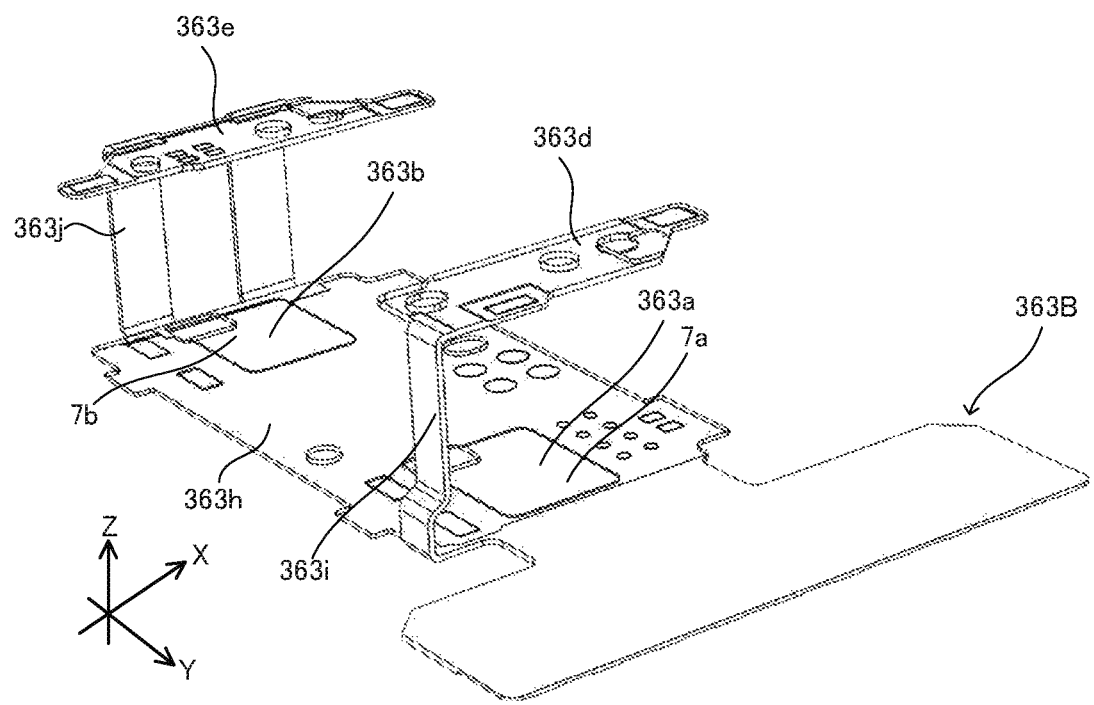
FIG. 50 is a perspective view showing only the removed FPC of the lens module.

In the case of this embodiment, the shape of the pair of first magnet holding parts 361a1 and 361b1 is different from that of Embodiment 1 described above in a plan view from the Y direction (the state shown in FIGS. 48 and 49). To be specific, each of the pair of first magnet holding parts 361a1 and 361b1 is a recess that is open on the Z direction "– side" in a plan view from the Y direction. Each of the pair of first magnet holding parts 361a1 and 361b1 has inclined surface parts 361e1 and 361e2 facing chamfered parts 365c1 and 365c2 of AF magnets 365a1 and 365b1, in a state where AF magnets 365a1 and 365b1 are held.

To be specific, the pair of first magnet holding parts 361a1 and 361b1 has a pair of side surface parts 361c1 and 361c2 that are separated in the X direction and face each other in the X direction. Each of the pair of first magnet holding parts 361a1 and 361b1 has upper surface part 361d that connects the ends of the pair of side surface parts 361c1 and 361c2 on the Z direction "+ side", in the X direction.

The pair of side surface parts 361c1 and 361c2 has the aforementioned inclined surface parts 361e1 and 361e2 at the ends on the Z direction "– side". Inclined surface parts 361e1 and 361e2 are inclined surfaces along chamfered parts 365c1 and 365c2 of AF magnets 365a1 and 365b1.

To be specific, inclined surface part 361e1 and inclined surface part 361e2 are inclined in the direction in which the distance therebetween in the X direction decreases toward the Z direction "– side" (the lower side in FIGS. 48 and 49). In other words, the distance between inclined surface part 361e1 and inclined surface part 361e2 in the X direction is the smallest at the end on the Z direction "– side". Such inclined surface parts 361e1 and 361e2 contribute to preventing AF magnets 365a1 and 365b1 from coming off on the Z direction "– side" in the assembled state.

Lens guide 361B has a pair of second magnet holding parts 368a1 and 368b1 (see FIGS. 48 and 49) for holding second magnets 371a1 and 371b1 of a pair of second actuators 370a1 and 370b1 which will be described later. In the case of this embodiment, the pair of second magnet holding parts 368a1 and 368b1 overlap with coil mount parts 322d and 322e of second base 32A (see FIGS. 46 and 47), respectively, in the Z direction with a predetermined gap therebetween.

In the case of this embodiment, the shape of the pair of second magnet holding parts 368a1 and 368b1 is different from that of Embodiment 1 described above in a plan view from the Y direction (the state shown in FIGS. 48 and 49). To be specific, each of the pair of second magnet holding parts 368a1 and 368b1 is a recess that is open on the Z direction "– side" in a plan view from the Y direction. Each of the pair of second magnet holding parts 368a1 and 368b1 has inclined surface parts 368f1 and 368f2 facing chamfered parts 371e1 and 371e2 of second magnets 371a1 and 371b1, in a state where second magnets 371a1 and 371b1 are held.

To be specific, the pair of second magnet holding parts 368a1 and 368b1 has a pair of side surface parts 368d1 and 368d2 that are separated in the X direction and face each other in the X direction. Each of the pair of second magnet holding parts 368a1 and 368b1 has upper surface part 368e that connects the ends of the pair of side surface parts 368d1 and 368d2 on the Z direction "+ side", in the X direction.

The pair of side surface parts 368d1 and 368d2 has the aforementioned inclined surface parts 368f1 and 368f2 at the ends on the Z direction "– side". Inclined surface parts 368f1 and 368f2 are inclined surfaces along chamfered parts 371e1 and 371e2 of second magnets 371a1 and 371b1.

To be specific, inclined surface part 368f1 and inclined surface part 368f2 are inclined in the direction in which the distance therebetween in the X direction decreases toward the Z direction "– side". In other words, the distance between inclined surface part 368f1 and inclined surface part 368f2 in the X direction is the smallest at the end on the Z direction "– side". Such inclined surface parts 368f1 and 368f2 contribute to preventing second magnets 371a1 and 371b1 from coming off on the Z direction "– side" in the assembled state.

[Spring]

A plurality of (four in the case of this embodiment) springs 362a1 to 362d1 (see FIGS. 46 and 47) elastically support lens guide 361B on second base 32A. In this state, lens part 33 can be displaced in the X direction and the Y direction with respect to second base 32A.

Figure 46:
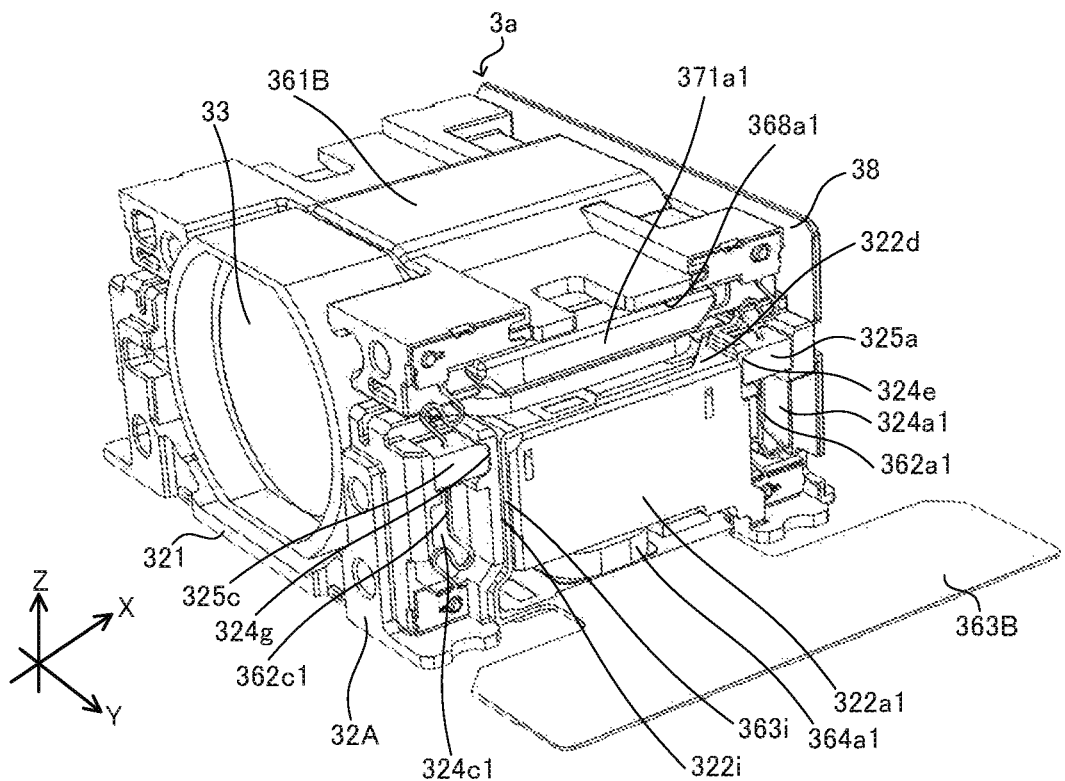
FIG. 46 is a perspective view of the lens module from which some members are omitted.

In the case of this embodiment, spring 362a1 supports the ends of lens guide 361B on the X direction "+ side" and the Y direction "+ side" on second base 32A (see FIG. 46). Spring 362b1 supports the ends of lens guide 361B on the X direction "+ side" and the Y direction "– side" on second base 32A (see FIG. 47). Spring 362c1 supports the ends of lens guide 361B on the X direction "– side" and the Y direction "+ side" on second base 32A (see FIG. 46). Spring 362d1 supports the ends of lens guide 361B on the X direction "– side" and the Y direction "– side" on second base 32A (see FIG. 47).

Figure 51:
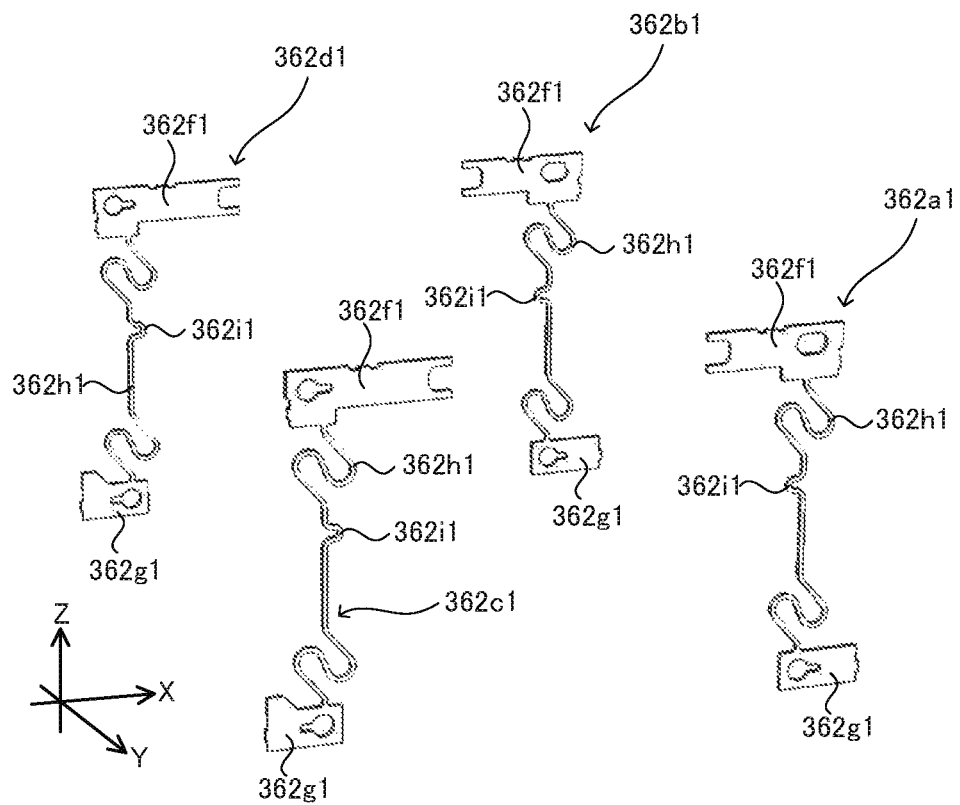
FIG. 51 is a perspective view showing the removed spring in an assembled state.

Each of springs 362a1 to 362d1 has first fixed part 362f1, second fixed part 362g1, and elastic deformable part 362h1 (see FIG. 51). Note that FIG. 51 shows springs 362a1 to 362d1 in the assembled state.

First fixed part 362f1 is fixed to lens guide 361B which is a movable member. Second fixed part 362g1 is fixed to second base 32A which is a fixed member. Elastic deformable part 362h1 is continuous with first fixed part 362f1 and second fixed part 362g1. At least a part of elastic deformable part 362h1 consists of a linear member that is bent into a meander, for example.

Each of elastic deformable parts 362h1 of springs 362a1 to 362d1 has gel locking part 362i1 in the intermediate portion. In the assembled state, gel locking part 362i1 is covered with damping members 325a, 325b, 325c, and 325d (see FIGS. 46 and 47). Such gel locking part 362i1 contributes to an improvement in adhesiveness with damping members 325a, 325b, 325c, and 325d by engaging with damping members 325a, 325b, 325c, and 325d.

In the case of this embodiment, gel locking part 362i1 consists of a curved part that is curved so as to protrude in the X direction from the straight part of elastic deformable part 362h1. Gel locking part 362i1 in springs 362a1 and 362b1 protrudes toward the X direction "– side" from the straight part of elastic deformable part 362h1. On the other hand, gel locking part 362i1 in springs 362c1 and 362d1 protrudes from the straight part of elastic deformable part 362h1 toward the X direction "+ side". In other words, gel locking part 362i1 in springs 362a1 and 362b1 and gel locking part 362i1 in springs 362c1 and 362d1 protrude from the linear part of elastic deformable part 362h1 toward the opposite direction in the X direction.

Figure 52A:
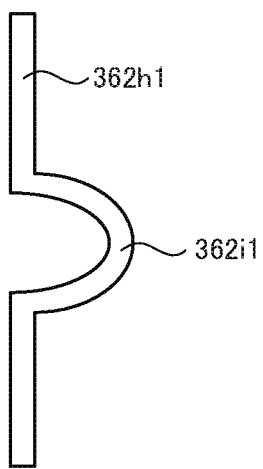
FIG. 52A is a schematic diagram showing a gel locking part of a spring according to Embodiment 8.
Figure 52B:
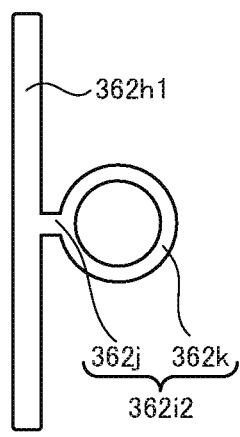
FIG. 52B is a schematic diagram showing Modification 1 of the gel locking part.

The shape of gel locking part 362i1 is not limited to that of this embodiment. Gel locking part 362i2 shown in FIG. 52B is a modification of gel locking part 362i1. Gel locking part 362i2 has continuous part 362j and annular part 362k.

Figure 52C:
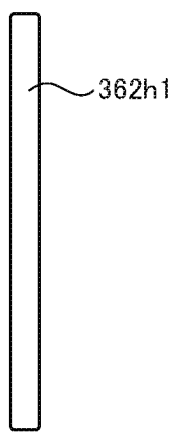
FIG. 52C is a schematic diagram showing Modification 2 of the gel locking part.

Continuous part 362j extends linearly in the X direction from the straight part of elastic deformable part 362h1. Annular part 362k is annular and continues to the distal end of continuous part 362j. Continuous part 362j should not necessarily be linear. Continuous part 362j in springs 362a1 and 362b1 extends toward the X direction "– side" from the straight part of elastic deformable part 362h1. On the other hand, continuous part 362j in springs 362c1 and 362d1 extends from the straight part of elastic deformable part 362h1 to the X direction "+ side". For example, continuous part 362j may have a meandering shape. The structure of annular part 362k is not limited to that shown in the drawings. For example, the shape of annular part 362k may be a circle, an ellipse, or a polygon. As shown in FIG. 52C, gel locking part 362i2 may be omitted.

In the assembled state, springs 362a1 to 362d1 are disposed in spring positioning parts 324a1 to 324d1 (see FIGS. 46 and 47) of second base 32A, respectively. In this state, gel locking parts 362i1 of springs 362a1 to 362d1 are disposed in gel positioning parts 324e to 324h in spring positioning parts 324a1 to 324d1, respectively. Gel locking parts 362i1 of springs 362a1 to 362d1 are covered with gel damping members 325a to 325d disposed in gel positioning parts 324e to 324h, respectively.

In the case of this embodiment, elastic deformable part 362h1 has directionality in the X direction. Springs 362a1 and 362b1 are disposed on the same direction in the X direction. In other words, spring 362a1 and spring 362b1 are disposed so that at least elastic deformable parts 362h1 overlap in a plan view from the Y direction.

Springs 362c1 and 362d1 are disposed on the same direction in the X direction. In other words, spring 362c1 and spring 362d1 are disposed so that at least elastic deformable parts 362h1 overlap in a plan view from the Y direction.

Spring 362a1 and spring 362c1 are disposed so that only gel locking parts 362i1 of elastic deformable parts 362h1 face the opposite directions in the X direction. In other words, spring 362a1 and spring 362c1 are disposed so that the portion other than gel locking parts 362*i*1 of elastic deformable parts 362*h*1 face the same direction in the X direction.

Spring 362*b*1 and spring 362*d*1 are disposed so that only gel locking parts 362*i*1 of elastic deformable parts 362*h*1 face the opposite directions in the X direction. In other words, spring 362*b*1 and spring 362*d*1 are disposed so that the portion other than gel locking parts 362*i*1 of elastic deformable parts 362*h*1 face the same direction in the X direction.

[FPC]

Figure 47:
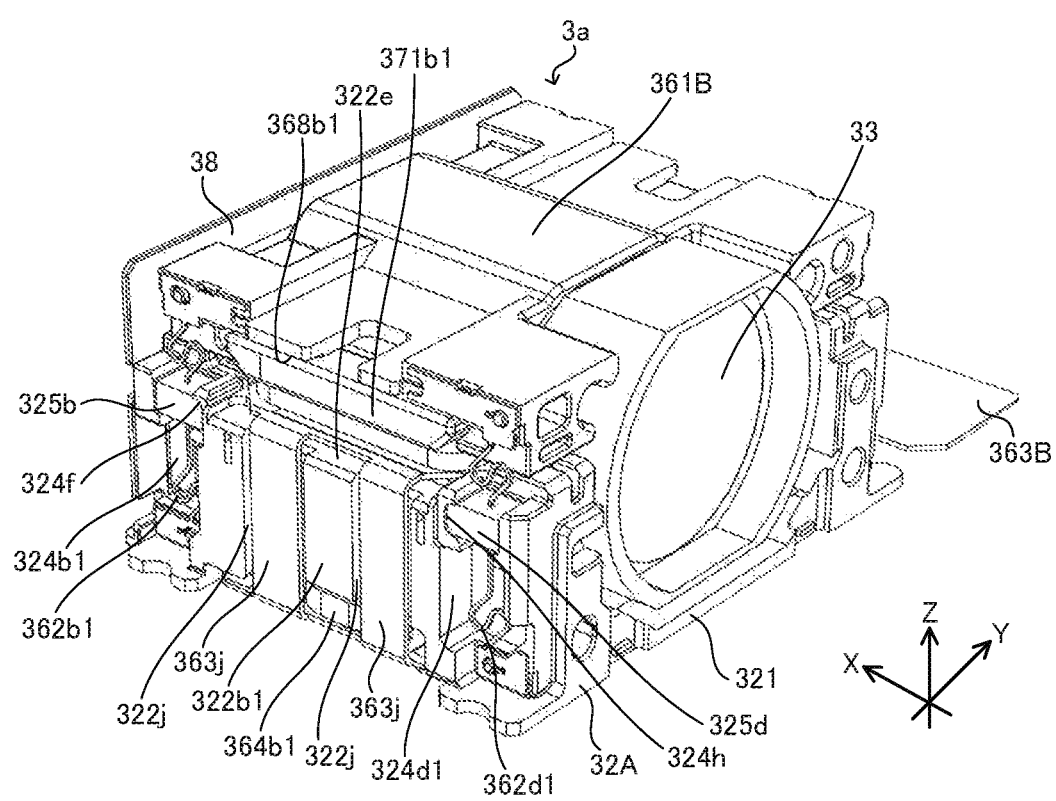
FIG. 47 is a perspective view of the lens module, from which some members are omitted, viewed from an angle different from that in FIG. 46.

FPC 363B (see FIG. 50) is a flexible printed circuit board and is fixed to second base 32A (see FIGS. 46 and 47). FPC 363B supplies electric power to, for example, AF apparatus 36A and second actuators 370*a*1 and 370*b*1 of second shake correction apparatus 37A which will be described later.

To be specific, FPC 363B is a continuous flexible printed circuit board, and includes FPC base 363*h*, a pair of first coil fixed parts 363*a* and 363*b*, and a pair of second coil fixed parts 363*d* and 363*e*.

FPC base 363*h* is a plate member extending in the Y direction, and is fixed to bottom part 321 (see FIGS. 46 and 47) of second base 32A. AF coil 366*a* of AF apparatus 36A (see FIG. 48)*is* fixed to First coil fixed part 363*a* via board 7*a*. In this state, first coil fixed part 363*a* and AF coil 366*a* are disposed in bottom through hole 321*a* of second base 32A (see FIG. 15).

On the other hand, AF coil 366*b* of AF apparatus 36A (see FIG. 49) is fixed to first coil fixed part 363*b* via board 7*b*. In this state, first coil fixed part 363*b* and AF coil 366*b* are disposed in the bottom through hole 321*b* of second base 32A.

Second coil fixed parts 363*d* and 363*e* overlap first coil fixed parts 363*a* and 363*b*, respectively, in the Z direction with a predetermined gap therebetween. Second coils 372*a* and 372*b* of second shake correction apparatus 37A, which will be described later, are fixed on the surfaces of second coil fixed parts 363*d* and 363*e*, respectively (see FIGS. 48 and 49). In this state, second coil fixed parts 363*d* and 363*e* are mounted on the surfaces of coil mount parts 322*d* and 322*e* of second base 32A (see FIG. 11).

Second coil fixed part 363*d* continues to FPC base 363*h* through first continuous part 363*i*. First continuous part 363*i* is a plate member parallel to the ZY plane. First continuous part 363*i* is disposed in slit 322*i* (see FIG. 46) formed on the side surface on the Y direction "+ side" of second side wall part 322*a*1 in second base 32A.

Meanwhile, second coil fixed part 363*e* continues to FPC base 363*h* through second continuous part 363*j*. Second continuous part 363*j* is a plate member parallel to the XZ plane. Second continuous part 363*j* is disposed in recess 322*j* (see FIG. 47) of second side wall part 322*b*1 in second base 32A.

[AF Actuator]

Each of the pair of AF actuators 364*a*1 and 364*b*1 (see FIGS. 48 and 49) is a third actuator for autofocusing. AF actuator 364*a*1 on the Y direction "+ side" includes AF magnet 365*a*1 and AF coil 366*a*. On the other hand, AF actuator 364*b*1 on the Y direction "− side" includes AF magnet 365*b*1, AF coil 366*b*, and AF Hall element 367. The structure of the pair of AF actuators 364*a*1 and 364*b*1 will be described below focusing on the structure of a portion different from that of Embodiment 1 described above.

Each of AF magnets 365*a*1 and 365*b*1 is a hexagonal prism that extends in the X direction and has a generally hexagonal shape in a plan view from the Y direction (the state shown in FIGS. 48 and 49).

AF magnets 365*a*1 and 365*b*1 each have a pair of chamfered parts 365*c*1 and 365*c*2. The pair of chamfered parts 365*c*1 and 365*c*2 are provided on a pair of side surfaces facing in the X direction in AF magnets 365*a*1 and 365*b*1, respectively. Chamfered part 365*c*1 and chamfered part 365*c*2 overlap in a plan view from the X direction. Chamfered part 365*c*1 and chamfered part 365*c*2 are inclined in the direction in which the distance therebetween in the X direction decreases toward the Z direction − side in a plan view from the Y direction.

In the assembled state, such chamfered part 365*c*1 and chamfered part 365*c*2 face inclined surface parts 361*e*1 and 361*e*2 of the pair of first magnet holding parts 361*a*1 and 361*b*1 in lens guide 361B, respectively. Other structures of the pair of AF actuators 364*a*1 and 364*b*1 are the same as those of the pair of AF actuators 364*a* and 364*b* of Embodiment 1 described above.

[Second Shake Correction Apparatus]

Second shake correction apparatus 37A (see FIGS. 48 and 49) performs shake correction in the Y direction by displacing lens part 33 in the Y direction. Such second shake correction apparatus 37A is disposed in the aforementioned second accommodation space 320 (see FIG. 4).

Second shake correction apparatus 37A includes lens guide 361B described above, the plurality of springs 362*a*1 to 362*d*1 described above, FPC 363B described above, and a pair of second actuators 370*a*1 and 370*b*1. Lens guide 361B, springs 362*a*1 to 362*d*1, and FPC 363B are shared with AF apparatus 36A.

Second actuator 370*a*1 (see FIG. 48) on the Y direction "+ side" is overlapped with aforementioned AF actuator 364*a*1 in the Z direction with a predetermined gap therebetween. Such second actuator 370*a*1 includes second magnet 371*a*1 and second coil 372*a*. Second coil 372*a* is the same as that in Embodiment 1 described above.

On the other hand, second actuator 370*b*1 (see FIG. 49) on the Y direction "− side" is overlapped with aforementioned AF actuator 364*b*1 in the Z direction with a predetermined gap therebetween. Such second actuator 370*b*1 includes second magnet 371*b*1, second coil 372*b*, and second Hall element 373. Second coil 372*b* and second Hall element 373 are the same as those in Embodiment 1 described above. The structure of the pair of second actuators 370*a*1 and 370*b*1 will be described below focusing on the structure of a portion different from that of Embodiment 1 described above.

Second magnets 371*a*1 and 371*b*1 of the pair of second actuator 370*a*1 and 370*b*1 are held by second magnet holding parts 368*a*1 and 368*b*1 of lens guide 361B, respectively.

Each of second magnets 371*a*1 and 371*b*1 is a hexagonal prism that extends in the X direction and has a generally hexagonal shape in a plan view from the Y direction (the state shown in FIGS. 48 and 49).

Second magnets 371*a*1 and 371*b*1 each have a pair of chamfered parts 371*e*1 and 371*e*2. The pair of chamfered parts 371*e*1 and 371*e*2 are provided on a pair of side surfaces facing in the X direction in second magnets 371*a*1 and 371*b*1, respectively. Chamfered part 371*e*1 and chamfered part 371*e*2 overlap in a plan view from the X direction. Chamfered part 371*e*1 and chamfered part 371*e*2 are inclined in the direction in which the distance therebetween in the X direction decreases toward the Z direction − side in a plan view from the Y direction.

In the assembled state, such chamfered part 371*e*1 and chamfered part 371*e*2 face inclined surface parts 368*f*1 and 368*f*2 of the pair of second magnet holding parts 368*a*1 and 368b1 in lens guide 361B, respectively. The structures of other portions of the pair of second actuators 370a1 and 370b1 are the same as those of the pair of second actuators 370a and 370b of Embodiment 1 described above. Regarding the camera module according to this embodiment, the structures, acts, and advantageous effects other than those described above are the same as those in Embodiment 1.

The description, accompanying drawings, and abstract included in Japanese Patent Application No. 2017-103954 filed on May 25, 2017, Japanese Patent Application No. 2017-119447 filed on Jun. 19, 2017, and Japanese Patent Application No. 2017-209582 filed on Oct. 30, 2017 are all incorporated in this application by reference.

INDUSTRIAL APPLICABILITY

A camera actuator and a camera module according to the present invention can be mounted on a low-profile camera mounted apparatus such as a smartphone, a mobile phone, a digital camera, a notebook computer, a tablet terminal, a portable game machine, or an in-vehicle camera.

REFERENCE SIGNS LIST 1, 1a Camera module
2, 2a, 2b, 2c Prism module
21 First cover
22, 22a, 22b First base
220 Base first opening
223 First accommodation space
224a, 224b, 224a1, 224b1 First side wall part
224c1, 224c2 First weir part
224d1, 224d2 Second weir part
224e1, 224e2, 224f1, 224f2 Spring positioning space
224g1, 224g2, 224g3 Protrusion
224h1, 224h2, 224h3 Protrusion
225a First bearing part
225b Second bearing part
225c, 225c1 First receiver part
225d, 225d1 Second receiver part
225e, 225f Stopper surface
226, 226a, 226a1 First positioning protrusion
227, 227a, 227a1 Second positioning protrusion
228 Third positioning protrusion
229, 229b Bottom wall part
229a Bottom groove
23 Prism
231 Optical path bending surface
24, 24a, 24b First shake correction apparatus
241, 241A, 241B Holder
241a Mounting surface
241c, 241d Swing support part
241f, 241g Opposing wall part
241i, 241k Pressed part
241m, 241n, 241p Collision prevention protrusion
241q, 241r, 241q1, 241r1 Overhang part
241s, 241t Spring seat surface
241u Holder-side positioning protrusion
242 Holding spring
242a Fixed basal part
242c Pressing part
242e Spring-side first hole
242g Spring-side second hole
242i Spring-side third hole
243, 243A Swing support spring
243a, 243b, 243a1, 243b1 First locking part
243c, 243c1 Second locking part
243d, 243e, 243d1, 243e1 First through hole
243f, 243f1 Second through hole
243g, 243g1 Twist allowing part
243h, 243h1 Spring side guide surface
243i, 243i1 Continuous part
243j, 243k Continuous part element
243j1 Proximal continuous part
243j2 Meandering continuous part
244, 244A First actuator
244a First magnet
244c First coil
244e First Hall element
244f First magnet
245 Swing guide member
245a Swing guide surface
246 Spacer
246a Spacer-side through hole
25 FPC
26 Yoke
27 Damping member
3, 3a Lens module
31 Second cover
32, 32A Second base
320 Second accommodation space
321 Bottom part
321a, 321b Bottom through hole
322a, 322b, 322a1, 322b1 Second side wall part
322d, 322e Coil mount part
322g, 322h Magnet space
322i Slit
322j Recess
323 Reinforcing plate
324a, 324b, 324c, 324d, 324a1, 324b1, 324c1, 324d1 Spring positioning part
324e, 324f, 324g, 324h Gel positioning part
325a, 325b, 325c, 325d Damping member
33 Lens part
36, 36A AF apparatus
361, 361A, 361B Lens guide
361a, 361b, 361a1, 361b1 First magnet holding part
361c1, 361c2 Side surface part
361d Upper surface part
361e1, 361e2 Inclined surface part
362a, 362b, 362c, 362d, 362a1, 362b1, 362c1, 362d1 Spring
362f, 362f1 First fixed part
362g, 362g1 Second fixed part
362h, 362h1 Elastic deformable part
362i1, 362i2 Gel locking part
362j Continuous part
362k Annular part
363, 363A, 363B FPC
363a, 363b First coil fixed part
363d, 363e, 363f, 363g Second coil fixed part
363h FPC base
363i First continuous part
363j Second continuous part
364a, 364b, 364c, 364d, 364e, 364f, 364a1, 364b1 AF actuator (third actuator)
365a, 365b, 365a1, 365b1 AF magnet
365c1, 365c2 Chamfered part
366a, 366b AF Coil
367, 367a AF Hall element
368a, 368b, 368a1, 368b1 Second magnet holding part
368d1, 368d2 Side surface part
368e Upper surface part
368f1, 368f2 Inclined surface part
368c Third magnet holding part 369a, 369b Second AF magnet
37, 37A Second shake correction apparatus
370a, 370b, 370c, 370d, 370e, 370f, 370g, 370h, 370i, 370j, 370a1, 370b1 Second actuator
371a, 371b, 371c, 371d, 371a1, 371b1 Second magnet
371e1, 371e2 Chamfered part
372a, 372b Second coil
373 Second Hall element
374a, 374b Third magnet
38 Reference member
38a Through hole
380a, 380b Stopper part
391a, 391b, 391c, 391d First reinforcing plate
392a, 392b, 392c, 392d Second reinforcing plate
4 Image sensor module
6a, 6b Shield plate
7a, 7b Board

What is claimed is:

1. A camera actuator, comprising:
an optical path bending member configured to bend incident light along a direction of a first optical axis, to a direction of a second optical axis;
a lens part disposed in a stage following the optical path bending member;
a first actuator disposed in the vicinity of the optical path bending member, the first actuator being operable to displace the optical path bending member;
a second actuator and a third actuator disposed in the vicinity of the lens part and spaced apart from each other so as to overlap with each other in a first direction parallel to the direction of the first optical axis, the second actuator and the third actuator being operable to displace the lens part in a second direction orthogonal to the first direction and parallel to the second optical axis, and a third direction orthogonal to the first direction and the second direction, respectively
a lens guide for holding the lens part; and
a second base capable of accommodating the lens guide; wherein:
the second base includes a bottom part disposed behind the lens guide, and a side wall part extending from an end of the bottom part in the third direction to the first direction and disposed at side of the lens guide in the third direction;
the second actuator and the third actuator include a magnet and a coil, respectively;
the camera actuator further includes a shield plate made of a magnetic metal and disposed between the magnet of the second actuator and the magnet of the third actuator in the first direction;
the coil of the second actuator is disposed on the side wall part;
the coil of the third actuator is disposed on the bottom part; and
the magnet of the second actuator, the coil of the second actuator, the shield plate, the magnet of the third actuator, the coil of the third actuator are disposed in a side of the lens part in the third direction and spaced apart from each other so as to overlap with each other in the first direction.

2. The camera actuator according to claim 1, wherein:
the optical path bending member includes an optical path bending surface, and
the first actuator is disposed behind the optical path bending surface with respect to the optical path bending member.

3. The camera actuator according to claim 1, wherein:
the optical path bending member and the first actuator are disposed apart from each other in the direction of the first optical axis.

4. The camera actuator according to claim 3, wherein:
the direction of the first optical axis extends from a top part of the camera actuator to a bottom part thereof, and
the first actuator is disposed at the bottom part of the camera actuator.

5. The camera actuator according to claim 3, wherein
the first actuator swings the optical path bending member about a swing center axis orthogonal to the direction of the first optical axis and the direction of the second optical axis.

6. The camera actuator according to claim 3, wherein the second actuator displaces the lens part in a direction orthogonal to the direction of the first optical axis and the direction of the second optical axis.

7. The camera actuator according to claim 1, wherein:
the first actuator and the second actuator constitute a shake correction actuator, and
the third actuator constitutes an actuator for autofocusing.

8. The camera actuator according to claim 1, further comprising:
a holder that holds the optical path bending member;
a first base including a bearing part that swingably supports the holder; and
an urging mechanism that urges the holder against the first base.

9. The camera actuator according to claim 8, further comprising a pair of the urging mechanisms, wherein:
the holder includes pressed parts formed on both side surfaces in a width direction of the holder; and
the pair of the urging mechanisms urges the pressed parts of the holder respectively toward a central portion of the holder in the width direction.

10. The camera actuator according to claim 9, wherein the urging mechanism is a spring member, the pair of which urges the holder against the first base and toward the central portion in the width direction from opposite sides in the width direction of the holder.

11. The camera actuator according to claim 8, wherein:
the urging mechanism includes a first magnet fixed to the holder, and a yoke fixed to the first base, and
the urging mechanism urges the holder against the first base by a magnetic force generated between the first magnet and the yoke.

12. The camera actuator according to claim 1, further comprising:
a plurality of springs that support the lens guide on the second base so that the lens guide is displaceable in the second direction and the third direction.

13. The camera actuator according to claim 12, wherein the plurality of springs are dispersedly arranged around the lens guide, and a center position of the dispersed arrangement of the plurality of springs coincides with a center of gravity of a movable part including the lens guide and a member that is displaceable with the lens guide.

14. The camera actuator according to claim 1, further comprising:
a holder that holds the optical path bending member;
a first base that swingably supports the holder; and
a swing guide member provided between the holder and the first base, the swing guide member including a spherical swing guide surface on at least a part of the swing guide member, wherein
the holder is swingably supported on the first base via the swing guide member.

15. The camera actuator according to claim 1, wherein:
at least one of the second actuator and the third actuator includes a magnet including a pair of chamfered parts formed on a pair of side surfaces opposite in a predetermined direction, and
the lens guide includes a magnet holding part having a pair of inclined surface parts, the magnet holding part holding the magnet in a state where the pair of chamfered parts and the pair of inclined surface parts are opposed to each other.

16. A camera module, comprising:
the camera actuator according to claim 1; and
an image sensor disposed in a stage following a lens part.

17. A camera mounted apparatus, comprising:
the camera module according to claim 16; and
a control part that controls the camera module.

* * * * *